United States Patent
Kishigami

(10) Patent No.: US 12,270,939 B2
(45) Date of Patent: Apr. 8, 2025

(54) RADAR DEVICE

(71) Applicant: Panasonic Intellectual Property Management Co., Ltd., Osaka (JP)

(72) Inventor: Takaaki Kishigami, Tokyo (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 599 days.

(21) Appl. No.: 17/474,993

(22) Filed: Sep. 14, 2021

(65) Prior Publication Data

US 2022/0050176 A1    Feb. 17, 2022

Related U.S. Application Data

(63) Continuation of application No. PCT/JP2020/005732, filed on Feb. 14, 2020.

(30) Foreign Application Priority Data

Mar. 20, 2019 (JP) .................................. 2019-053760

(51) Int. Cl.
  *G01S 7/41*    (2006.01)
  *G01S 7/03*    (2006.01)
  (Continued)

(52) U.S. Cl.
  CPC .............. *G01S 7/415* (2013.01); *G01S 7/03* (2013.01); *G01S 13/42* (2013.01); *G01S 2013/0245* (2013.01)

(58) Field of Classification Search
  CPC ............. G01S 7/415; G01S 7/03; G01S 13/42
  See application file for complete search history.

(56) References Cited

U.S. PATENT DOCUMENTS 3,130,410 A * 4/1964 Gutleber ................ H01Q 21/22
                                                  342/368
2008/0291088 A1* 11/2008 Nagai ..................... G01S 13/48
                                                  342/374

(Continued)

FOREIGN PATENT DOCUMENTS

| JP | 2008-304417 | 12/2008 |
| JP | 2011-526371 | 10/2011 |
| WO | 2007/083479 | 7/2007 |
| WO | 2018/154748 | 8/2018 |

OTHER PUBLICATIONS

English language translation of Office Action from Japan Patent Office (JPO) in Japanese Patent Appl. No. 2019-053760, dated Mar. 14, 2023.

(Continued)

*Primary Examiner* — Timothy A Brainard
*Assistant Examiner* — Helena H Seraydaryan
(74) *Attorney, Agent, or Firm* — Greenblum and Bernstein, P.L.C.

(57) ABSTRACT

Provided is a radar device, wherein a transmission array antenna includes a plurality of transmission antennas that are linearly disposed in a first direction, the intervals between respective adjacent transmission antennas of the plurality of transmission antennas increase from one side toward the other side in the first direction, a reception array antenna includes a plurality of reception antennas that are linearly disposed in the first direction, and the intervals between respective adjacent transmission antennas of the plurality of reception antennas decrease from one side toward the other side.

12 Claims, 29 Drawing Sheets

(51) Int. Cl.
    *G01S 13/42*     (2006.01)
    *G01S 13/02*     (2006.01)

(56) References Cited

U.S. PATENT DOCUMENTS

| | | |
|---|---|---|
| 2008/0303711 A1 | 12/2008 | Matsuoka |
| 2011/0074620 A1 | 3/2011 | Wintermantel |
| 2011/0074621 A1 | 3/2011 | Wintermantel |
| 2011/0080313 A1 | 4/2011 | Wintermantel et al. |
| 2011/0080314 A1 | 4/2011 | Wintermantel |
| 2017/0149147 A1* | 5/2017 | Minami .................... G01S 7/03 |
| 2019/0369223 A1 | 12/2019 | Yoshida et al. |

OTHER PUBLICATIONS

English language translation of Office Action from Japan Patent Office (JPO) in Japanese Patent Appl. No. 2019-053760, dated Jul. 4, 2023.
International Search Report (ISR) from International Searching Authority (Japan Patent Office) in International Pat. Appl. No. PCT/JP2020/005732, dated May 12, 2020, together with an English language translation.
Cadzow, "Direction-of-Arrival Estimation Using Signal Subspace Modeling", IEEE Transactions on Aerospace and Electronic Systems, vol. 28, No. 1, Jan. 1992, pp. 64-79.
Li et al., "MIMO Radar with Colocated Antennas", IEEE Signal Processing Magazine, vol. 24, Issue: 5, Sep. 2007, pp. 106-114.

\* cited by examiner

CASE OF POSITIVE fs_alias1

CASE OF NEGATIVE fs_alias1

CASE OF DOPPLER FREQUENCY INDEX WITHOUT ALIASING

CASE OF fs_alias1 (fs_alias1>0)

CASE OF NO DOPPLER ALIASING

CASE OF DOPPLER ALIASING

CASE OF POSITIVE fs_alias1

CASE OF NEGATIVE fs_alias1

CASE OF NO DOPPLER ALIASING

CASE OF DOPPLER ALIASING

CASE OF NO DOPPLER ALIASING

CASE OF DOPPLER ALIASING

CASE OF NO DOPPLER ALIASING

CASE OF DOPPLER ALIASING

CASE OF NO DOPPLER ALIASING

CASE OF DOPPLER ALIASING

CASE OF NO DOPPLER ALIASING

CASE OF DOPPLER ALIASING

RADAR DEVICE

TECHNICAL FIELD

The present disclosure relates to a radar apparatus.

BACKGROUND ART

In recent years, radar apparatuses have been under study that use radar transmission signals with short wavelengths, including microwaves or millimeter-waves, which provide high resolution. To improve safety outdoors, a demand has arisen for the development of radar apparatuses that detects, in addition to a vehicle, a small object, such as a pedestrian and a fallen object, in a wider angle range (such radar apparatuses are referred to as, for example, "wide-angle radar apparatuses").

An example of the configuration of a radar apparatus having a wide detection range is a configuration using a technique called "Direction of Arrival (DOA) estimation". The configuration includes an array antenna consisting of multiple antennas (antenna elements) to receive reflected waves, and the direction of arrival (also referred to as the "angle of arrival") of the reflected waves from a target is estimated by using a signal processing algorithm based on the received phase difference in relation to the element spacing (antenna spacing). Direction of Arrival (DOA) estimation techniques include, for example, the Fourier method and techniques capable of providing high resolution, such as the Capon method, MUSIC (Multiple Signal Classification), and ESPRIT (Estimation of Signal Parameters via Rotational Invariance Techniques).

In addition, for example, a configuration of a radar apparatus has been proposed in which multiple antennas (array antennas) for transmission as well as for reception are provided, and beam scanning is performed by signal processing using the transmission/reception array antennas (the radar apparatus is also referred to as a MIMO (Multiple Input Multiple Output) radar) (refer to, for example, NPL 1).

CITATION LIST

Patent Literature

PTL 1
Japanese Patent Application Laid-Open No. 2008-304417
PTL 2
Japanese Unexamined Patent Application Publication (Translation of PCT Application) No. 2011-526371

Non-Patent Literature

NPL 1
J. Li, and P. Stoica, "MIMO Radar with Colocated Antennas," Signal Processing Magazine, IEEE Vol. 24, Issue: 5, pp. 106-114, 2007
NPL 2
Direction-of-arrival estimation using signal subspace modeling Cadzow, J. A.; Aerospace and Electronic Systems, IEEE Transactions on Volume: 28, Issue: 1 Publication Year: 1992, Page(s): 64-79

SUMMARY OF INVENTION

However, methods for use in radar apparatuses to detect an object (or a target) have not been sufficiently studied.

One aspect of the present disclosure provides a radar apparatus that improves the detection performance of a target.

A radar apparatus according to one aspect of the present disclosure includes: a radar transmission circuit that transmits a radar signal by using a transmission array antenna; and a radar reception circuit that receives a reflected wave signal that is the radar signal reflected by a target by using a reception array antenna, in which: the transmission array antenna includes a plurality of transmission antennas arranged in a straight line extending in a first direction, and spacing between adjacent transmission antennas of the plurality of transmission antennas increases from one end toward another in the first direction, and in which: the reception array antenna includes a plurality of reception antennas arranged in a straight line extending in the first direction, and the spacing between adjacent transmission antennas of the plurality of reception antennas decreases from the one end toward the other end in the first direction.

Note that these generic or specific aspects may be achieved by a system, an apparatus, a method, an integrated circuit, a computer program, or a recoding medium, and also by any combination of the system, the apparatus, the method, the integrated circuit, the computer program, and the recoding medium.

According to one aspect of the present disclosure, the detection performance of a target can be improved in radar apparatuses.

Additional benefits and advantages of the disclosed exemplary embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Figure 1:
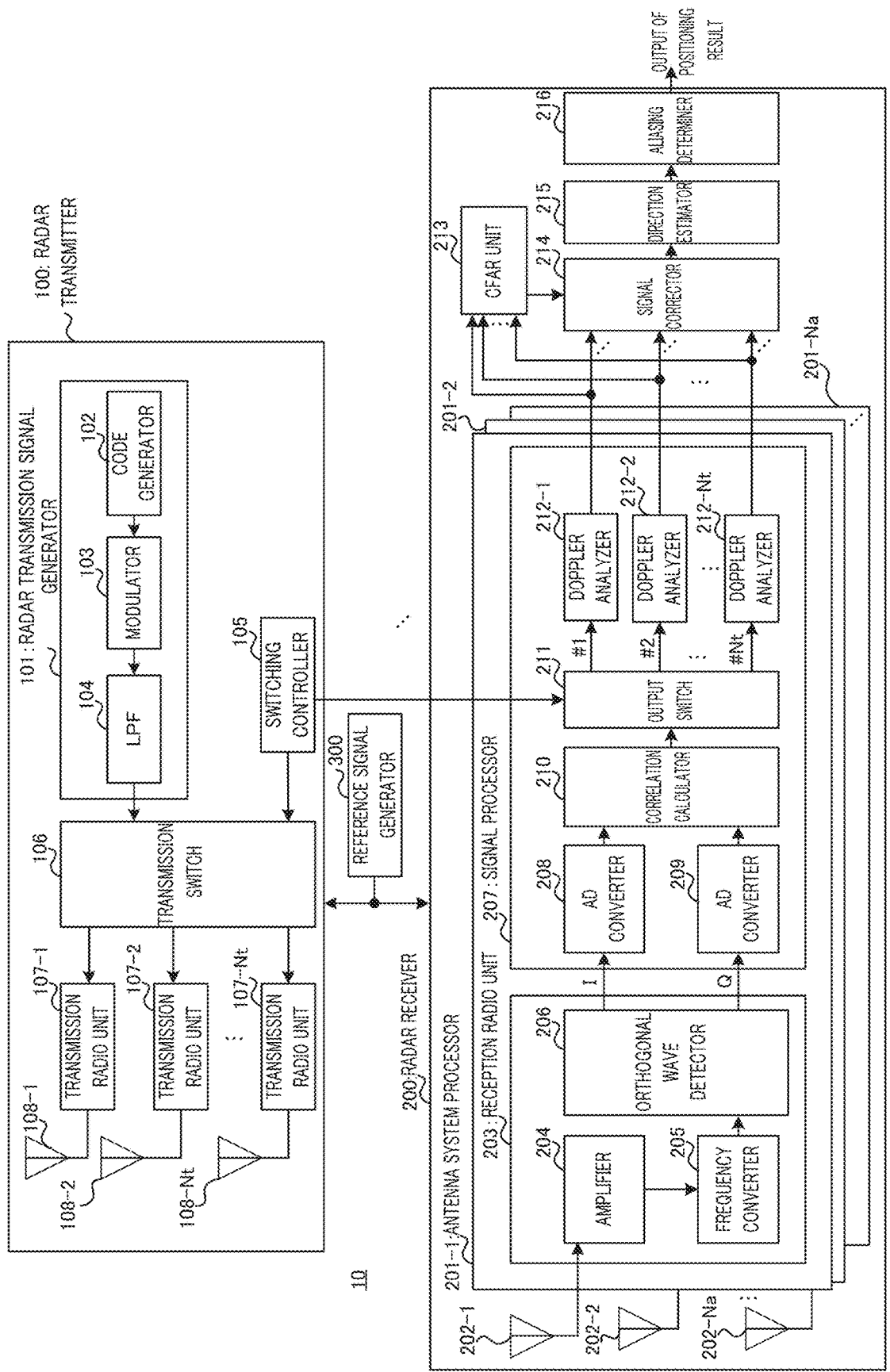
FIG. 1 is a block diagram of a configuration example of a radar apparatus according to an embodiment.

A MIMO radar transmits, from a plurality of transmission antennas (also referred to as a transmission array antenna), signals (radar transmission waves) multiplexed using, for example, time division, frequency division, or code division multiplexing, and receives signals (radar reflected waves) reflected from a nearby object by using a plurality of reception antennas (also referred to as a reception array antenna). Thereafter, the MIMO radar separates and receives the multiplexed transmission signals from the respective received signals. Through the process described above, the MIMO radar can retrieve a complex propagation path response, which is given in the form of the product of the number of transmission antennas and the number of reception antennas and perform an array signal process using the received signals as a virtual reception array.

In addition, in the MIMO radar, an arrangement with appropriate element spacing in the transmission/reception array antennas can virtually increase the antenna aperture and, thus, improves the angular resolution.

For example, PTL 1 describes a MIMO radar that uses time-division multiplexed transmission (hereinafter referred to as "time-division multiplexing MIMO radar"). Time-division multiplexed transmission is a multiplexed transmission technique for MIMO radar, in which signals are transmitted by shifting the transmission time for each transmission antenna. Time-division multiplexed transmission can be implemented with a simple configuration, as compared with frequency multiplexed transmission or code multiplexed transmission. In addition, the time-division multiplexed transmission can maintain proper orthogonality between transmission signals by sufficiently increasing the transmission time interval. The time-division multiplexing MIMO radar outputs transmission pulses, which are an example of transmission signals, while sequentially switching through the transmission antennas in predetermined periods. The time-division multiplexing MIMO radar receives, with a plurality of reception antennas, signals that are the transmission pulses reflected by an object and performs a correlation process between the received signal and the transmission pulse. Thereafter, the time-division multiplexing MIMO radar performs, for example, spatial fast Fourier transform (FFT) processing (a process for estimating the direction of arrival of the reflected waves).

The time-division multiplexing MIMO radar sequentially switches the transmission antennas, from which transmission signals (for example, transmission pulses or radar transmission waves) are to be transmitted, in predetermined periods. For this reason, in time-division multiplexing transmission, it may take a longer time to complete transmission of transmission signals from all the transmission antennas than in frequency division transmission or code division transmission. Accordingly, for example, as described in PTL 2, when transmission signals are transmitted from the respective transmission antennas and the Doppler frequency (i.e., the relative velocity of the target) is detected from their reception phase changes, the time interval for observing the reception phase changes (for example, the sampling interval) is increased when applying Fourier frequency analysis to detect the Doppler frequency. This can reduce the Doppler frequency range which satisfies the sampling theorem and over which the Doppler frequency can be detected without causing aliasing (i.e., the range of detectable relative velocities of the target).

If it is likely that the reflected wave signal outside the Doppler frequency range over which the Doppler frequency can be detected without causing aliasing comes from the target, the radar apparatus is unable to identify whether the reflected wave signal is an aliasing component, thus causing the ambiguity (the uncertainty) of the Doppler frequency.

For example, when a radar apparatus transmits a transmission signal (a transmission pulse) while sequentially switching through Nt transmission antennas in predetermined periods Tr, a transmission time of Tr×Nt is required to complete transmission of the transmission signals from all the transmission antennas. If such time-division multiplexed transmission is repeated Nc times and Fourier frequency analysis is applied to detect the Doppler frequency, the Doppler frequency range over which the Doppler frequency can be detected without aliasing is given by ±1/(2Tr×Nt) from the sampling theorem. Accordingly, the Doppler frequency range over which the Doppler frequency can be detected without causing aliasing decreases with increasing number Nt of transmission antennas, and the ambiguity of the Doppler frequency is likely to occur even for lower relative velocities.

If the reflected wave signal outside the Doppler frequency range over which the Doppler frequency can be detected without aliasing comes from the target, the radar apparatus incorrectly detects the Doppler frequency of the target.

In addition, since, in the time-division multiplexing MIMO radar, a difference in transmission time between the transmitted signals caused by time division transmission and the phase rotation in accordance with the Doppler frequency of the target additionally occur, the time-division multiplexing MIMO radar performs phase correction caused by these factors (hereinafter referred to as "transmission phase correction") and, thereafter, performs a direction estimation process. For this reason, if the radar apparatus detects the Doppler frequency of the target incorrectly, the radar apparatus performs incorrect transmission phase correction, which may cause an error in the direction estimation of the target.

Therefore, according to an aspect of the present disclosure, a method is described for improving the accuracy of Doppler frequency detection (that is, relative velocity detection) and direction estimation (that is, angle measurement) of a target even when a reflected wave signal outside the Doppler frequency range over which the Doppler frequency can be detected without aliasing comes from the target.

An embodiment according to an aspect of the present disclosure is described in detail below with reference to the accompanying drawings. Throughout the embodiment, the same reference numerals are used to designate the same constituent elements, and duplicate description is not repeated.

The configuration of a radar apparatus is described below that sends out different time-division multiplexed transmission signals from multiple transmission antennas in the transmission branch and, in the reception branch, separates the transmission signals and performs reception processing (that is, a MIMO radar configuration is described).

[Configuration of Radar Apparatus]

FIG. 1 is a block diagram illustrating the configuration of radar apparatus 10.

Radar apparatus 10 includes a radar transmitter (a transmitter branch) 100, a radar receiver (a receiver branch) 200, and reference signal generator 300.

Radar transmitter 100 generates a high-frequency (Radio Frequency) radar signal (a radar transmission signal) on the basis of a reference signal received from reference signal generator 300. Thereafter, radar transmitter 100 transmits the radar transmission signal in predetermined transmission periods by using a transmission array antenna made up of a plurality of transmission antennas 108-1 to 108-Nt.

Radar receiver 200 receives reflected wave signals, which are radar transmission signals reflected by a target (not illustrated), using a reception array antenna including a plurality of reception antennas 202-1 to 202-Na. Radar receiver 200 performs processing described below using a reference signal received from reference signal generator 300 so as to perform processing in synchronization with radar transmitter 100. In addition, radar receiver 200 performs signal processing on the reflected wave signal received by each of reception antennas 202 and, for example, detects the presence or absence of a target or estimates the direction of arrival of the reflected wave signal.

Note that the target is an object to be detected by radar apparatus 10. For example, examples of a target include a vehicle (including four-wheeled and two-wheeled vehicles), a person, a block, and a curb.

Reference signal generator 300 is connected to each of radar transmitter 100 and radar receiver 200. Reference signal generator 300 supplies the reference signal (the standard signal) to radar transmitter 100 and radar receiver 200 to synchronize the processing performed by radar transmitter 100 with the processing performed by radar receiver 200.

[Configuration of Radar Transmitter 100]

Radar transmitter 100 includes radar transmission signal generator 101, switching controller 105, transmission switch 106, a transmission radio unit 107-1 to 107-Nt, and transmission antennas 108-1 to 108-Nt. That is, radar transmitter 100 has Nt transmission antennas 108, and each of transmission antennas 108 is connected to an individual transmission radio unit 107.

Radar transmission signal generator 101 multiplies the reference signal received from reference signal generator 300 by a predetermined number to generate a timing clock and generates a radar transmission signal on the basis of the generated timing clock. Thereafter, radar transmission signal generator 101 repeatedly outputs the radar transmission signal in predetermined radar transmission periods (Tr). The radar transmission signal is expressed by $y(k, M) = I(k, M) + j Q(k, M)$, where j denotes the imaginary unit, k denotes the discrete time, and M denotes the ordinal number of the radar transmission period. In addition, I(k, M) and Q(k, M) denote the in-phase component and the orthogonal wave component of the radar transmission signal (k M) at discrete time k in the Mth radar transmission period, respectively.

Radar transmission signal generator 101 includes code generator 102, modulator 103, and an LPF (Low Pass Filter) 104. Each of the constituent elements of radar transmission signal generator 101 is described below.

More specifically, code generator 102 generates a code sequence $a_n(M)$ (n=1, ..., L) (pulse code) of code length L for each of the radar transmission periods Tr. For example, code that provides low-range side lobe characteristics is used as the code $a_n(M)$ generated in code generator 102. Examples of a code sequence include Barker code, M-sequence code, and Gold code.

Modulator 103 performs pulse modulation (amplitude modulation, ASK (Amplitude Shift Keying), or pulse shift keying) or phase modulation (Phase Shift Keying) on the pulse code sequence (for example, code $a_n(M)$) received from code generator 102 and outputs a modulated signal to LPF 104.

LPF 104 outputs, to transmission switch 106, a signal component in a predetermined limiting band or lower of the modulated signal received from modulator 103 as a baseband radar transmission signal.

Figure 2:
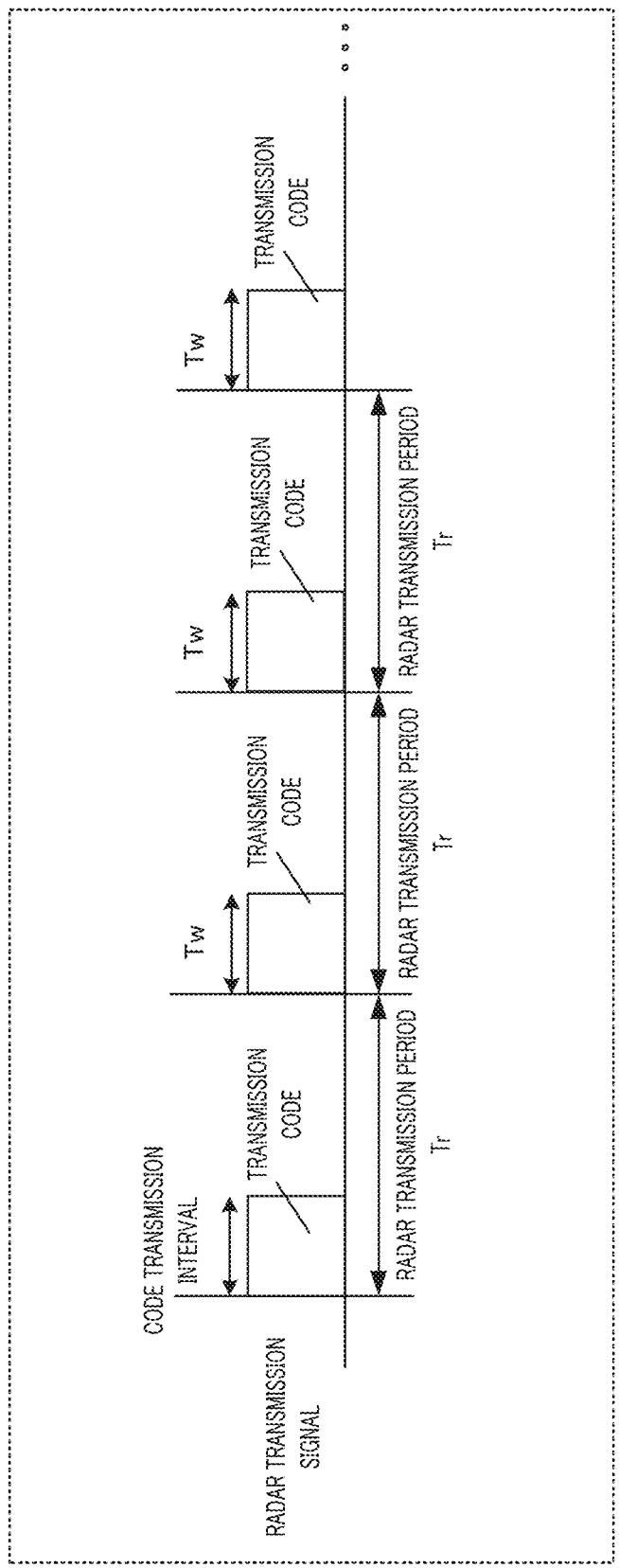
FIG. 2 illustrates an example of a radar transmission signal according to an embodiment.

FIG. 2 illustrates an example of a radar transmission signal generated by radar transmission signal generator 101. As illustrated in FIG. 2, a pulse code sequence of a code length L is included in code transmission interval Tw in the radar transmission period Tr. The pulse code sequence is transmitted in code transmission interval Tw in each of the radar transmission period Tr, and the remaining interval (Tr−Tw) is non-signal interval. A single code includes L sub-pulses. In addition, pulse modulation using No samples is performed on each of the sub-pulses and, thus, Nr (=No× L) sample signals are included in each code transmission interval Tw. Furthermore, Nu samples are included in the non-signal interval (Tr−Tw) in the radar transmission period Tr.

Switching controller 105 controls transmission switch 106 in radar transmitter 100 and output switch 211 in radar receiver 200. Note that the control operation performed on output switch 211 of radar receiver 200 by switching controller 105 is described below in the description of the operation performed by radar receiver 200. The control operation performed on transmission switch 106 of radar transmitter 100 by switching controller 105 is described below.

For example, switching controller 105 outputs, to transmission switch 106, a control signal (hereinafter referred to as as a "switching control signal") to switch between transmission antennas 108 (that is, transmission radio units 107) in each radar transmission period Tr.

Transmission switch 106 performs a switching operation to output the radar transmission signal input from radar transmission signal generator 101 to transmission radio unit 107 indicated by the switching control signal input from switching controller 105. For example, transmission switch 106 selects and switches one of the plurality of transmission radio units 107-1 to 107-Nt on the basis of the switching control signal and outputs the radar transmission signal to the selected transmission radio unit 107.

Zth (z=1, . . . , Nt) transmission radio unit 107 performs frequency conversion on the baseband radar transmission signal output from transmission switch 106 to generate a radar transmission signal in the carrier frequency (Radio Frequency: RF) band. Thereafter, transmission radio unit 107 amplifies the radar transmission signal to a predetermined transmission power P [dB] by using a transmission amplifier and outputs the radar transmission signal to zth transmission antenna 108.

Zth (z=1, . . . , Nt) transmission antenna 108 radiates the radar transmission signal output from zth transmission radio unit 107 into the air.

Figure 3:
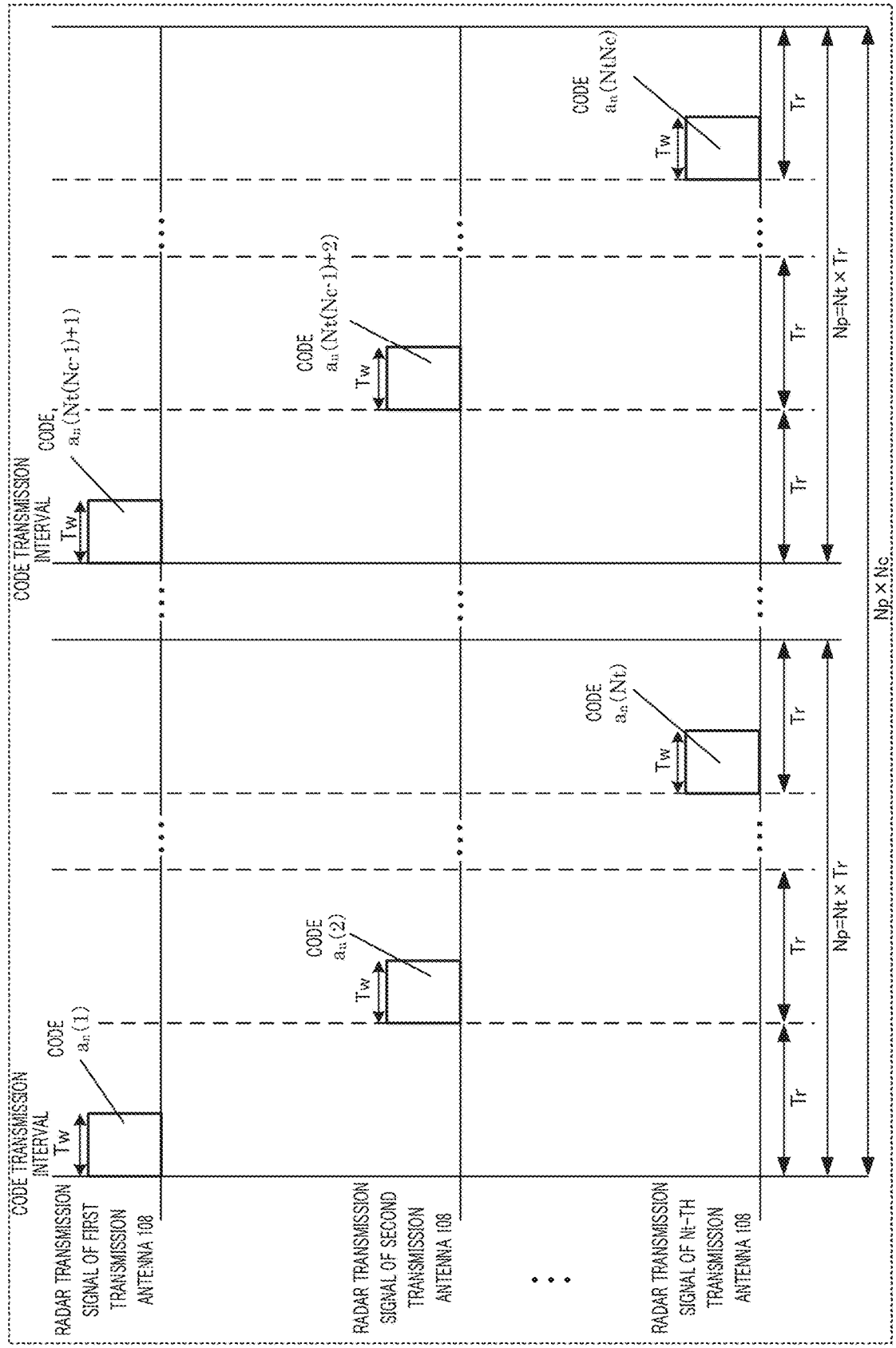
FIG. 3 illustrates an example of a transmission switching operation according to an embodiment.

FIG. 3 illustrates an example of the switching operation of transmission antenna 108 according to the present embodiment. Note that the switching operation of transmission antenna 108 according to the present embodiment is not limited to the example illustrated in FIG. 3.

In FIG. 3, switching controller 105 outputs, to transmission switch 106, a switching control signal representing an instruction to sequentially switch through transmission antennas from 1st transmission antenna 108 (or transmission radio unit 107-1) to Ntth transmission antenna 108 (or transmission radio unit 107-Nt) in each radar transmission period Tr. Thus, in each of first to Ntth transmission antennas 108, the radar transmission signal is transmitted with a transmission period of Np (=Nt×Tr).

Switching controller 105 performs control so that the switching operations performed by transmission radio unit 107 in antenna switching period Np are repeated Nc times.

Figure 4:
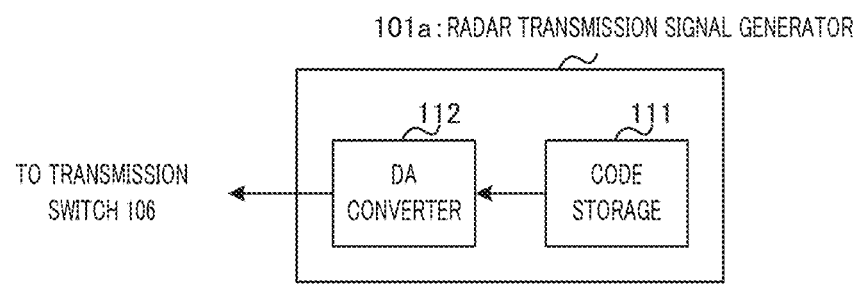
FIG. 4 is a block diagram of another configuration example of a radar transmission signal generator according to an embodiment.

Radar transmitter 100 may include radar transmission signal generator 101a illustrated in FIG. 4 instead of radar transmission signal generator 101. Radar transmission signal generator 101a does not include code generator 102, modulator 103, and LPF 104 illustrated in FIG. 1, but instead includes code storage 111 and DA converter 112. Code storage 111 prestores the code sequence generated by code generator 102 (FIG. 1) and cyclically and sequentially reads the stored code sequence. DA converter 112 converts the code sequence (a digital signal) output from code storage 111 into an analog signal (a baseband signal).

[Configuration of Radar Receiver 200]

In FIG. 1, radar receiver 200 includes Na reception antennas 202 to configure an array antenna. Radar receiver 200 further includes Na antenna system processors 201-1 to 201-Na, a CFAR (Constant False Alarm Rate) unit 213, signal corrector 214, direction estimator 215, and aliasing determiner 216.

Each of reception antennas 202 receives a reflected wave signal that is a radar transmission signal reflected by a target and outputs the received reflected wave signal to a corresponding antenna system processor 201 as a received signal.

Each of antenna system processors 201 includes reception radio unit 203 and signal processor 207.

Reception radio unit 203 includes amplifier 204, frequency converter 205, and orthogonal wave detector 206.

Reception radio unit 203 generates a timing clock obtained by multiplying a reference signal received from reference signal generator 300 by a predetermined number and operates on the basis of the generated timing clock. More specifically, amplifier 204 amplifies a received signal received from reception antenna 202 to a predetermined level. Frequency converter 205 frequency-converts the received signal in a high-frequency band into a received signal in a baseband band. Orthogonal wave detector 206 converts the received signal in the baseband band into a received signal in the baseband including an I signal and a Q signal through orthogonal wave detection.

Signal processor 207 of each of antenna system processors 201-z (z: any one of 1 to Na) includes AD converters 208 and 209, correlation calculator 210, output switch 211, and Doppler analyzer 212-1 to 212-Nt.

AD converter 208 receives the I signal from orthogonal wave detector 206, while AD converter 209 receives the Q signal from orthogonal wave detector 206. AD converter 208 performs sampling at discrete times so as to convert the I signal into digital data. AD converter 209 performs sampling on the baseband signal containing the Q signal so as to convert the Q signal into digital data.

Note that in the sampling performed by AD converters 208 and 209, Ns discrete sampling operations, for example, are performed per sub-pulse time Tp (=Tw/L) of a radar transmission signal. That is, the number of oversamples per sub-pulse is Ns.

In the following description, by using the I signal $I_z(k, M)$ and the Q signal $Q_z(k, M)$ (where z is any one of 1 to Na), the baseband received signals at discrete time k in Mth radar transmission period Tr[M], which are the outputs from AD converters 208 and 209, are expressed as a complex number signal $x_z(k, M) = I_z(k, M) + j\, Q_z(k, M)$. In addition, in the following description, discrete time k is based on a time at which radar transmission period (Tr) starts (k=1), and signal processor 207 periodically operates up to k=(Nr+Nu)Ns/No that is a sample point up to the end of radar transmission period Tr. That is, k=1, . . . , (Nr+Nu)Ns/No. Note that j is an imaginary number unit.

Correlation calculator 210 of zth (where z=1, . . . , Na) signal processor 207 performs correlation calculation between discrete sample value $x_z(k, M)$ including discrete sample values $I_z(k, M)$ and $Q_z(k, M)$ received from AD converters 208 and 209 and pulse code $a_n(M)$ of code length L (where z=1, . . . , Na, and n=1, . . . , L) transmitted from radar transmitter 100 in each radar transmission period Tr. For example, correlation calculator 210 performs sliding correlation calculation between discrete sample value $x_z(k, M)$ and pulse code $a_n(M)$ in each radar transmission period Tr. For example, correlation calculation value $AC_z(k, M)$ obtained through the sliding correlation calculation at discrete time k in Mth radar transmission period Tr[M] is calculated as follows:

$$AC_z(k, M) = \sum_{n=1}^{L} x_z(k + N_s(n-1), M) a_n(M)^*. \qquad \text{(Expression 1)}$$

In the above expression, the asterisk (*) denotes the complex conjugate operator.

For example, correlation calculator 210 calculates correlation calculation over periods of k=1, . . . , (Nr+Nu)Ns/No according to expression 1.

Figure 5:
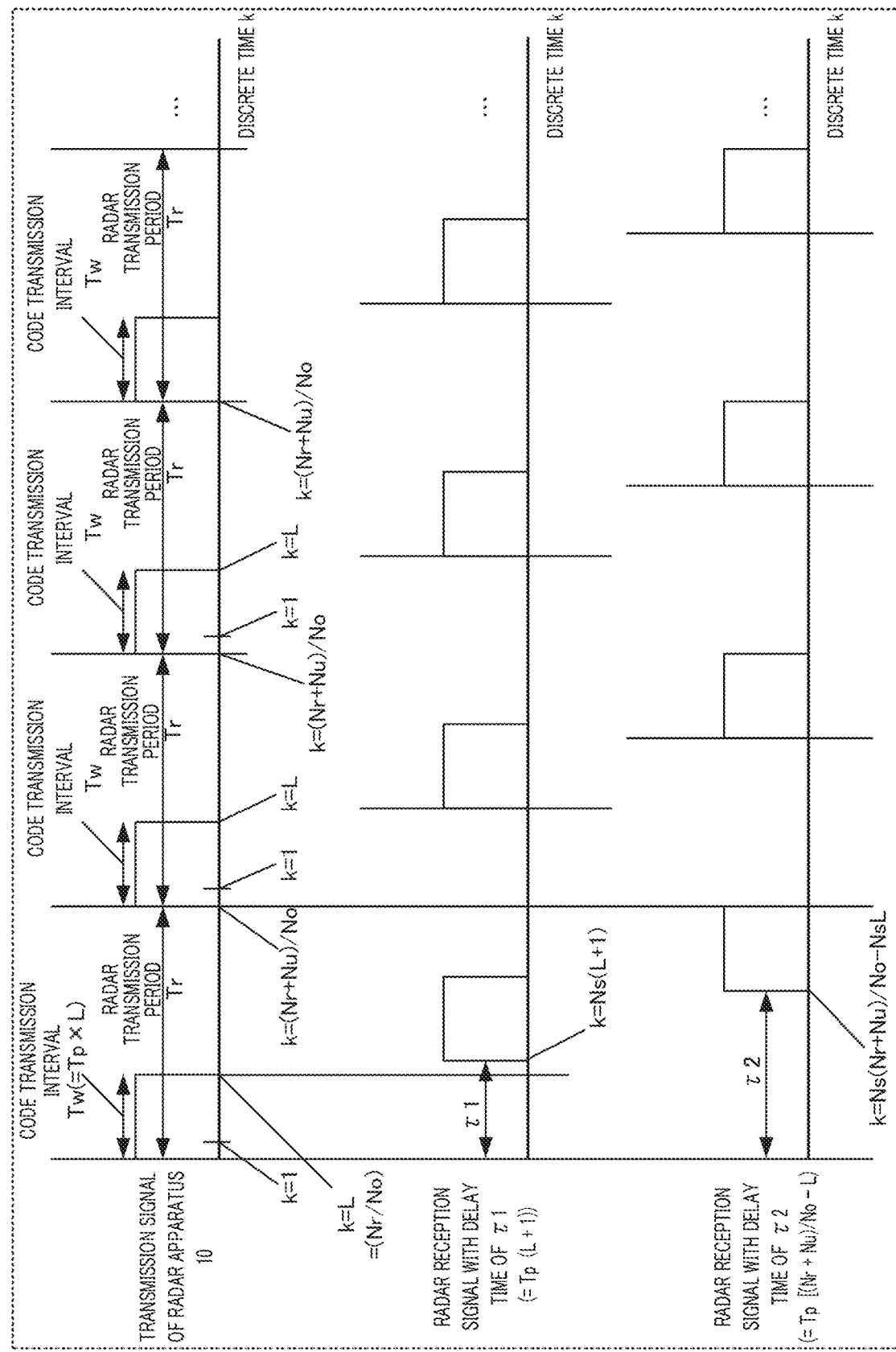
FIG. 5 illustrates an example of the transmission timing of a radar transmission signal and a measurement range according to an embodiment.

Note that the measurement range of the correlation calculation performed by correlation calculator 210 is not limited to correlation calculation at k=1, . . . , (Nr+Nu)Ns/No. Correlation calculator 210 may limit the measurement range (that is, the range of k) according to the range in which a target to be measured by radar apparatus 10 is present. In this manner, in radar apparatus 10, the amount of calculation performed by correlation calculator 210 can be reduced. For example, correlation calculator 210 may limit the measurement range such that k=Ns(L+1), . . . , (Nr+Nu)Ns/No−NsL. In this case, as illustrated in FIG. 5, radar apparatus 10 does not perform measurement in a time interval corresponding to code transmission interval Tw.

Consequently, even in the case where a radar transmission signal directly wraps around radar receiver 200, correlation calculator 210 does not perform a process in a period (at least a period less than at least τ1) in which the radar transmission signal wraps around and, thus, radar apparatus 10 can perform measurement excluding the influence of wraparound. In the same manner, in the case where a measurement range (a range of k) is limited, the process in which the measurement range (the range of k) is limited can be applied to the processes performed by output switch 211, Doppler analyzer 212, CFAR unit 213, signal corrector 214, direction estimator 215, and aliasing determiner 216 (described below). As a result, the amount of processing performed by each of the constituent elements can be reduced and, thus, the power consumption of radar receiver 200 can be reduced.

Output switch 211 selectively switches over to one of Nt Doppler analyzers 212 on the basis of a switching control signal input from switching controller 105 and outputs an output from correlation calculator 210 to Doppler analyzer 212 in each radar transmission period Tr. Hereinafter, as an example, a switching control signal in Mth radar transmission period Tr[M] is represented by Nt-bit information [bit$_1$(M), bit$_2$(M), . . . , bit$_{Nt}$(M)]. For example, in the case where an NDth bit of the switching control signal in Mth radar transmission period Tr[M] (where ND is any one of 1 to Nt) is "1", output switch 211 selects NDth Doppler analyzer 212 (that is, switches on Doppler analyzer 212). In contrast, in the case where the NDth bit of the switching control signal in Mth radar transmission period Tr[M] is "0", output switch 211 does not select NDth Doppler analyzer 212 (that is, switches off Doppler analyzer 212). Output switch 211 outputs, to selected Doppler analyzer 212, the correlation calculation value AC$_z$(k, M) that is input from correlation calculator 210.

For example, the Nt-bit switching control signal corresponding to the switching operation performed by transmission radio unit 107 (or transmission antenna 108) illustrated in FIG. 3 is as follows:

$$[bit_1(1), bit_2(1), \ldots , bit_{Nt}(1)] = [1, 0, \ldots , 0]$$

$$[bit_1(2), bit_2(2), \ldots , bit_{Nt}(2)] = [0, 1, \ldots , 0]$$

...

$$[bit_1(Nt), bit_2(Nt), \ldots , bit_{Nt}(Nt)] = [0, 0, \ldots , 1].$$

As described above, each of Doppler analyzers 212 is sequentially selected (that is, switched on) with a period of Np (=Nt×Tr). For example, the switching control signal repeats the above-described operation Nc times.

Zth (z=1, . . . , Na) signal processor 207 includes Nt Doppler analyzers 212.

Doppler analyzer 212 performs Doppler analysis on the output from output switch 211 (for example, the correlation calculation value AC$_z$(k, M)) at each discrete time k. For example, if Nc is a power of 2, the Fast Fourier Transform (FFT) process can be employed in the Doppler analysis.

For example, the wth output from NDth Doppler analyzer 212 of zth signal processor 207 indicates the following Doppler frequency response FT_CI$_z^{(ND)}$(k, f$_s$, w) of Doppler frequency index f$_s$ at discrete time k:

$$FT\_CI_z^{ND}(k, f_s, w) = \sum_{q=0}^{N_t N_c - 1} bit_{N_D}(q+1) \qquad \text{(Expression 2)}$$

$$AC_z(k, N_t N_c(w-1) + q + 1)\exp\left[-j\frac{2\pi\left\lfloor\frac{q}{N_t}\right\rfloor f_s}{N_c}\right]$$

Note that the FFT size is Nc, and the range of the Doppler frequency index fs is (−Nc/2)+1, . . . , 0, . . . , Nc/2. In addition, ND=1 to Nt, K=1, . . . , (Nr+Nu)NsNo, and w is an integer greater than or equal to 1. Furthermore, j is an imaginary number unit, and z=1 to Na.

During the FFT process, Doppler analyzer 212 may perform multiplication using a window function coefficient, such as a Han window or a Hamming window. By using the window function coefficient, side lobes generated around a frequency peak can be suppressed.

The processing performed by each of the constituent elements of signal processor 207 has been described above.

Note that in the following description, the wth output obtained by performing the same processing in each of Na antenna system processors 201 is expressed in the form of a virtual reception array correlation vector h(k, fs, w) as follows:

$$h(k, f_s, w) = \begin{bmatrix} FT\_CI_1^{(1)}(k, f_s, w) \\ FT\_CI_2^{(1)}(k, f_s, w) \\ \vdots \\ FT\_CI_{Na}^{(1)}(k, f_s, w) \\ FT\_CI_1^{(2)}(k, f_s, w) \\ FT\_CI_2^{(2)}(k, f_s, w) \\ \vdots \\ FT\_CI_{Na}^{(2)}(k, f_s, w) \\ \vdots \\ FT\_CI_1^{(Nt)}(k, f_s, w) \\ FT\_CI_2^{(Nt)}(k, f_s, w) \\ \vdots \\ FT\_CI_{Na}^{(Nt)}(k, f_s, w) \end{bmatrix} \qquad \text{(Expression 3)}$$

The virtual reception array correlation vector h(k, fs, w) contains Nt×Na elements, which is the product of the number of transmission antennas Nt and the number of reception antennas Na. The virtual reception array correlation vector h(k, fs, w) is used to describe the peak detection process performed by CFAR unit 213, the correction process performed by signal corrector 214, or the direction estimation process performed by direction estimator 215, which are described below.

In FIG. 1, CFAR unit 213 uses the output from Doppler analyzer 212 to perform the CFAR process (that is, adaptive threshold determination) and extracts an index $k_{\_cfar}$ at the discrete time that gives the peak signal and the index $f_{s\_cfar}$ of the Doppler frequency.

For example, CFAR unit 213 performs the CFAR process by using the output $FT\_CI_z^{(ND)}(k, f_s, w)$ of Doppler analyzer 212 in each of antenna system processors 201-1 to 201-Na. For example, CFAR unit 213 performs power addition on the outputs $FT\_CI_1^{(1)}(k, fs, w)$, $FT\_CI_2^{(1)}(k, fs, w)$, ..., $FT\_CI_{Na}^{(Nt)}(k, fs, w)$ of Doppler analyzer 212 in the signal processors 207 of first to Nath antenna system processors 201, respectively. Thereafter, CFAR unit 213 performs a two-dimensional CFAR process consisting of the distance axis and the Doppler frequency axis (corresponding to the relative velocity) or a CFAR process combining one-dimensional CFAR processes on the basis of the power addition value.

CFAR unit 213 adaptively sets a threshold and outputs a distance index $f_{b\_cfar}$, which gives the received power higher than the threshold, and a Doppler frequency index $f_{s\_cfar}$ to signal corrector 214.

Note that radar apparatus 10 may perform the direction estimation process in direction estimator 215 without performing the CFAR process.

An example of the operation performed by CFAR unit 213 has been described above.

In FIG. 1, signal corrector 214 corrects the deviation between the array antennas for the wth virtual reception array vector $h(k_{\_cfar}, f_{s\_cfar}, w)$ and corrects the transmission phase due to time-division transmission on the basis of the distance index $k_{\_cfar}$ and the Doppler frequency index $f_{s\_cfar}$ output from CFAR unit 213. For example, signal corrector 214 multiplies the wth virtual reception array vector $h(k_{\_cfar}, f_{s\_cfar}, w)$ by a correction coefficient and calculates a corrected virtual reception array vector $h_{aftercel}(k_{\_cfar}, f_{s\_cfar}, w)$ as follows:

[4]

$$h_{aftercal}(k_{\_cfar}, f_{s\_cfar}, w) = C_{VA} \circ C_{TX}(f_{s\_cfar}) \circ h(k_{\_cfar}, f_{s\_cfar}, w)$$ (Expression 4).

Here, the symbol "∘" denotes the Hadamard product (the element-wise product).

In expression 4, $C_{VA}$ represents an array correction vector, which consists of Na×Nt elements as in the following expression:

[5]

$$C_{VA} = [h_{cal[1][1]}, h_{cal[2][1]}, \ldots, h_{cal[Na][1]}, h_{cal[1][2]}, h_{cal[2][2]}, \ldots, h_{cal[Na][2]}, \ldots, h_{cal[1][Nt]}, h_{cal[2][Nt]}, \ldots, h_{cal[Na][Nt]}]^T$$ (Expression 5).

In expression 5, $h\_cal_{[z][ND]}$ represents the array correction value for correcting the phase deviation and the amplitude deviation between the NDth transmission antenna and the zth reception antenna. The superscript T indicates vector transpose.

In addition, in expression 4, $C_{TX}(fs)$ represents the transmission phase correction vector, which consists of Na×Nt elements as in the following expression.

[6]

$$C_{TX}(f_s) = [Txcal^{(1)}(f_s), \ldots, Txcal^{(1)}(f_s), Txcal^{(2)}(f_s), \ldots, Txcal^{(2)}(f_s), \ldots, Txcal^{(Nt)}(f_s), \ldots, Txcal^{(Nt)}(f_s)]^T$$ (Expression 6).

By switching transmission antenna 108 in a time division manner, phase rotation depending on the Doppler frequency index fs occurs. $TxCAL^{(1)}(fs)$, $TxCAL^{(Nt)}(fs)$ are transmission phase correction coefficients that correct the phase rotations so that the phase of a transmission antenna other than a reference transmission antenna is the same as the phase of the reference transmission antenna. $C_{TX}(fs)$ is, for example, a vector in which each of $TxcAL^{(ND)}(fs)$ (where ND=1 to Nt) is repeated the number of times equal to the number of the reception antennas Na. Note that the transmission phase correction coefficient is not needed if the transmission signals are not transmitted from the multiple transmission antennas 108 in a time-division manner.

For example, as illustrated in FIG. 3, when switching from Tx #1 (for example, first transmission antenna 108) to Tx #2 (for example, second transmission antenna 108) . . . to Tx #Nt (for example, Ntth transmission antenna 108) sequentially occurs at each transmission period Tr, $TxCAL^{(1)}(fs)$ is given by using the transmission time of Tx #1 as a phase reference as follows:

$$TxCAL^{(1)}(f_s) = 1, \quad TxCAL^{(2)}(f_s) = \exp\left(-j\frac{2\pi f_s}{Nc}\frac{1}{Nt}\right),$$

$$TxCAL^{(Nt)}(f_s) = \exp\left(-j\frac{2\pi f_s}{Nc}\frac{Nt-1}{Nt}\right).$$ (Expression 7)

Signal corrector 214 outputs, for example, the corrected virtual reception array vector $h_{aftercal}(k_{\_cfar}, f_{s\_cfar}, w)$, the distance index $k_{\_cfar}$, and the Doppler frequency index $f_{s\_cfar}$ to direction estimator 215.

An example of the operation performed by signal corrector 214 has been described above.

In FIG. 1, direction estimator 215 performs a direction estimation process described below on the basis of the output from signal corrector 214.

For example, assuming that the azimuthal direction $\theta_u$ in the direction estimation evaluation function value $P_H(\theta_u, k_{\_cfar}, f_{s\_cfar}, w)$ is variable within a predetermined angle range, direction estimator 215 calculates the spatial profile and extracts a predetermined number of maximal peaks in the calculated spatial profile in a descending order. Thereafter, direction estimator 215 outputs the azimuthal direction of the maximal peak as the direction-of-arrival estimation value.

Note that for the direction estimation evaluation function value $P_H(\theta_u, k_{cfar}, f_{s\_cfar}, w)$, a variety of methods are used in accordance with a direction-of-arrival estimation algorithm. For example, the estimation method using an array antenna described in NPL 2 may be used.

For example, in the case where Nt×Na virtual reception arrays are linearly disposed at equal intervals $d_H$, a beamformer method can be expressed as follows:

[8]

$$P_H(\theta_u, k, fs, w) = |a^H(\theta_u) h_{aftercal}(k_{\_cfar}, f_{s\_cfar}, w)|^2$$ (Expression 8)

Alternatively, a method such as Capon or MUSIC may be employed in the same way.

In expression 8, the superscript H is the Hermitian transpose operator. In addition, $a(\theta_u)$ denotes a direction vector (for example, a column vector with Nt×Na elements) of the virtual reception array for the coming wave in the azimuth direction $\theta_u$.

The direction vector $a(\theta_u)$ of the virtual reception array (refer to, for example, expression 8) is determined in accordance with the arrangement of the transmission/reception array antennas.

Figure 6:
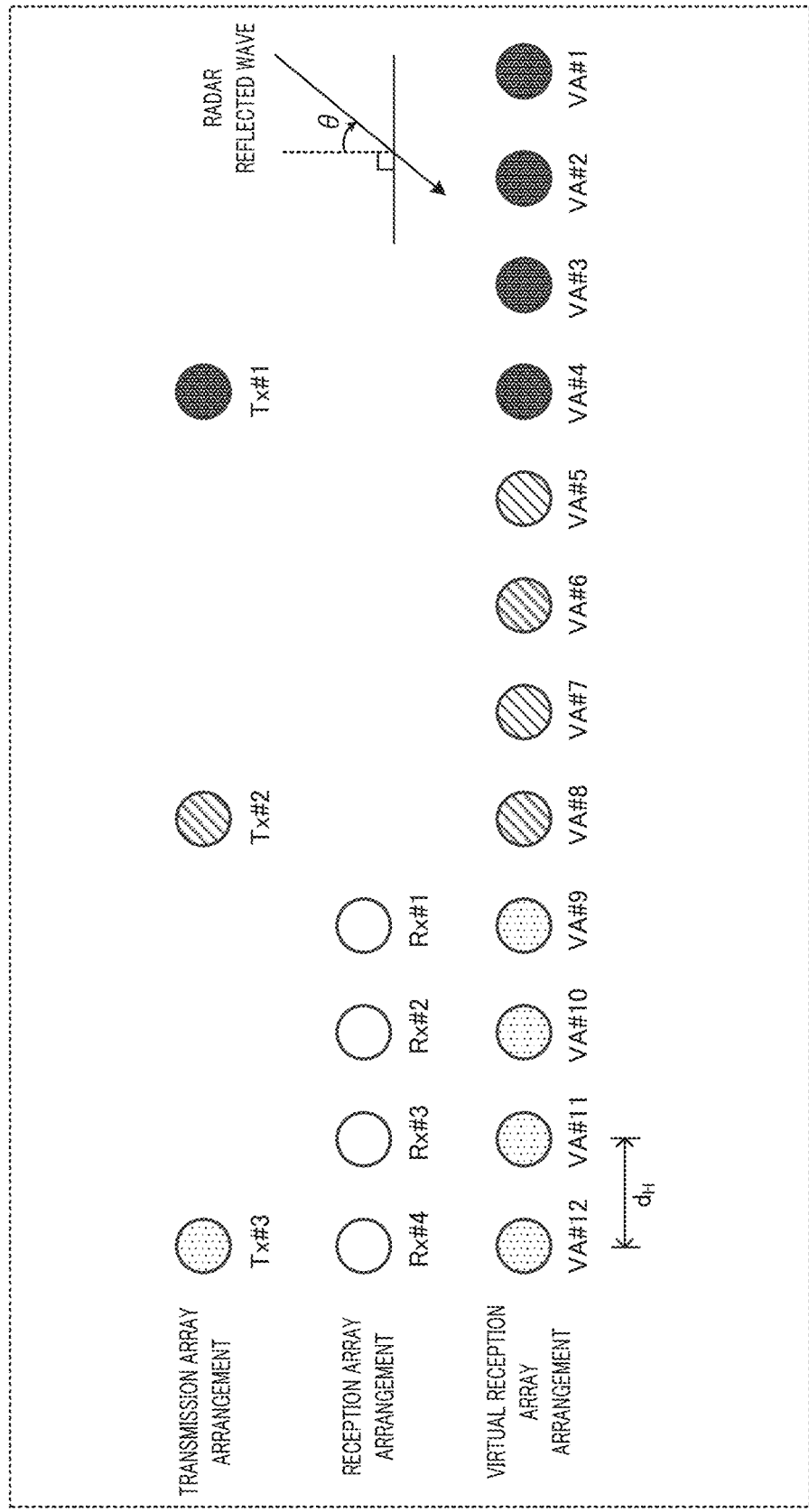
FIG. 6 illustrates an example of the arrangement of transmission/reception antennas and a virtual reception array.

For example, as illustrated in FIG. 6, the case is described in which the number of transmission antennas Nt=3 (for example, Tx #1, Tx #2, and Tx #3), the number of reception antennas Na=4 (for example, Rx #1, Rx #2, Rx #3, and Rx #4), and Nt×Na (=12) virtual reception arrays (for example, VA #1 to VA #12) are arranged in a straight line at equal intervals $d_H$. In the case illustrated in FIG. 6, the direction vector $a(\theta_u)$ of the virtual reception array is given, for example, as follows:

$$a(\theta_u) = \begin{bmatrix} 1 \\ \exp\{-j2\pi d_H \sin\theta_u / \lambda\} \\ \vdots \\ \exp\{-j2\pi(N_t N_a - 1) d_H \sin\theta_u / \lambda\} \end{bmatrix}. \quad \text{(Expression 9)}$$

In addition, the azimuth direction $\theta_u$ is a vector that varies with a predetermined azimuth interval $\beta_1$ within the azimuth range in which the direction of arrival is estimated. For example, $\theta_u$ is set as follows:

$\theta_u = \theta\min + u\beta_1, u=0, \ldots, NU,$ $NU = \text{floor}[(\theta\max - \theta\min)/\beta_1] + 1,$ where floor(x) is a function that returns the maximum integer value not exceeding real number x.

Note that the time information k described above may be converted into distance information and be output. To convert the time information k into distance information R(k), the following expression can be used:

$$R(k) = k \frac{T_w C_0}{2L}, \quad \text{(Expression 10)}$$

where Tw is the code transmission interval, L is the pulse code length, and $C_0$ is the speed of light.

In addition, the Doppler frequency information may be converted into a relative velocity component and be output. To convert the Doppler frequency index $f_s$ into a relative velocity component $v_d(f_s)$, the following expression may be used:

$$v_d(f_s) = \frac{\lambda}{2} f_s \Delta_f \quad \text{(Expression 11)}$$

where λ is the wavelength of the carrier frequency of the RF signal output from transmission radio unit 107, and $\Delta_f$ is the Doppler frequency interval in the FFT process performed by Doppler analyzer 212. For example, according to the present embodiment, $\Delta_f = 1/(NtNcTr)$.

An example of the operation performed by direction estimator 215 has been described above.

In FIG. 1, aliasing determiner 216 determines whether aliasing of the Doppler frequency is present on the basis of the information input from direction estimator 215. For example, aliasing determiner 216 outputs the positioning result including the presence/absence of aliasing of the Doppler frequency in addition to the arrival time information (that is, the distance information) and the Doppler frequency information (that is, the relative velocity information). Note that an example of the method for determining whether aliasing of the Doppler frequency is present in aliasing determiner 216 is described below.

[Example of Operation Performed by Radar Apparatus 10]

An example of the operation performed by the above-described radar apparatus 10 is described below.

Figure 7:
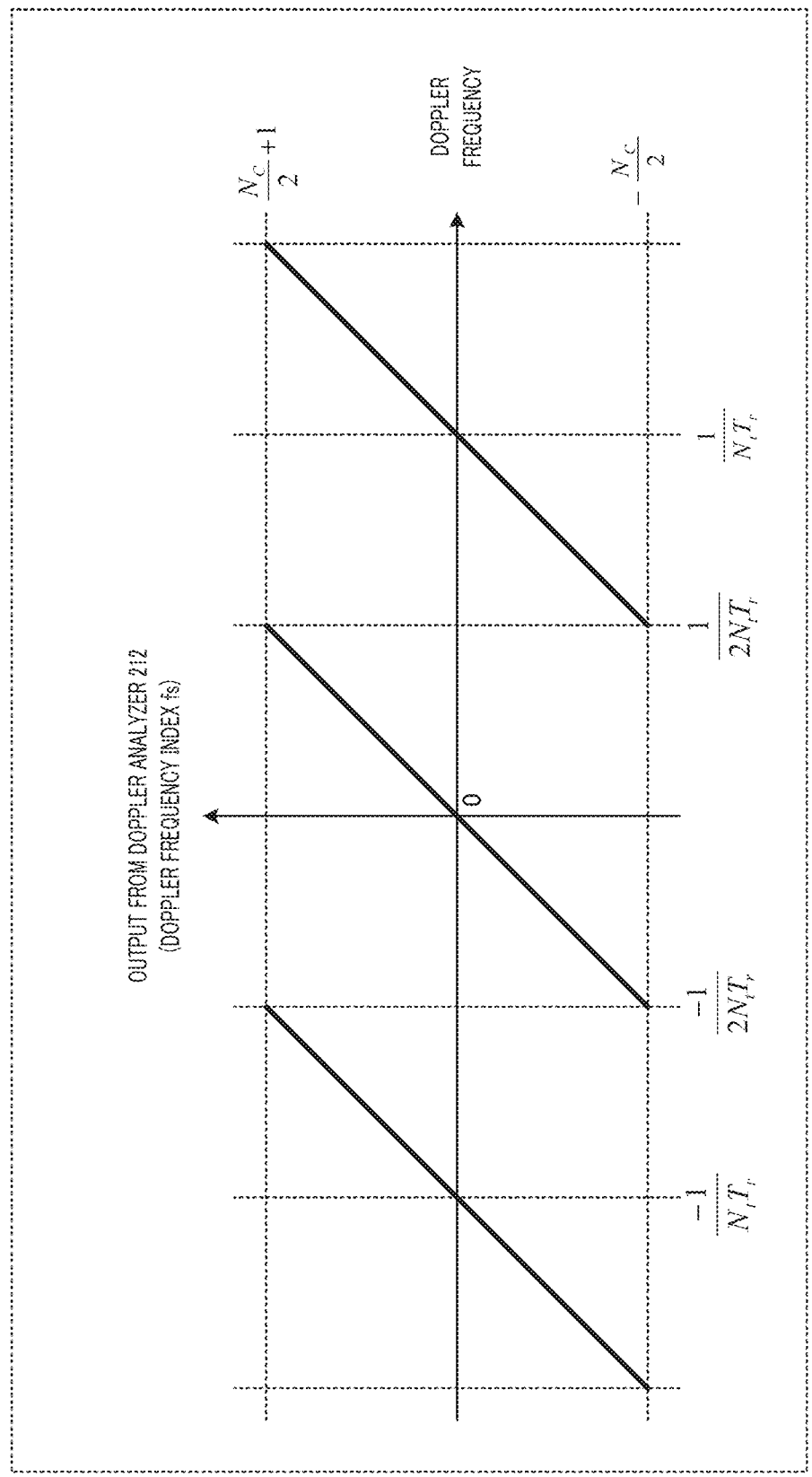
FIG. 7 illustrates an example of the relationship between a Doppler frequency and the output of a Doppler analyzer according to an embodiment.

FIG. 7 illustrates an example of the relationship between the Doppler frequency index (corresponding to the ordinate) output from Doppler analyzer 212 and the Doppler frequency component signal (corresponding to the abscissa) input to Doppler analyzer 212.

If the Doppler frequency detected by Doppler analyzer 212 exceeds the Doppler frequency range that satisfies the sampling theorem (for example, −1/(2Nt×Tr) to 1/(2Nt×Tr)), Doppler analyzer 212 outputs the Doppler frequency index fs aliased within the range of (−Nc/2) to (Nc/2+1), as illustrated in FIG. 7.

Note that the Doppler frequency index detected when the Doppler frequency fd in the following range (for example, referred to as a "primary aliasing range") is aliased is referred to as "fs_alias1":

$-1/(Nt \times Tr) \leq fd < -1/(2Nt \times Tr)$ or $1/(2Nt \times Tr) \leq fd < 1/(Nt \times Tr).$ In this case, for example, signal corrector 214 sets the transmission phase correction coefficient TxCAL(fs) to $\text{TxCAL}^{(1)}(\text{fs\_alias1}), \ldots, \text{TxCAL}^{(Nt)}(\text{fs\_alias1})$ on the basis of the Doppler frequency index fs_alias1.

Note that this transmission phase correction is not based on the original Doppler frequency index (hereafter referred to as fs_true), but on the Doppler frequency index fs_alias1 obtained by a Doppler frequency within the primary aliasing range being aliased. For this reason, the transmission phase correction is incorrect phase correction.

Figure 8:
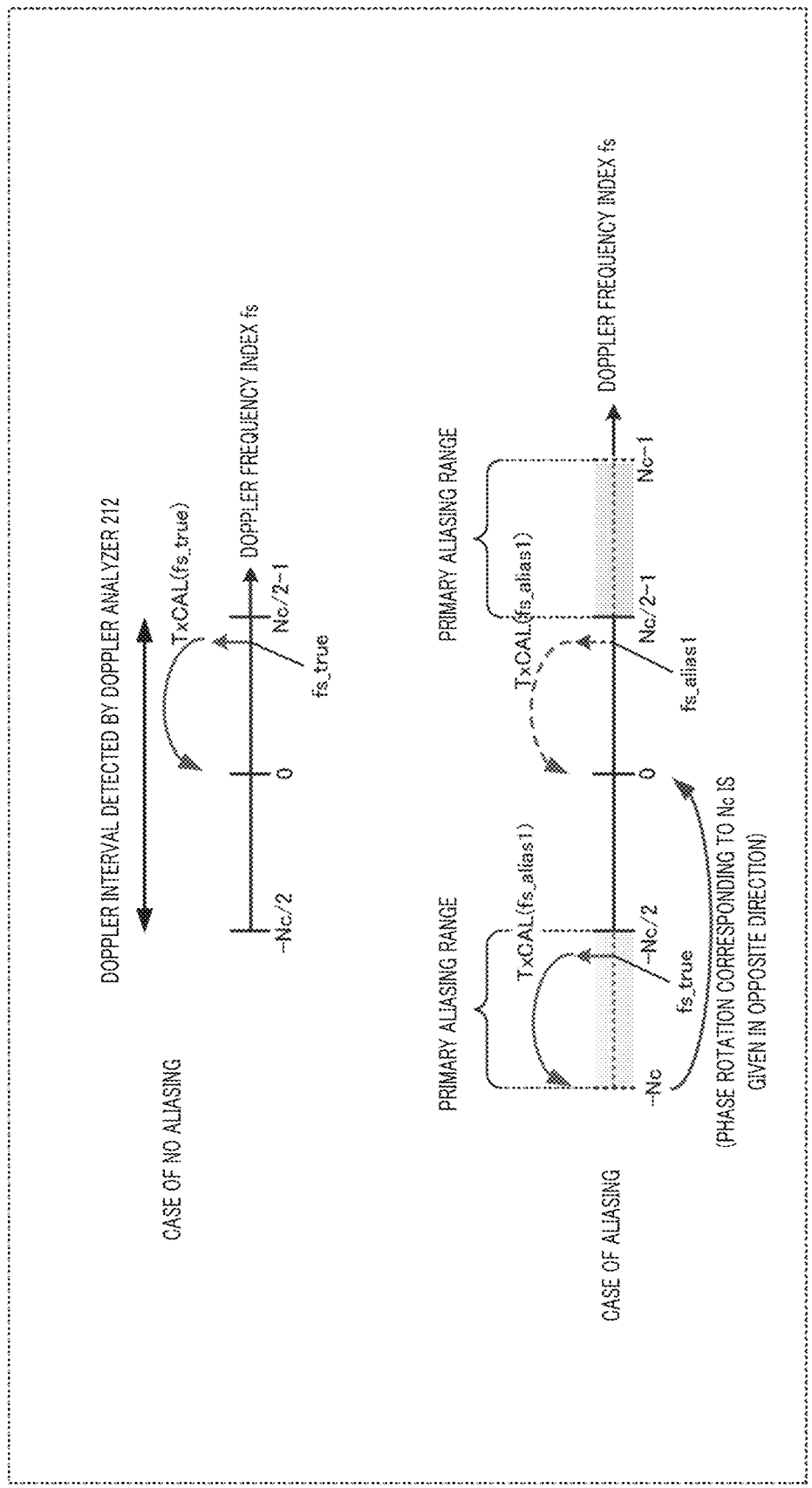
FIG. 8 illustrates an example of a transmission phase correction.

For example, FIG. 8 illustrates an example of transmission phase correction when Doppler frequency aliasing is not present and transmission phase correction when Doppler frequency aliasing in the primary aliasing range is present.

FIG. 8 illustrates an example in which the Doppler frequency fs_true detected by Doppler analyzer 212 is included in the range of −Nc to −Nc/2 (that is, in the primary aliasing range). That is, in FIG. 8, the Doppler frequency index fs_alias1 is aliased in the range of 0 to (Nc/2)−1 and is detected. Consequently, fs_alias1 illustrated in FIG. 8 is a positive value.

Signal corrector 214 sets a phase rotation amount on the basis of, for example, the transmission phase correction coefficient TxCAL(fs) such that the phase difference caused by the switching time difference between transmission antennas 108 becomes zero between the transmission antennas 108.

For example, in the case where aliasing is not present in FIG. 8, in signal corrector 214, the transmission phase correction coefficient TxCAL(fs_true) sets the phase rotation amount for a Doppler frequency signal that is not aliased in accordance with the Doppler frequency index fs_true so as to match the phase of the reference transmission antenna (the phase corresponding to, for example, the Doppler frequency index fs=0).

In contrast, in the case where aliasing is present in FIG. 8, the original Doppler frequency index fs_true corresponds to fs_alias1−Nc. However, in signal corrector 214, the transmission phase correction coefficient TxCAL(fs_alias1) is set to the amount of phase rotation for the signal having the aliased Doppler frequency in accordance with the aliased Doppler frequency fs_alias1. Therefore, in FIG. 8, in signal corrector 214, when aliasing is present, the transmission phase correction coefficient TxCAL(fs_alias1) is set to a phase rotation amount so that the original Doppler frequency index fs_true within the primary aliasing range is the same as −Nc.

Therefore, when fs_alias1 is positive, signal corrector 214 lacks the correction to further advance the phase by $2\pi$ in the Doppler sampling period (that is, the correction to add +Nc to the Doppler frequency index illustrated in FIG. 8). That is, when fs_alias1 is positive, signal corrector 214 performs an incorrect correction to delay the phase by $2\pi$ from the phase of the reference transmission antenna in the Doppler sampling period (that is, incorrect correction that results in an error of −Nc in the Doppler frequency index fs). That is, when aliasing is present in FIG. 8, a phase error of $-2\pi$ (or a Doppler frequency index error of −Nc) is included as a transmission phase correction error.

As described above, in the transmission phase correction illustrated in FIG. 8, signal corrector 214 incorrectly performs correction so that the phase difference caused by the switching time difference between transmission antenna 108 is $-2\pi$ when Doppler frequency aliasing is present. That is, as illustrated in FIG. 8, when fs_alias1 is positive, signal corrector 214 can match the phase to the phase of the reference transmission antenna if, in addition to performing the correction by the transmission phase correction coefficient TxCAL (for example, correction in the negative direction), phase rotation corresponding to Nc in the direction opposite to the direction of correction by TxCAL (for example, the positive direction) is added.

When fs_alias1 is negative (not illustrated), an incorrect correction is made so as to advance the phase by $2\pi$ in the Doppler sampling period (that is, an incorrect correction that results in an error of +Nc in the Doppler frequency index), which is reverse to the correction made when fs_alias1 is positive in FIG. 8.

Therefore, in order for signal corrector 214 to correct the transmission phase for the original Doppler frequency, for the transmission phase correction coefficients TxCAL$^{(1)}$ (fs_alias1), TxCAL$^{(Nt)}$(fs_alias1), the following additional phase correction coefficient TxCAL_ALIAS$^{(ND)}$(fs_alias1) for the aliased Doppler frequency (for example, fs_alias1) is required in consideration of the time difference caused by time-division transmission:

[12]

$$TxCal\_ALIAS^{(ND)}(f_{s\_alias1}) = TxCAL^{(ND)} \text{sign}(f_{s\_alias1}) Nc) \quad \text{(Expression 12)}$$

where ND=1, . . . , Nt.

In expression 12, sign(x) is a function that returns the positive or negative sign (− or +) of a real number x.

Note that in order to use the additional phase correction coefficient TxCAL_ALIAS$^{(ND)}$(fs_alias1) for the aliased Doppler frequency, radar apparatus 10 (for example, aliasing determiner 216) needs to determine whether the Doppler frequency detected by Doppler analyzer 212 is an aliased and detected Doppler frequency.

Accordingly, according to an embodiment of the present disclosure, an example of a MIMO array arrangement is described for which aliasing determiner 216 can determine whether the Doppler frequency detected in Doppler analyzer 212 is an aliased and detected Doppler frequency.

At this time, if the additional phase correction coefficient TxCAL_ALIAS)$^{(ND)}$(fs_alias1) for the aliased Doppler frequency is not used, direction estimator 215 performs the direction estimation process with the following transmission phase correction error included:

[13]

$$TxCAL^{(ND)}(-\text{sign}(f_{s\_alias1})Nc) \quad \text{(Expression 13)}$$

As an example, assume that the number of transmission antennas Nt=3 and the number of reception antennas Na=4. When transmission antennas 108 are sequentially switched in the order of Tx #1, Tx #2, and Tx #3, direction estimator 215 performs the direction estimation process with the following transmission phase correction error included: Case where fs_alias1 is positive:

$$TxCAL^{(1)}(-Nc) = 1, \quad \text{(Expression 14)}$$
$$TxCAL^{(2)}(-Nc) = \exp\left(j\frac{2\pi}{3}\right),$$
$$TxCAL^{(3)}(-Nc) = \exp\left(j\frac{4\pi}{3}\right)$$

Case where fs_alias1 is negative:

$$TxCAL^{(1)}(Nc) = 1, \quad \text{(Expression 15)}$$
$$TxCAL^{(2)}(Nc) = \exp\left(-j\frac{2\pi}{3}\right),$$
$$TxCAL^{(3)}(Nc) = \exp\left(-j\frac{4\pi}{3}\right)$$

In addition, for example, when transmission antennas 108 are sequentially switched in the order of Tx #1 to Tx #Nt, direction estimator 215 performs the direction estimation process with the following transmission phase correction error included: Case where fs_alias1 is positive:

$$TxCAL^{(1)}(-Nc) = 1, TxCAL^{(2)}(-Nc) = \exp\left(j\frac{2\pi}{Nt}\right), \quad \text{(Expression 16)}$$
$$\ldots, TxCAL^{(Nt)}(-Nc) = \exp\left(j\frac{2\pi(Nt-1)}{Nt}\right)$$

Case where fs_alias1 is negative:

$$TxCAL^{(1)}(Nc) = 1, TxCAL^{(2)}(Nc) = \exp\left(-j\frac{2\pi}{Nt}\right), \quad \text{(Expression 17)}$$
$$\ldots, TxCAL^{(Nt)}(Nc) = \exp\left(-j\frac{2\pi(Nt-1)}{Nt}\right)$$

The effect of these transmission phase correction errors on the directional estimation errors can be examined by, for example, performing the spatial Fourier transform on the TxCAL vector (for example, referred to as TxCALVec). The TxCAL vector is generated by arranging the transmission phase correction errors (refer to, for example, expression 13) corresponding to transmission antennas 108 used to obtain the received signals of the virtual antenna elements when the virtual reception array arrangement is viewed sequentially in order from one end (for example, the right end of FIG. 6) to the other (for example, the left end of FIG. 6).

As an example, when the virtual reception array arrangement illustrated in FIG. 6 is sequentially arranged in the order from the right end to the left end, the virtual antenna elements are VA #1, VA #2, VA #3, VA #4, VA #5, VA #6, VA #7, VA #8, VA #9, VA #10, VA #11, and VA #12. In addition, the transmission antenna numbers of the transmission antennas used to obtain received signals of the virtual reception array in the order corresponding to these virtual antenna elements are Tx #1, Tx #1, Tx #1, Tx #1, Tx #2, Tx #2, Tx #2, Tx #2, Tx #3, Tx #3, Tx #3, and Tx #3. Therefore, in the case illustrated in FIG. 6 (for example, in the case of expression 14 or expression 15), the TxCAL vector is given by the following expression:

$$TxCALVec = \Big[1, 1, 1, 1, \exp\Big(\pm j\frac{2\pi}{3}\Big), \exp\Big(\pm j\frac{2\pi}{3}\Big), \\ \exp\Big(\pm j\frac{2\pi}{3}\Big), \exp\Big(\pm j\frac{2\pi}{3}\Big), \exp\Big(\pm j\frac{4\pi}{3}\Big), \\ \exp\Big(\pm j\frac{4\pi}{3}\Big), \exp\Big(\pm j\frac{4\pi}{3}\Big), \exp\Big(\pm j\frac{4\pi}{3}\Big)\Big].$$ (Expression 18)

Figure 9:
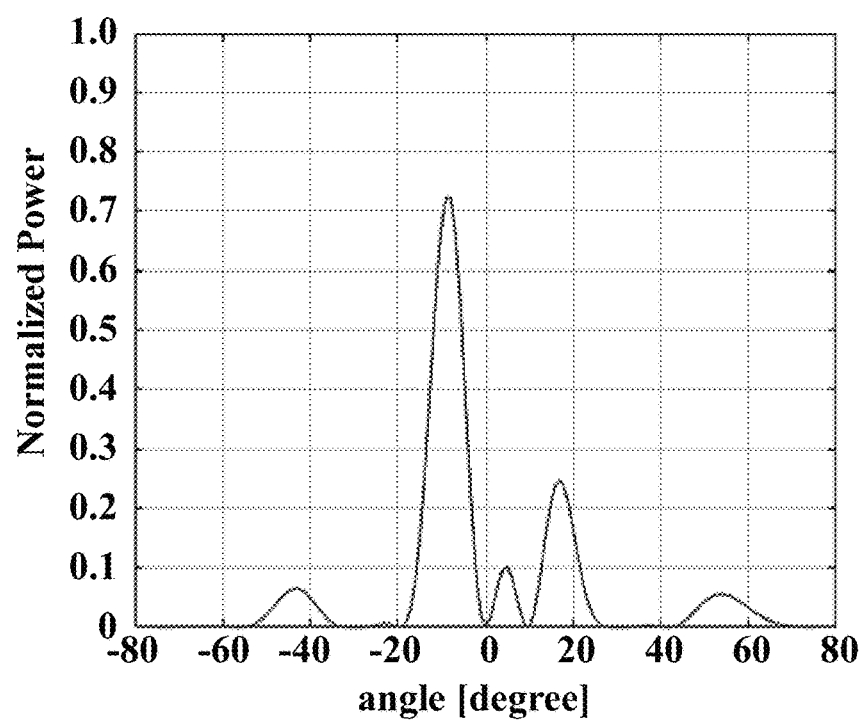
FIG. 9 illustrates an example of a spatial spectral response of a TxCAL vector according to an embodiment.
Figure 9:
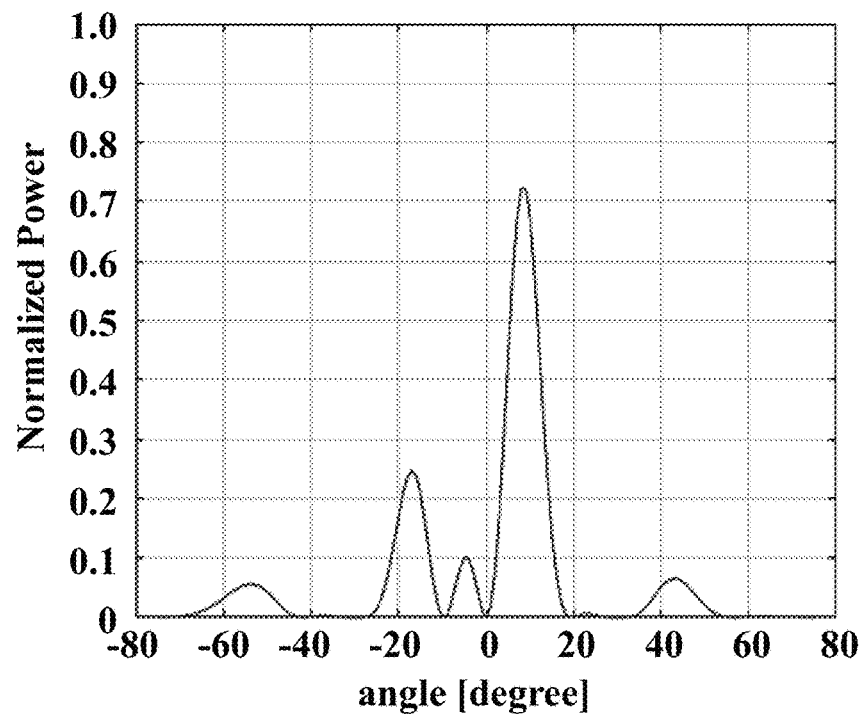

FIG. 9 illustrates an example of the spatial spectral response obtained by performing the spatial Fourier transform on the TxCAL vector (TxCALVec). As can be seen from FIG. 9, when fs_alias1 is positive, the peak direction appears in a negative region from the 0-degree direction. When fs_alias1 is negative, the peak direction appears in a positive region from the 0-degree direction.

Figure 10:
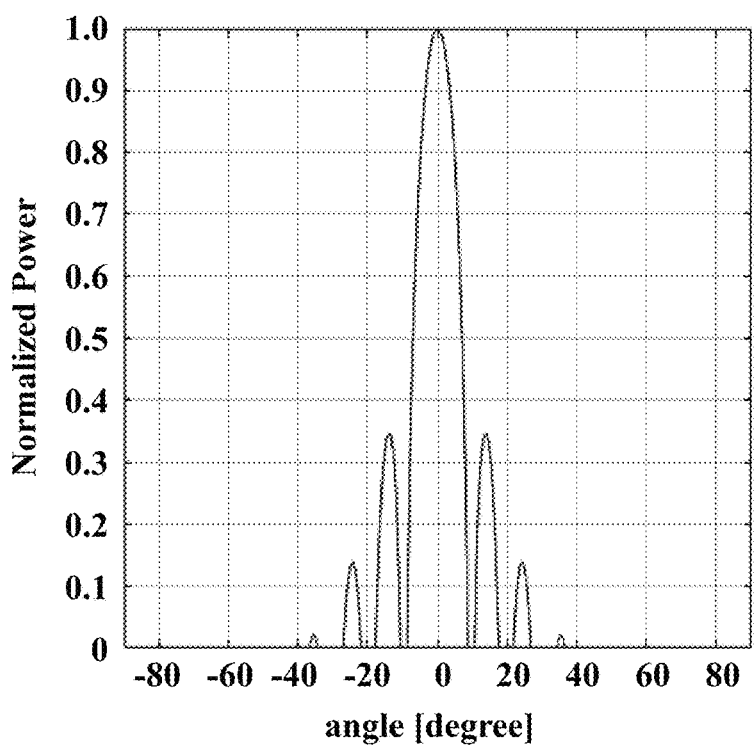
FIG. 10 illustrates an example of a spatial spectral response of a TxCAL vector according to an embodiment.
Figure 10:
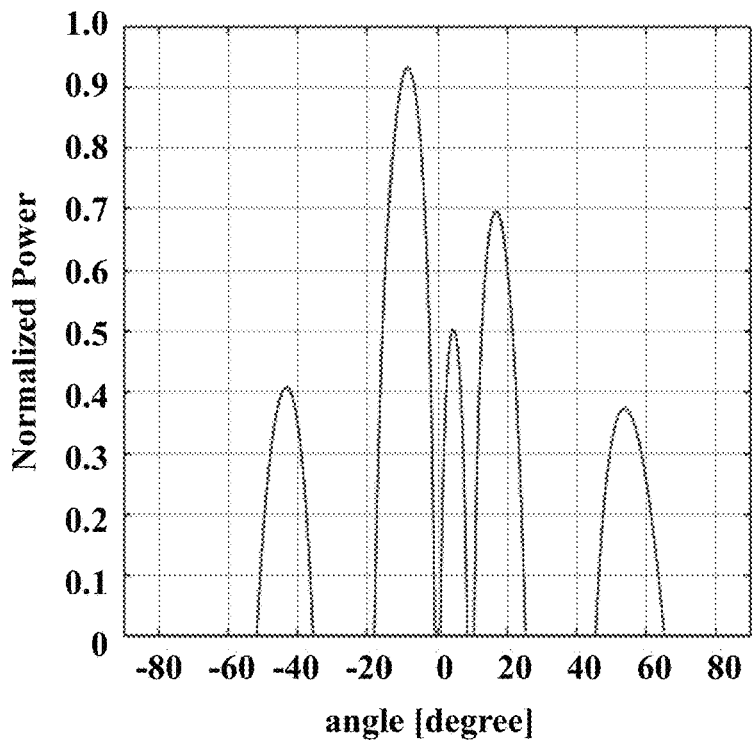

FIG. 10 illustrates an example of the spatial spectral response when the Fourier method is used in direction estimator 215 for a Doppler frequency index when aliasing is not present and a Doppler frequency index when aliasing is present (for example, in the case of fs_alias1). As can be seen from FIG. 10, in the case of a Doppler frequency index with no aliasing, a peak appears for the target that exists in the frontal direction (for example, the 0-degree direction). In contrast, when aliasing is present (fs_alias1 is positive), the peak direction is shifted by about −9 degrees from 0 degrees, reflecting the spatial spectral response of the TxCAL vector (refer to, for example, FIG. 9).

As described above, when aliasing of Doppler frequency is present, the peak level in the direction estimation result varies in accordance with the spatial spectral response (that is, referred to as the spatial Fourier response or the spatial frequency spectral response) of the TxCAL vector TxCALVec. Note that in FIG. 10, the peak level of the spatial spectrum in the direction estimation when aliasing is not present is substantially the same as the peak level of the spatial spectrum in the direction estimation when aliasing is not present.

For this reason, according to an embodiment of the present disclosure, for example, an array antenna arrangement is used in which the peak level of the spatial spectral response of the TxCAL vector TxCALVec is significantly decreased when the Doppler frequency aliasing is present, as compared when the Doppler frequency aliasing is not present. In this manner, aliasing determiner 216 can determine whether the Doppler frequency of the target is an aliased signal.

[MIMO Array Arrangement Conditions]

An example of the conditions for MIMO array arrangement is described below.

An array antenna arrangement (for example, MIMO array arrangement) in which the peak level in the spatial spectrum of the TxCAL vector TxCALVec is significantly decreased when aliasing is present as compared with when aliasing is not present is, for example, an arrangement in which the variation of the transmission phase correction error (that is, the phase change) for transmission antennas 108 each corresponding to one of the elements of TxCALVec does not occur at a constant period as in expression 18. That is, the transmission/reception array antenna arrangement according to the embodiment of the present disclosure is an arrangement such that the variation of the transmission phase correction error has randomness.

For example, a MIMO array arrangement is employed in which in the sequence of the virtual reception array arrangement (for example, the sequence in the direction from one end to the other), the portion where transmission antennas 108 used for transmitting the transmission signal are continuously switched (that is, the low-frequency component of the spatial frequency spectrum) and the portion where transmission antennas 108 used to transmit the signals are sequentially switched (that is, the high-frequency component of the spatial frequency spectrum) are mixed. Such a MIMO array arrangement satisfies, for example, condition 1 described below.

Condition 1

For example, in a transmission array antenna including Nt transmission antennas 108 arranged in a straight line, let each of $D_{Tx(1, 2)}$, $D_{Tx(2, 3)}$, ..., and $D_{Tx(Nt-1, Nt)}$ be the antenna spacing between adjacent transmission antennas 108 (that is, the element spacing). Then, for example, $D_{Tx(1, 2)}$ is the antenna spacing between Tx #1 and Tx #2. The same applies to other antenna spacing.

In addition, for example, in a reception array antenna including Na reception antennas 202 arranged in a straight line, let each of $D_{Rx(1, 2)}$, $D_{Rx(2, 3)}$, ..., and $D_{Rx(Na-1, Na)}$ be the antenna spacing between adjacent reception antennas 202 (that is, the element spacing). Then, for example, $D_{Rx(1, 2)}$ is the antenna spacing between Rx #1 and Rx #2. The same applies to other antenna spacing.

For example, the antenna spacing in the transmission array antenna is set to gradually increase from one end point (that is, the array end point) toward the other array end point. In contrast, the antenna spacing in the reception array antenna is set to gradually decrease from one array end point toward the other. That is, the antenna spacing in the transmission array antenna and the antenna spacing in the reception array antenna have the following relationship:

$D_{Tx(1,2)} \geq D_{Tx(2,3)} \geq \ldots \geq D_{Tx(Nt-1,Nt)}$, and $D_{Rx(1,2)} \leq D_{Rx(2,3)} \leq \ldots \leq D_{Rx(Na-1,Na)}$.

Alternatively, the antenna spacing in the transmission array antenna is set to gradually decrease from one array end point to the other array end point. In contrast, the antenna spacing in the reception array antenna is set to gradually increase from one array end point to the other. That is, the antenna spacing in the transmission array antenna and the antenna spacing in the reception array antenna have the following relationship:

$D_{Tx(1,2)} \leq D_{Tx(2,3)} \leq \ldots \leq D_{Tx(Nt-1,Nt)}$, and $D_{Rx(1,2)} \geq D_{Rx(2,3)} \geq \ldots \geq D_{Rx(Na-1,Na)}$.

In this way, the antenna spacing between adjacent transmission antennas in the plurality of transmission antennas 108 included in the transmission array antenna increases from one side toward the other in the direction (for example, the horizontal direction, etc.) in which the transmission array antennas are disposed. In addition, the antenna spacing between adjacent transmission antennas in the plurality of reception antennas 202 included in the reception array antenna decreases from the above-mentioned one side toward the other.

If the antenna spacing that are the same (that is, that has an equal sign relationship) are consecutive, the periodicity is likely to appear in the spatial frequency spectrum components. For this reason, the number of consecutive antenna spacing having the equal sign relationship may be set to, for example, less than or equal to two. Note that the number of consecutive antenna spacing having the equal sign relationship is not limited to less than or equal to two.

Figure 11:
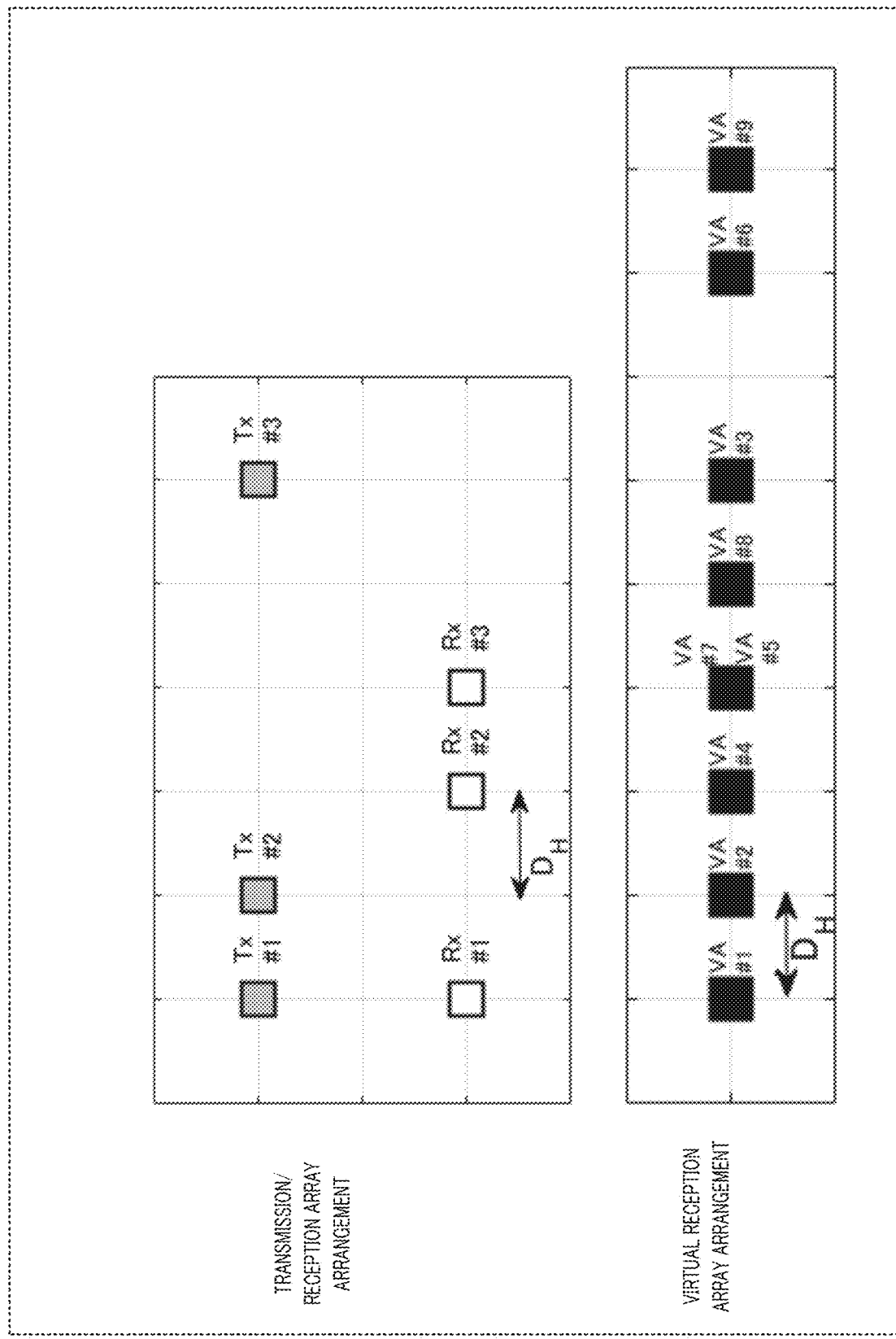
FIG. 11 illustrates an example of an arrangement of transmission/reception antennas and a virtual reception array according to an embodiment.

FIG. 11 illustrates an example of a MIMO array arrangement and a virtual reception array arrangement that satisfy (Condition 1). In FIG. 11, the number of transmission antennas Nt=3, and the number of reception antennas Na=3. Note that the number of transmission antennas Nt and the number of reception antennas Na are not limited to the example illustrated in FIG. 11.

The virtual reception array arrangement can be given using the positions of transmission antennas 108 that constitute the transmission array antenna (for example, the positions of the feeding points) and the positions of reception antennas 202 that constitute the reception array antenna (for example, the positions of the feeding points) as follows:

$$\begin{cases} X_{V\_\#k} = (X_{T\_\#[mod(k-1,Nt)+1]} - X_{T\_\#1}) + (X_{R\#[ceil(k/Na)]} - X_{R\_\#1}) \\ Y_{V\_\#k} = (Y_{T\_\#[mod(k-1,Nt)+1]} - Y_{T\_\#1}) + (Y_{R\#[ceil(k/Na)]} - Y_{R\_\#1}) \end{cases}$$ (Expression 19)

In expression 19, $(X_{T\_\#n}, Y_{T\_\#n})$ (n=1, ..., Nt) represents the position coordinates of transmission antenna 108 constituting the transmission array antenna, and $(X_{R\_\#m}, Y_{R\_\#m})$ (m=1, ..., Na) represents the position coordinates of reception antenna 202 constituting the reception array antenna. Furthermore, $(X_{V\_\#k}, Y_{V\_\#k})$ (k=1, ..., Nt×Na) represents the position coordinates of the virtual antenna element constituting the virtual reception array antenna.

Note that in expression 19, VA #1 represents the positional reference (0, 0) of the virtual reception array.

By using the position coordinates $(X_{T\_\#1}, Y_{T\_\#1})$ of Tx #1 as the reference, the position coordinates of transmission antennas 108 (Tx #1, Tx #2, and Tx #3) constituting the transmission array antenna illustrated in FIG. 11 are given. The position coordinates $(X_{T\_\#2}, Y_{T\_\#2})$ of Tx #2=$(X_{T\_\#1}+D_H, Y_{T\_\#1})$, and the position coordinates $(X_{T\_\#3}, Y_{T\_\#3})$ of Tx #3=$(X_{T\_\#1}+5D_H, Y_{T\_\#1})$.

In addition, by using the position coordinates $(X_{R\_\#1}, Y_{R\_\#1})$ of Rx #1 as the reference, the position coordinates of reception antennas 202 (for example, Rx #1, Rx #2, and Rx #3) constituting the reception array antenna illustrated in FIG. 11 are given. The position coordinates $(X_{R\_\#2}, Y_{R\_\#2})$ of Rx #2=$(X_{R\_\#1}+2D_H, Y_{R\_\#1})$, and the position coordinates $(X_{R\_\#3}, Y_{R\_\#3})$ of Rx #3=$(X_{R\_\#1}+3D_H, Y_{R\_\#1})$.

In FIG. 11, the antenna spacing $D_{Tx(1, 2)}$ between Tx #1 and Tx #2 is $D_H$, and the antenna spacing $D_{Tx(2, 3)}$ between Tx #2 and Tx #3 is $4D_H$. In addition, in FIG. 11, the antenna spacing $D_{Rx(1, 2)}$ between Rx #1 and Rx #2 is $2D_H$, and the antenna spacing $D_{Rx(2, 3)}$ between Rx #2 and Rx #3 is $D_H$.

Therefore, in the transmission/reception antenna arrangement illustrated in FIG. 11, $D_{Tx(1, 2)} \leq D_{Tx(2, 3)}$, and $D_{Rx(1, 2)} \geq D_{Rx(2, 3)}$, which satisfy (Condition 1) described above.

Due to the arrangement of the transmission/reception array antennas, the position coordinates $(X_{V\_\#1}, Y_{V\_\#1})$ to $(X_{V\_\#9}, Y_{V\_\#9})$ of the virtual reception arrays VA #1 to VA #9 are (0, 0), $(D_H, 0)$, $(5D_H, 0)$, $(2D_H, 0)$, $(3D_H, 0)$, $(7D_H, 0)$, $(3D_H, 0)$, $(4D_H, 0)$, and $(8D_H, 0)$, respectively.

Note that the transmission antenna number of the transmission antenna used to obtain the received signal of the xth virtual reception array can be calculated by, for example, mod(x−1, Nt)+1. "mod(x, y)" is a remainder operator, which outputs the remainder when x is divided by y.

In the case illustrated in FIG. 11, the transmission antenna numbers of the transmission antennas used to obtain the received signals of virtual antenna element VA #1 to VA #9 of the virtual reception array are Tx #1, Tx #2, Tx #3, Tx #1, Tx #2, Tx #3, Tx #1, Tx #2, and Tx #3, respectively.

In addition, when the virtual reception array arrangement illustrated in FIG. 11 is arranged, for example, in order from the left end to the right end, the virtual antenna elements are VA #1, VA #2, VA #4, VA #5 (with overlapping VA #7), VA #8, VA #3, VA #6, and VA #9. The transmission antenna numbers of transmission antennas 108 used to obtain the received signals of the virtual antenna elements arranged in this order are Tx #1, Tx #2, Tx #1, Tx #1 (with overlapping Tx #2), Tx #2, Tx #3, Tx #3, and Tx #3.

For example, when the virtual reception array arrangement illustrated in FIG. 11 is sequentially viewed in a direction from one end (for example, the left end) to the other end (for example, the right end), the transmission antenna numbers of transmission antennas 108 used to obtain received signals of the virtual antenna elements form a sequence of a mixture of part where Tx #3 continuously appears three times (that is, the low frequency component of the spatial frequency spectrum) and part where Tx #1 and Tx #2 are sequentially switched (that is, the high frequency component of the spatial frequency spectrum).

For example, the TxCAL vector (TxCALVec) consists of the transmission phase correction errors (refer to, for example, expression 13) arranged in an order corresponding to transmission antennas 108 used to obtain the received signals of the virtual reception array elements described above. For this reason, if aliasing of Doppler frequency occurs, a direction estimation error based on the TxCAL vector (TxCALVec) occurs.

Figure 12:
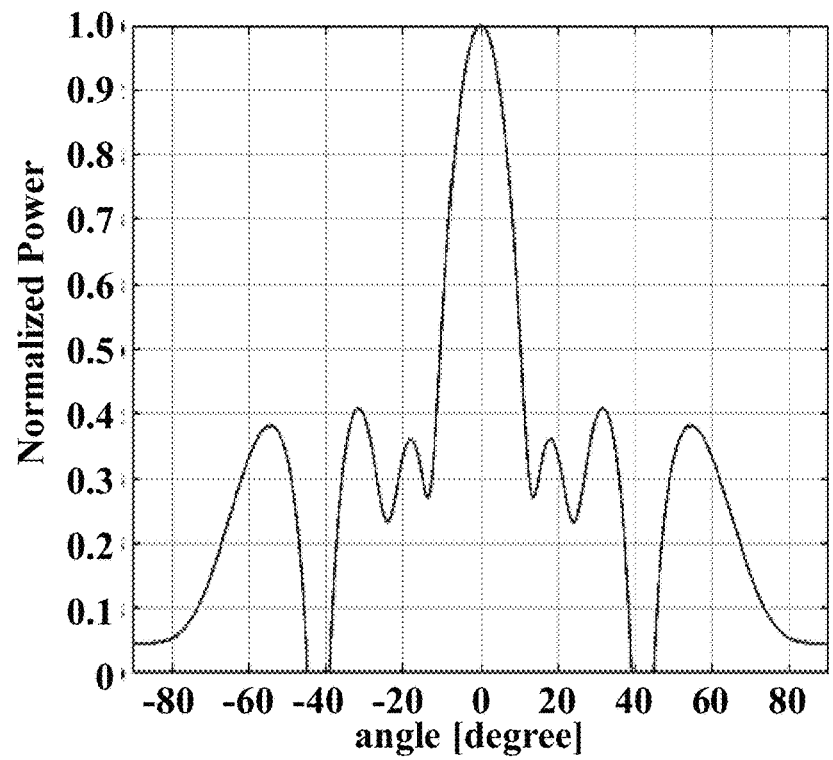
FIG. 12 illustrates an example of direction estimation results according to an embodiment.
Figure 12:
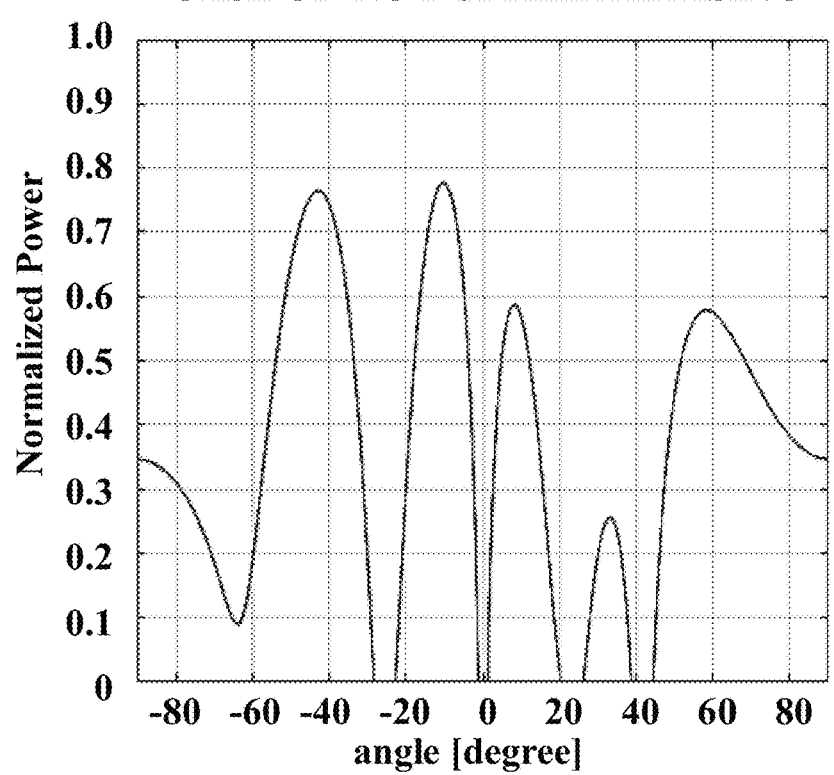

FIG. 12 illustrates an example of the direction estimation results when direction estimator 215 uses the beamformer method as the direction-of-arrival estimation algorithm for the transmission/reception antenna arrangement illustrated in FIG. 11. In FIG. 12, the output of a direction-of-arrival estimation evaluation function values in the horizontal ±90 degree range are plotted when the target true value is set to 0 degrees horizontally. In addition, in FIG. 12, $D_H=0.5\lambda$ in the MIMO array arrangement.

As can be seen from FIG. 12, when aliasing of Doppler frequency is present (that is, when a transmission phase correction error occurs), the peak level of the spatial spectrum in the direction estimation by the Fourier method is reduced by about 4.5 dB, as compared with the peak level when aliasing of Doppler frequency is not present (that is, when a transmission phase correction error does not occur).

For example, aliasing determiner 216 may use, as an index, a normalized peak power value that is obtained by normalizing the peak level of the spatial spectrum (for example, the maximum value of $P_H(\theta_u, k\_cfar, fs\_cfar, w)$)

by the power value of the virtual reception array vector (for example, PowerFT(k_cfar, fs_cfar, w)). For example, aliasing determiner 216 compares the normalized peak power value with a predetermined value Lev_Alias to determine whether aliasing of the Doppler frequency is present as follows:

$$\frac{\max_{\theta_u} P_H(\theta_u, k\_cfar, f_{s\_cfar}, w)}{PowerFT(k\_cfar, f_{s\_cfar}, w)} < \text{Lev\_Alias} \quad \text{(Expression 20)}$$

Note that the normalized peak power value in the range of 0 to 1 is output. Accordingly, the predetermined value Lev_Alias may be set to a positive number less than or equal to 1.

Note that the power value PowerFT(k_cfar, fs_cfar, w) of the virtual reception array vector is calculated using, for example, the wth corrected virtual reception array vector $h_{aftercal}$(k, fs, w) as follows:

[21]

$$PowerFT(k\_cfar, f_{s\_cfar}, w) = h_{aftercal}(k\_cfar, f_{s\_cfar}, w)^H h_{aftercal}(k\_cfar, f_{s\_cfar}, w) \quad \text{(Expression 21)}.$$

As indicated by expression 20, if the normalized peak power value is less than the predetermined value Lev_Alias, aliasing determiner 216 determines that aliasing of Doppler frequency is present. However, if the normalized peak power value is greater than or equal to the predetermined value Lev_Alias, aliasing determiner 216 determines that aliasing of Doppler frequency is not present.

For example, in the case of the MIMO array arrangement example illustrated in FIG. 11, if aliasing of Doppler frequency is present, the normalized power peak value is less than or equal to 0.4. Therefore, by setting Lev_Alias to, for example, 0.5 (or about 0.5), aliasing determiner 216 can improve the accuracy of determination of the presence of the aliasing of Doppler frequency.

In addition to outputting the arrival time information and Doppler frequency information as the positioning result, aliasing determiner 216 may output information as to whether aliasing of Doppler frequency is present, for example.

For example, if it is determined that aliasing of Doppler frequency is not present, the Doppler frequency index fs may be directly output as the Doppler frequency information. However, if it is determined that the aliasing of Doppler frequency is present, it is determined whether the Doppler frequency index fs>0. If the Doppler frequency index fs>0, the Doppler frequency index may be converted into fs−Nc and be output. If the Doppler frequency index fs<0, the Doppler frequency index may be converted into fs+Nc and be output. In this manner, radar apparatus 10 can correctly detect the Doppler frequency (the relative velocity).

As described above, in radar apparatus 10, the transmission array antenna includes a plurality of transmission antennas 108 arranged in a straight line in a predetermined direction, and the spacing between adjacent transmission antennas of the plurality of transmission antennas 108 is designed to increase from one side toward the other in the direction in which the transmission antennas are arranged in a straight line. In addition, in radar apparatus 10, the reception array antenna includes a plurality of reception antennas 202 arranged in a straight line in a predetermined direction, and the spacing between adjacent transmission antennas in the plurality of reception antennas 202 is designed to decrease from one side toward the other in the direction in which the reception antennas are arranged in a straight line.

This arrangement of transmission/reception antennas results in a MIMO array arrangement in which, in the sequence of the virtual reception array arrangement (for example, a sequence in the direction from one end to the other), transmission antennas 108 used for transmission of the transmission signal that are continuously switched by time division switching (that is, the low frequency component of the spatial frequency spectrum) and transmission antennas 108 used for transmission of the transmission signal sequentially that are sequentially switched (that is, the high frequency component of the spatial frequency spectrum) are mixed. In this way, for example, the transmission phase correction errors for transmission antennas 108 each corresponding to one of the elements of TxCALVec can be a mixture of part that is constant and part that varies sequentially. As a result, the peak level in the spatial frequency spectrum of the transmission phase error vector (for example, TxCALVec) corresponding to the arrangement of the transmission/reception array antennas of radar apparatus 10 can be reduced. That is, the above-described transmission/reception array antenna arrangement prevents the variation in the transmission phase correction error from occurring at a constant period and, thus, can increase the randomness.

This transmission/reception array antenna arrangement causes a difference in the peak level of the spatial spectral response in the direction estimation result between the case where aliasing of Doppler frequency is present (that is, the case where a transmission phase correction error is present) and the case where aliasing of Doppler frequency is not present (that is, the case where a transmission phase correction error is not present). Accordingly, radar apparatus 10 (for example, aliasing determiner 216 of radar receiver 200) can determine the presence of aliasing of a Doppler frequency of a reflected wave signal in Doppler analyzer 212 on the basis of the spatial spectrum of the reflected wave signal.

Therefore, even when, for example, a reflected wave signals outside the Doppler frequency range over which the Doppler frequency can be detected without aliasing comes from the target, radar apparatus 10 can reduce the detection error in the Doppler frequency (that is, the relative velocity) of the target. This allows the radar apparatus to correct the transmission phase on the basis of the correct Doppler frequency, thus reducing the detection error in target direction estimation.

As a result, according to the present embodiment, radar apparatus 10 can increase the target detection performance.

Note that the virtual reception array arrangement is not dependent on the positional relationship between the transmission/reception array antennas. For this reason, the positional relationship between the transmission antenna and the reception array antenna is not limited to the arrangement illustrated in FIG. 11, and any arrangement may be set. This also applies to the other transmission/reception antenna arrangements described below.

Furthermore, in the arrangement of the transmission array antennas and the reception array antennas illustrated in FIG. 11, the arrangement in the horizontal direction (the transverse direction in FIG. 11) may be changed to the arrangement in the vertical direction (the longitudinal direction in FIG. 11) (that is, the arrangement rotated by 90 degrees). Even in this case, the same effect as that of the arrangement illustrated in FIG. 11 can be obtained. This also applies to the other transmission/reception antenna arrangements described below.

Still furthermore, the arrangement of the transmission array antennas and the arrangement of the reception array antennas illustrated in FIG. 11 may be interchanged. That is, the reception array antenna arrangement illustrated in FIG. 11 may be used as the transmission array antenna arrangement, while the transmission array antenna arrangement illustrated in FIG. 11 may be used as the reception array antenna arrangement. Even when the arrangements of the transmission/reception array antennas are interchanged, the obtained virtual reception array arrangement remains unchanged and, thus, the same effect is obtained. This applies to the other transmission/reception antenna arrangements.

Variation 1 of Embodiment

Figure 13:
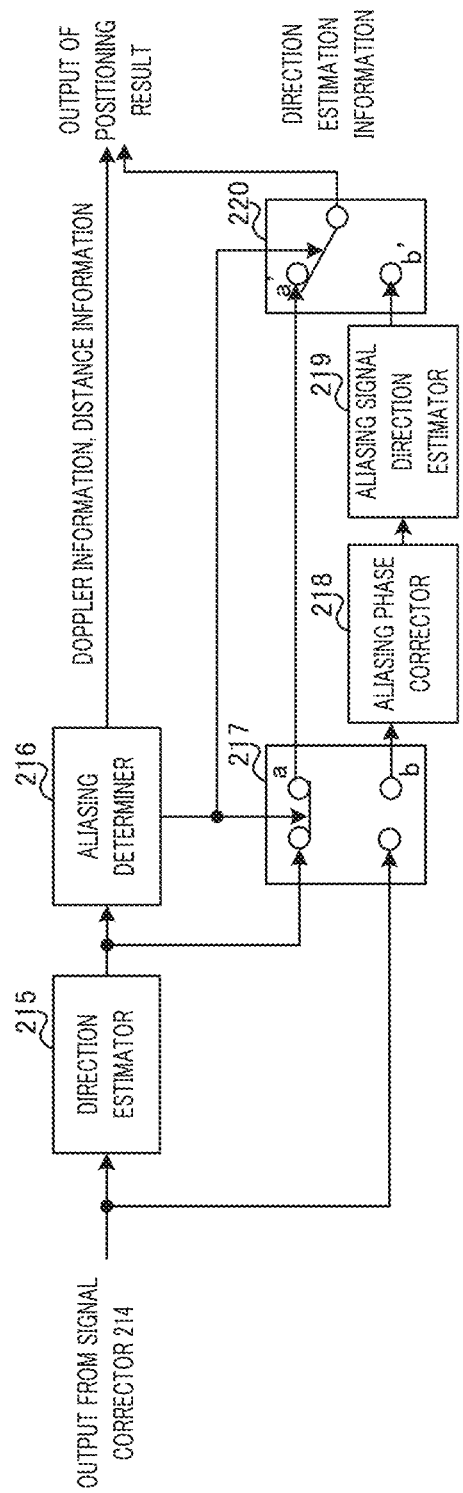
FIG. 13 illustrates a configuration example of part of a radar apparatus according to variation 1.

A configuration example illustrated in FIG. 13 may be used instead of the configurations of direction estimator 215 and aliasing determiner 216 of radar apparatus 10 illustrated in FIG. 1. FIG. 13 illustrates another example of the configuration of radar apparatus 10 illustrated in FIG. 1, which is the configuration downstream of signal corrector 214.

In FIG. 13, radar apparatus 10 includes switch 217, aliasing phase corrector 218, aliasing signal direction estimator 219, and switch 220 in addition to direction estimator 215 and aliasing determiner 216.

Switch 217 and switch 220 switch over to routes a and a', respectively, when the determination result indicating no aliasing is input from aliasing determiner 216, and switch over to routes b and b', respectively, when the determination result indicating the presence of aliasing is input from aliasing determiner 216.

For example, if aliasing determiner 216 illustrated in FIG. 13 determines that aliasing of Doppler frequency is not present, radar apparatus 10 outputs, as the positioning result, the direction estimation value (for example, the peak direction of the spatial spectral response and the peak power value) estimated in direction estimator 215 without using aliasing phase corrector 218 and aliasing signal direction estimator 219.

However, if aliasing determiner 216 illustrated in FIG. 13 determines that aliasing of Doppler frequency is present, aliasing phase corrector 218 and aliasing signal direction estimator 219 calculate a direction estimation value (the peak direction of the Fourier space spectrum and the peak power value) obtained by correcting the transmission phase correction error that occurs in signal corrector 214 due to the aliasing of Doppler frequency.

For example, as indicated by the following expression, aliasing phase corrector 218 multiplies each of the elements of the corrected virtual reception array vector $h_{aftercal}(k_{\_cfar}, fs_{\_cfar}, w)$ output from signal corrector 214 by one of the elements of an additional phase correction vector $C_{TxAlias}$(fs_cfar) for the aliased and detected Doppler frequency to calculate a virtual reception array vector $h_{TxAlias}(k_{\_cfar}, fs_{\_cfar}, w)$ for the aliasing Doppler:

[22]

$$h_{TxAliasCal}(k_{\_cfar}, fs_{\_cfar}, w) = C_{TxAlias}(fs_{\_cfar}) \circ h_{aftercal}(k_{\_cfar}, fs_{\_cfar}, w) \quad \text{(Expression 22)},$$

where ND=1, . . . , Nt.

In expression 22, $C_{TxAlias}$(fs_cfar) is an additional phase correction vector for aliasing and consists of Na×Nt elements, as indicated by in the following expression:

[23]

$$C_{TxAlias}(f_{s\_cfar}) = [TxCAL\_ALIAS^{(1)}(f_{s\_cfar}), \ldots, TxCAL\_ALIAS^{(1)}(f_{s\_cfar}), TxCAL\_ALIAS^{(2)}(f_{s\_cfar}), \ldots, TxCAL\_ALIAS^{(2)}(f_{s\_cfar}), \ldots, TxCAL\_ALIAS^{(Nt)}(f_{s\_cfar}), \ldots, TxCAL\_ALIAS^{(Nt)}(f_{s\_cfar})]^T \quad \text{(Expression 23)}.$$

In expression 23, each $TxCAL\_ALIAS^{(ND)}$(fs_cfar) repeats the number of times equal to the number of reception antennas Na to form a vector. In addition, $TxCAL\_ALIAS^{(ND)}$(fs_cfar) is the value indicated by expression 12.

Aliasing signal direction estimator 219 performs a direction estimation process similar to that performed by direction estimator 215 on the basis of the virtual reception array vector $h_{TxAlias}(k_{\_cfar}, fs_{\_cfar}, w)$ for Doppler aliasing, which is input from aliasing phase corrector 218. Aliasing signal direction estimator 219 calculates the direction estimation result (for example, the peak direction of the Fourier space spectrum and the peak power value) and outputs the direction estimation result as a positioning result.

As described above, when aliasing of Doppler frequency is present, radar apparatus 10 corrects the reception phase of the reflected wave signal and performs direction estimation using the corrected reflected wave signal. This allows radar apparatus 10 to improve the estimation accuracy of the direction estimation value on the basis of the phase correction error caused by the aliasing of the Doppler frequency that occurs in signal corrector 214.

Variation 2 of Embodiment

While the operation performed by aliasing determiner 216 in radar apparatus 10 to determine whether aliasing is present on the basis of the normalized peak power value has been described, the operation performed by aliasing determiner 216 is not limited thereto.

Figure 14:
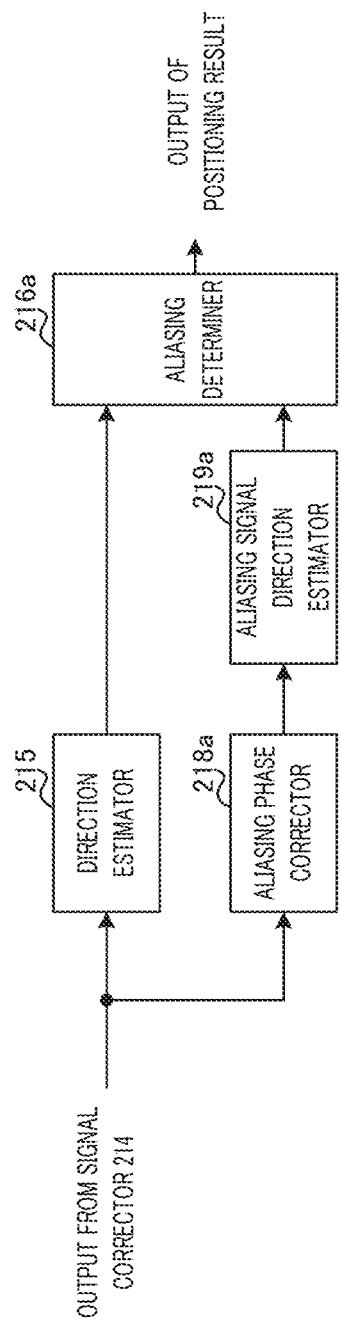
FIG. 14 illustrates a configuration example of part of a radar apparatus according to variation 2.

For example, the configuration example illustrated in FIG. 14 may be used instead of the configuration of aliasing determiner 216 of radar apparatus 10 illustrated in FIG. 1. FIG. 14 illustrates another example of the configuration of radar apparatus 10 illustrated in FIG. 1, which is the configuration downstream of signal corrector 214.

In FIG. 14, radar apparatus 10 includes aliasing determiner 216a, aliasing phase corrector 218a, and aliasing signal direction estimator 219a, in addition to direction estimator 215 illustrated in FIG. 1.

For example, as indicated by expression 22, aliasing phase corrector 218a multiplies each of the elements of the corrected virtual reception array vector $h_{aftercal}(k_{\_cfar}, fs_{\_cfar}, w)$, which is the output from signal corrector 214, by one of the elements of the additional phase correction vector $C_{TxAlias}$(fs_cfar) for the aliased and detected Doppler frequency and calculates the virtual reception array vector $h_{TxAlias}(k_{\_cfar}, fs_{\_cfar}, w)$ for the aliasing Doppler.

Aliasing signal direction estimator 219a performs a direction estimation process similar to that performed by direction estimator 215 on the basis of the virtual reception array vector $h_{TxAlias}(k_{\_cfar}, fs_{\_cfar}, w)$ for aliasing Doppler, which is input from aliasing phase corrector 218a, and outputs the calculated direction estimation value to aliasing determiner 216a.

For example, aliasing determiner 216a compares the peak power level of the direction estimation evaluation function value $P_H(\theta, k_{\_cfar}, f_{s\_cfar}, w)$ calculated by direction estimator 215 with the peak power level of the direction estimation evaluation function value $P_{H\_Alias}(\theta, k_{\_cfar}, f_{s\_cfar}, w)$ calculated by aliasing signal direction estimator 219. For example, if as indicated by the following expression, the level between the two peak power levels is greater than a predetermined level, aliasing determiner 216a determines that aliasing of the Doppler frequency is present:

$$\max_{\theta_u} P_{H\_Alias}(\theta_u, k_{\_cfar}, f_{s\_cfar}, w) > \\ Lev\_P_H \times \left\{ \max_{\theta_u} P_H(\theta_u, k_{\_cfar}, f_{s\_cfar}, w) \right\}. \qquad \text{(Expression 24)}$$

However, if the level between the two peak power levels is less than or equal to the predetermined level, aliasing determiner 216a determines that aliasing of the Doppler frequency is not present. Note that $Lev\_P_H$ is a predetermined coefficient value and is set to a positive numerical value.

In addition to outputting the arrival time information, Doppler frequency information, and direction estimation information as the positioning result, aliasing determiner 216a may output information as to whether aliasing of the Doppler frequency is present, for example.

For example, if it is determined that aliasing of Doppler frequency is not present, the Doppler frequency index fs may be directly output as the Doppler frequency information. However, if it is determined that the aliasing of Doppler frequency is present, it is determined whether the Doppler frequency index fs>0. If the Doppler frequency index fs>0, the Doppler frequency index may be converted into fs−Nc and be output. If the Doppler frequency index fs<0, the Doppler frequency index may be converted into fs+Nc and be output. In this manner, radar apparatus 10 can improve the detection accuracy of the Doppler frequency (the relative velocity).

In addition, if it is determined that aliasing of Doppler frequency is not present, the direction estimation value calculated in direction estimator 215 may be output as the Doppler frequency information. If it is determined that aliasing of Doppler frequency is present, the direction estimation value calculated in aliasing signal direction estimator 219a may be output.

As described above, radar apparatus 10 performs direction estimation (for example, the process performed by aliasing signal direction estimator 219a) to estimate the direction of the object on the basis of the reflected wave signal phase-corrected for the aliasing of Doppler frequency in the Doppler analysis of the reflected wave signal. Thereafter, radar apparatus 10 performs direction estimation (for example, the process performed by direction estimator 215) to estimate the direction of the object on the basis of the reflected wave signal not subjected to the above-described phase correction. Subsequently, radar apparatus 10 determines whether aliasing of the Doppler analysis of the reflected wave signal is present on the basis of the comparison of the two direction estimation results.

Through the operation, radar apparatus 10 can reduce detection errors in Doppler frequency (the relative velocity) and direction estimation even when radar reflected waves having a Doppler frequency outside the Doppler frequency range in which Doppler analyzer 212 can detected a reflective wave without aliasing are received.

Note that, for example, the normalized peak power value varies in accordance with the reception quality (for example, SNR: Signal to Noise Ratio). For example, the normalized peak power value tends to decrease with decreasing reception SNR. For this reason, when making determination of the presence of aliasing on the basis of the normalized peak power value in aliasing determiner 216 illustrated in FIG. 1, the predetermined value Lev_Alias needs to be set appropriately in accordance with the reception SNR. In contrast, aliasing determiner 216a illustrated in FIG. 14 makes determination on the basis of the comparison result between the direction estimation evaluation function value in direction estimator 215 and the direction estimation evaluation function value in aliasing signal direction estimator 219a. As a result, aliasing determiner 216a can improve the accuracy of aliasing determination regardless of the reception SNR (for example, even when the reception SNR is low).

In addition, since aliasing determiner 216a makes aliasing determination on the basis of the comparison result between the direction estimation evaluation function value in direction estimator 215 and the direction estimation evaluation function value in aliasing signal direction estimator 219a, a direction estimation algorithm other than the Fourier method, such as the CAPON method, the MUSIC method, or the ESPRIT method, can be applied.

Variation 3 of Embodiment

The above embodiment has been described with reference to the case where the Doppler frequency range in which aliased Doppler frequency is detected by Doppler analyzer 212 is the "primary aliasing range". However, radar apparatus 10 can also be applied to the case where the Doppler frequency fd of the radar reflected wave includes a Doppler frequency range outside the primary aliasing range (hereinafter referred to as a "secondary aliasing range").

Here, the Doppler frequency index detected when Doppler frequency fd in the following secondary aliasing range is aliased is referred to as "fs_alias2":

$$-3/(Nt \times Tr) < fd < -1/(Nt \times Tr), \text{ or } 1/(Nt \times Tr) < fd < 3/(2Nt \times Tr).$$

In this case, for example, signal corrector 214 sets the transmission phase correction coefficient TxCAL(fs) to $TxCAL^{(1)}(fds\_alias2), \ldots, TxCAL^{(Nt)}(fs\_alias2)$ on the basis of the Doppler frequency index fs_alias2.

However, this transmission phase correction is not based on the Doppler frequency index fs_alias2, which is the Doppler frequency index obtained when the Doppler frequency is aliased in the secondary aliasing range, instead of the original Doppler frequency index (hereafter referred to as fs_true). For this reason, the transmission phase correction is incorrect phase correction.

Figure 15:
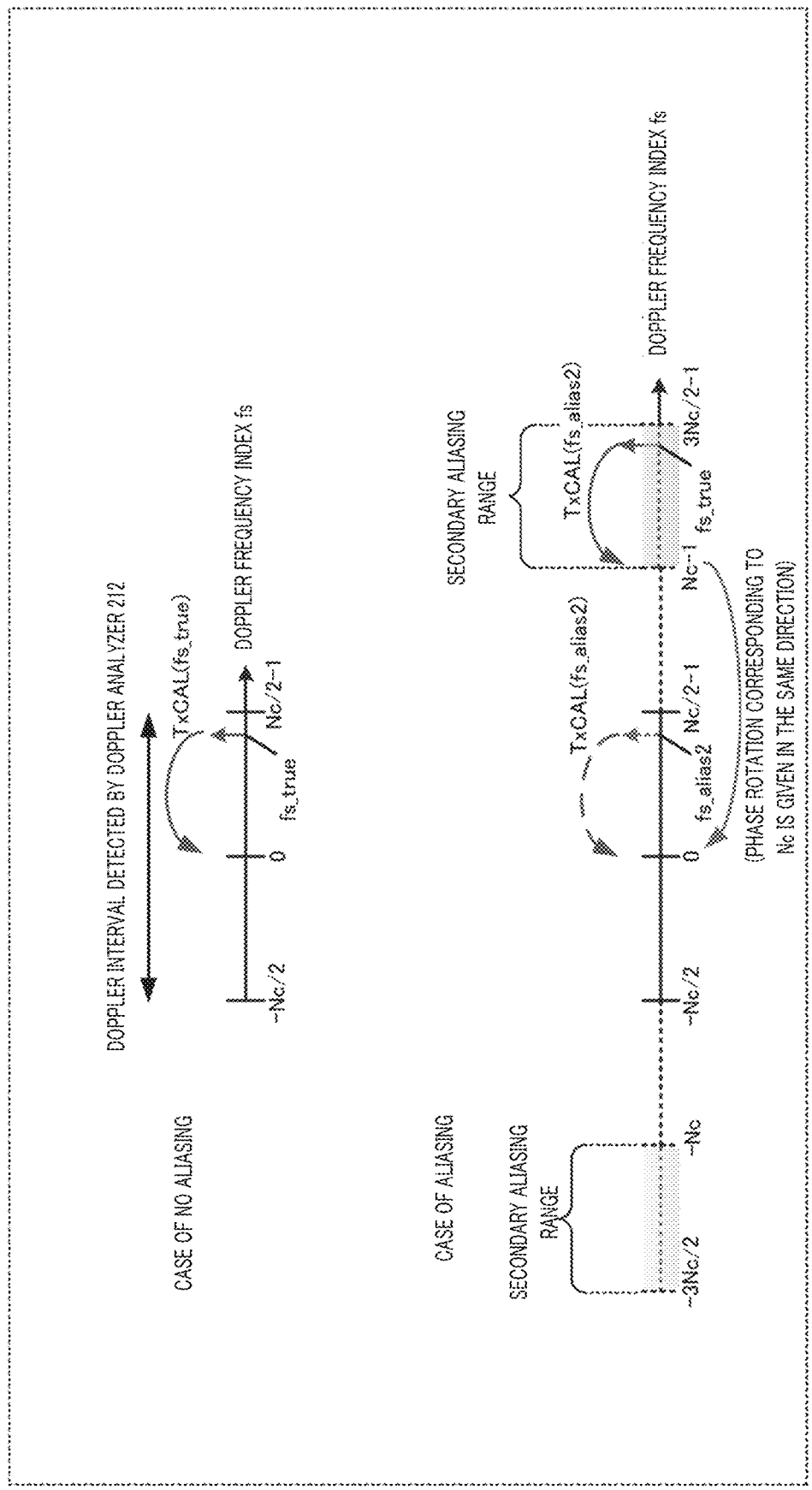
FIG. 15 illustrates an example of a transmission phase correction.

For example, FIG. 15 illustrates an example of transmission phase correction when aliasing of Doppler frequency is present and when aliasing of a Doppler frequency in the secondary aliasing range is present.

FIG. 15 illustrates an example in which the Doppler frequency fs_true detected by Doppler analyzer 212 is included in the range of Nc−1 to (3Nc/2)−1 (that is, the secondary aliasing range) when aliasing is present. That is, in FIG. 15, Doppler frequency index fs_alias2 is aliased into the range of 0 to (Nc/2)−1 and is detected. Accordingly, fs_alias2 illustrated in FIG. 15 is a positive value.

Signal corrector 214 sets the amount of phase rotation such that the phase difference between transmission antennas 108 caused by the switching time difference between transmission antennas 108 becomes zero by, for example, using the transmission phase correction coefficient TxCAL (fs).

For example, in the case where aliasing is not present in FIG. 15, in signal corrector 214, the transmission phase correction coefficient TxCAL(fs_true) sets the phase rotation amount for a Doppler frequency signal that is not aliased in accordance with the Doppler frequency index fs_true so as to match the phase of the reference transmission antenna (the phase corresponding to, for example, the Doppler frequency index fs=0).

In contrast, in the case where aliasing is present in FIG. 15, the original Doppler frequency index fs_true corresponds to fs_alias2+Nc. However, in signal corrector 214, the transmission phase correction coefficient TxCAL (fs_alias2) sets the amount of phase rotation in accordance with the aliased Doppler frequency fs_alias2 for the signal of the aliased Doppler frequency. Therefore, in FIG. 15, in signal corrector 214, when aliasing is present, the transmission phase correction coefficient TxCAL(fs_alias1) sets the phase rotation amount that matches the original Doppler frequency index fs_true within the primary aliasing range.

Therefore, if fs_alias2 is positive, signal corrector 214 lacks the correction to further delay the phase by $2\pi$ in the Doppler sampling period (that is, the correction to add −Nc to the Doppler frequency index illustrated in FIG. 15). That is, when fs_alias2 is positive, signal corrector 214 performs an incorrect correction so that the phase is advanced from the phase of the reference transmission antenna by $2\pi$ in the Doppler sampling period (that is, the Doppler frequency index fs is incorrectly corrected to have an error of +Nc). That is, when aliasing is present in FIG. 15, a phase error of $+2\pi$ (or an error in Doppler frequency index of +Nc) is included as the transmission phase correction error.

As described above, in the transmission shift correction illustrated in FIG. 15, signal corrector 214 makes an incorrect correction so that the phase difference caused by the switching time difference between transmission antenna 108 is $+2\pi$ when aliasing of a Doppler frequency is present. That is, as illustrated in FIG. 15, if fs_alias2 is positive, signal corrector 214 adds a phase rotation of Nc in the same direction as the correction by TxCAL (for example, in the negative direction) in addition to the correction using the transmission phase correction coefficient TxCAL (for example, correction in the negative direction). In this manner, signal corrector 214 can match the phase to the phase of the reference transmission antenna.

In contrast, if fs_alias2 is negative (not illustrated), signal corrector 214 lacks correction to further advance the phase by $2\pi$ in the Doppler sampling period (that is, correction to add +Nc to the Doppler frequency index). That is, if fs_alias2 is negative, signal corrector 214 makes an incorrect correction so that the phase is delayed by $2\pi$ in the Doppler sampling period (that is, the Doppler frequency index fs is incorrectly corrected to have an error of −Nc), which is reverse to the case where fs_alias2 is positive illustrated in FIG. 15.

Therefore, in order for signal corrector 214 to perform transmission phase correction on the original Doppler frequency, for the transmission phase correction coefficients TxCAL$^{(1)}$(fs_alias2), . . . , TxCAL$^{(Nt)}$(fs_alias2), the following additional phase correction coefficient TxCAL_2ndALIAS$^{(ND)}$(fs_alias2) for the aliased Doppler frequency (for example, fs_alias2) is required in consideration with the time difference caused by the time division transmission is required:

[25]

$$TxCal\_2ndALIAS^{(ND)}(f_{s\_alias2})=TxCAL^{(ND)}(-\text{sign}(f_{s\_alias2})Nc) \quad \text{(Expression 25)},$$

where ND=1, . . . , Nt.

In expression 25, sign(x) is a function that returns the positive or negative sign (− or +) of a real number x.

Note that in order to use the additional phase correction coefficient TxCAL_2ndALIAS$^{(ND)}$(fs_alias2) for the aliased Doppler frequency, radar apparatus 10 (for example, aliasing determiner 216) needs to determine whether the Doppler frequency detected by Doppler analyzer 212 is a secondary aliased and detected Doppler frequency.

Accordingly, according to an embodiment of the present disclosure, an example of a MIMO array arrangement is described for which aliasing determiner 216 can determine whether the Doppler frequency detected in Doppler analyzer 212 is an aliased and detected Doppler frequency (for example, either one of primary and secondary aliasing).

Here, if the additional phase correction coefficient TxCAL_2ndALIAS$^{(ND)}$(fs_alias2) for the aliased Doppler frequency is not used, direction estimator 215 performs the direction estimation process with the following transmission phase correction error included:

[26]

$$TxCAL^{(ND)}(\text{sign}(f_{s\_alias2})Nc) \quad \text{(Expression 26)}.$$

The only difference between the transmission phase correction error in the case where a Doppler frequency is aliased within the primary aliasing range (refer to, for example, expression 13) and the transmission phase correction error indicated by expression 26 is the plus or minus sign.

Accordingly, for example, according to an embodiment of the present disclosure, an array antenna arrangement is used in which the peak level of the spatial spectral response of the TxCAL vector TxCALVec in the primary aliasing range is significantly reduced when the aliasing of Doppler frequency is present, as compared with when aliasing of a Doppler frequency is not present. In this way, radar apparatus 10 can determine whether the Doppler frequency of the target is an aliased signal in both the primary and secondary aliasing ranges.

As an example, assume that the number of transmission antennas is Nt=3 and the number of reception antennas is Na=4. Then, when transmission antenna 108 is sequentially switched in the order of Tx #1, Tx #2, and Tx #3, direction estimator 215 performs the direction estimation process with a transmission phase correction error indicated by the following expression included:

Case where fs_alias2 is positive:

$$TxCAL^{(1)}(Nc) = 1, \; TxCAL^{(2)}(Nc) = \exp\left(-j\frac{2\pi}{3}\right), \quad \text{(Expression 27)}$$

$$TxCAL^{(3)}(Nc) = \exp\left(-j\frac{4\pi}{3}\right).$$

Case where fs_alias2 is negative:

$$TxCAL^{(1)}(-Nc) = 1, \; TxCAL^{(2)}(-Nc) = \exp\left(j\frac{2\pi}{3}\right), \quad \text{(Expression 28)}$$

$$TxCAL^{(3)}(-Nc) = \exp\left(j\frac{4\pi}{3}\right).$$

In addition, for example, when transmission antenna 108 is sequentially switched in the order of Tx #1 to Tx #Nt, direction estimator 215 performs the direction estimation process with a transmission phase correction error indicated by the following expression included:

Case where fs_alias2 is positive:

$$TxCAL^{(1)}(Nc) = 1, TxCAL^{(2)}(Nc) = \exp\left(-j\frac{2\pi}{Nt}\right),$$
$$\ldots, TxCAL^{(Nt)}(Nc) = \exp\left(-j\frac{2\pi(Nt-1)}{Nt}\right),$$

(Expression 29)

Case where fs_alias2 is negative:

$$TxCAL^{(1)}(-Nc) = 1, TxCAL^{(2)}(-Nc) = \exp\left(j\frac{2\pi}{Nt}\right),$$
$$\ldots, TxCAL^{(Nt)}(-Nc) = \exp\left(j\frac{2\pi(Nt-1)}{Nt}\right).$$

(Expression 30)

The effect of these transmission phase correction errors on the directional estimation error can be examined by, for example, performing the spatial Fourier transform on the TxCAL vector (TxCALVec). The TxCAL vector is generated by arranging the transmission phase correction errors (refer to, for example, expression 26) corresponding to transmission antennas 108 used to obtain the received signals of the virtual antenna elements when the virtual reception array arrangement is viewed sequentially in order from one end to the other.

As an example, when the virtual reception array arrangement illustrated in FIG. 6 is sequentially arranged, for example, in the order from the right end to the left end, the virtual antenna elements are VA #1, VA #2, VA #3, VA #4, VA #5, VA #6, VA #7, VA #8, VA #9, VA #10, VA #11, and VA #12. In addition, the transmission antenna numbers of the transmission antennas used to obtain received signals of the virtual reception array in the order corresponding to these virtual antenna elements are Tx #1, Tx #1, Tx #1, Tx #1, Tx #2, Tx #2, Tx #2, Tx #2, Tx #3, Tx #3, Tx #3, Tx #3. Therefore, in the case illustrated in FIG. 6 (for example, in the case of expression 27 or expression 28), the TxCAL vector is given by the following expression:

$$TxCALVec = \left[1, 1, 1, 1, \exp\left(\mp j\frac{2\pi}{3}\right), \exp\left(\mp j\frac{2\pi}{3}\right),\right.$$
$$\exp\left(\mp j\frac{2\pi}{3}\right), \exp\left(\mp j\frac{2\pi}{3}\right), \exp\left(\mp j\frac{4\pi}{3}\right),$$
$$\left.\exp\left(\mp j\frac{4\pi}{3}\right), \exp\left(\mp j\frac{4\pi}{3}\right), \exp\left(\mp j\frac{4\pi}{3}\right)\right].$$

(Expression 31)

Figure 16:
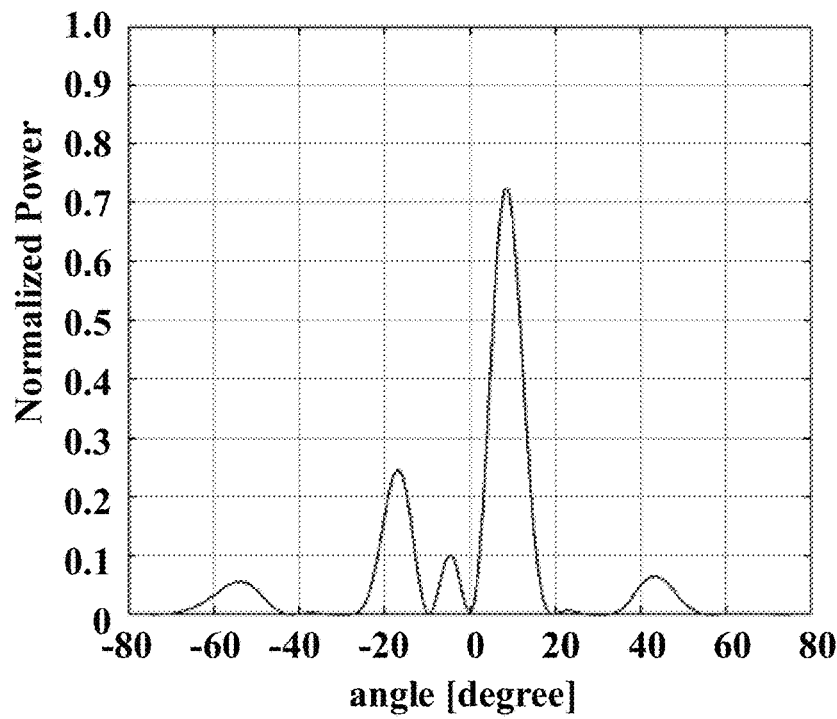
FIG. 16 illustrates an example of a spatial spectral response of a TxCAL vector according to variation 2.
Figure 16:
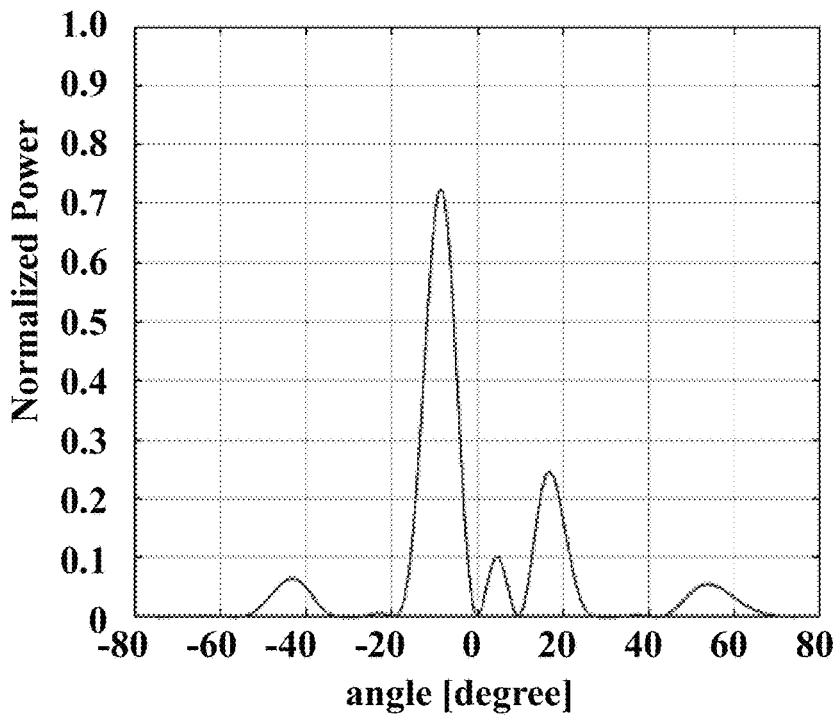

FIG. 16 illustrates an example of the spatial spectral response obtained by performing the spatial Fourier transform on the TxCAL vector (TxCALVec). As can be seen from FIG. 16, when fs_alias2 is positive, the peak direction appears in a positive region from the 0-degree direction. When fs_alias2 is negative, the peak direction appears in a negative region from the 0-degree direction. For example, comparison of FIG. 16 (an example regarding the secondary aliasing range) and FIG. 9 (an example regarding the primary aliasing range) indicates that the spatial spectral response when fs_alias2 is positive (or negative) matches the spatial spectral response when fs_alias1 is negative (or positive).

Subsequently, a configuration example of radar apparatus 10 that enables aliasing determination including the determination for the secondary aliasing range in addition to determination for the primary aliasing range is described below.

Figure 17:
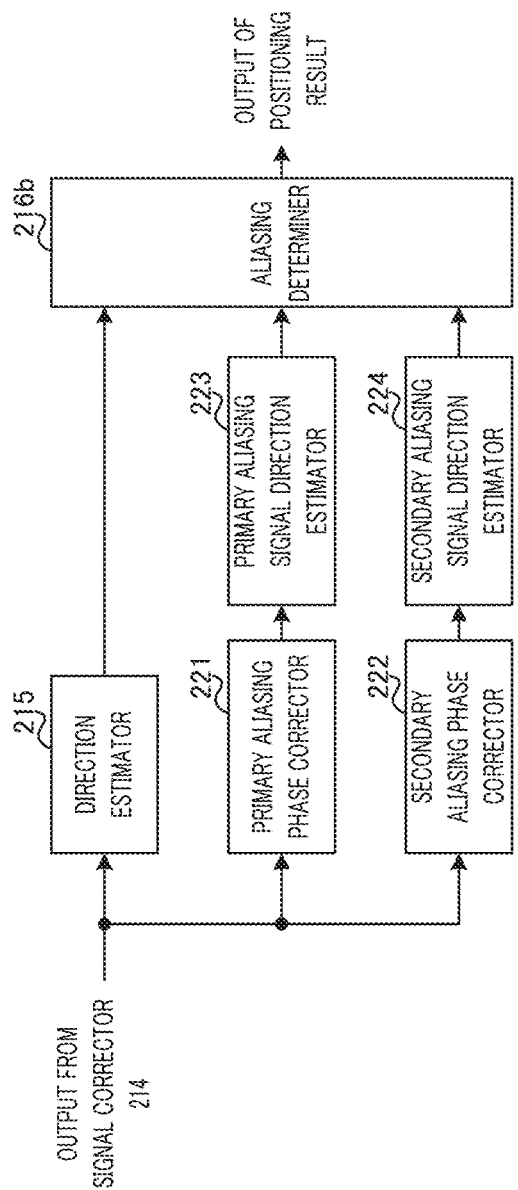
FIG. 17 illustrates a configuration example of part of a radar apparatus according to variation 3.

FIG. 17 illustrates another example of the configuration of radar apparatus 10 illustrated in FIG. 1, which is downstream of signal corrector 214.

In FIG. 17, radar apparatus 10 includes primary aliasing phase corrector 221, secondary aliasing phase corrector 222, primary aliasing signal direction estimator 223, secondary aliasing signal direction estimator 224, and aliasing determiner 216b, in addition to direction estimator 215 illustrated in FIG. 1.

For example, as indicated by expression 22, primary aliasing phase corrector 221 multiplies each of the elements of the corrected virtual reception array vector $h_{aftercal}(k_{\_cfar}, fs_{\_cfar}, w)$ output from signal corrector 214 by one of the elements of an additional phase correction vector $C_{TxAlias}$ (fs_cfar) for a primary aliased and detected Doppler frequency (for example, refer to expression 23) to calculate a virtual reception array vector $h_{TxAlias}(k_{\_cfar}, fs_{\_cfar}, w)$ for the primary aliasing Doppler.

Secondary aliasing phase corrector 222 multiplies each of the elements of the corrected virtual reception array vector $h_{AfterCal}(k_{\_cfar}, fs_{\_cfar}, w)$ output from signal corrector 214 by one of the elements of the additional phase correction vector $C_{Tx\_2ndAlias}$(fs_cfar) for a secondary aliased and detected Doppler frequency to calculate the virtual reception array vector $h_{Tx\_2ndAlias}(k_{\_cfar}, fs_{\_cfar}, w)$ for the secondary aliasing Doppler indicated by the following expression 32:

[32]

$$h_{Tx\_2ndAliasCal}(k_{\_cfar}, fs_{\_cfar}, w)) = C_{Tx\_2ndAlias}(fs_{\_cfar}) \circ h_{aftercal}(k_{\_cfar}, fs_{\_cfar}, w)$$

(Expression 32), where ND=1, . . . , Nt.

In expression 32, $C_{Tx\_2ndAlias}$(fs_cfar) is an additional phase correction vector for aliasing, which consists of Na×Nt elements as follows:

[33]

$$C_{Tx\backslash 2ndAlias}(fs_{\_cfar}) = [TxCAL\_2ndALIAS^{(1)}(fs_{\_cfar}), \ldots, TxCAL\_2ndALIAS^{(1)}(fs_{\_cfar}),$$
$$TxCAL\_2ndALIAS^{(2)}(fs_{\_cfar}), \ldots,$$
$$TxCAL\_2ndALIAS^{(2)}(fs_{\_cfar}), \ldots,$$
$$TxCAL\_2ndALIAS^{(ND)}(fs_{\_cfar}), \ldots,$$
$$TxCAL\_2ndALIAS^{(ND)}(fs_{\_cfar})]^T$$

(Expression 33).

In expression 33, each TxCAL_2 ndALIAS$^{(ND)}$(fs_cfar) repeats the number of times equal to the number of reception antennas Na to form a vector. In addition, TxCAL_2ndALIAS$^{(ND)}$(fs_cfar) is the value indicated by expression 25.

Primary aliasing signal direction estimator 223 performs a direction estimation process similar to that performed by direction estimator 215 on the basis of the virtual reception array vector $h_{TxAlias}(k_{\_cfar}, fs_{\_cfar}, w)$ for aliasing Doppler, which is input from primary aliasing phase corrector 221. Primary aliasing signal direction estimator 223 outputs the direction estimation result to aliasing determiner 216b.

Secondary aliasing signal direction estimator 224 performs a direction estimation process similar to that performed by direction estimator 215 on the basis of the virtual reception array vector $h_{Tx\_2ndAlias}(k_{\_cfar}, f_{s\_cfar}, w)$ for aliasing Doppler, which is input from secondary aliasing phase corrector 222. Secondary aliasing phase corrector 222 outputs the direction estimation result to aliasing determiner 216b.

For example, aliasing determiner 216b compares the peak power level of the direction estimation evaluation function value $P_H(\theta_u, k_{\_cfar}, f_{s\_cfar}, w)$ calculated by direction estimator 215, the peak power level of the direction estimation evaluation function value $P_{H\_Alias}(\theta_u, k_{\_cfar}, f_{s\_cfar}, w)$ calculated by primary aliasing signal direction estimator 223, and the peak power level of the direction estimation evaluation function value $P_{H\_2ndAlias}(\theta_u, k_{\_cfar}, f_{s\_cfar}, w)$ calculated by secondary aliasing signal direction estimator 224 with one another. Thereafter, aliasing determiner 216b determines whether aliasing of the Doppler frequency is present (or primary aliasing and secondary aliasing) on the basis of the comparison result.

For example, as indicated by the following expressions, when a level between the peak power level of the direction estimation evaluation function value $P_{H\_Alias}(\theta_u, k_{\_cfar}, f_{s\_cfar}, w)$ calculated by primary aliasing signal direction estimator 223 and the other peak power level is greater than a predetermined level, aliasing determiner 216b determines that primary aliasing is present:

$$\max_{\theta_u} P_{H\_Alias}(\theta_u, k_{\_cfar}, f_{s\_cfar}, w) > \quad \text{(Expression 34)}$$
$$\text{Lev\_P}_H \times \left\{ \max_{\theta_u} P_H(\theta_u, k_{\_cfar}, f_{s\_cfar}, w) \right\},$$

$$\max_{\theta_u} P_{H\_Alias}(\theta_u, k_{\_cfar}, f_{s\_cfar}, w) > \quad \text{(Expression 35)}$$
$$\text{Lev\_P}_H \times \left\{ \max_{\theta_u} P_{H\_2ndAlias}(\theta_u, k_{\_cfar}, f_{s\_cfar}, w) \right\},$$

where the predetermined coefficient value $\text{Lev\_P}_H$ is set to a positive numerical value.

In addition, for example, if, as indicated by the following expression, the level between the peak power level of the direction estimation evaluation function value $P_{H\_2ndAlias}(\theta_u, k_{\_cfar}, f_{s\_cfar}, w)$ calculated by secondary aliasing signal direction estimator 224 and the other peak power level is greater than the predetermined level, aliasing determiner 216b determines that secondary aliasing is present:

$$\max_{\theta_u} P_{H\_2ndAlias}(\theta_u, k_{\_cfar}, f_{s\_cfar}, w) > \quad \text{(Expression 36)}$$
$$\text{Lev\_P}_H \times \left\{ \max_{\theta_u} P_H(\theta_u, k_{\_cfar}, f_{s\_cfar}, w) \right\},$$

$$\max_{\theta_u} P_{H\_2ndAlias}(\theta_u, k_{\_cfar}, f_{s\_cfar}, w) > \quad \text{(Expression 37)}$$
$$\text{Lev\_P}_H \times \left\{ \max_{\theta_u} P_{H\_Alias}(\theta_u, k_{\_cfar}, f_{s\_cfar}, w) \right\},$$

where the predetermined coefficient value $\text{Lev\_P}_H$ is set to a positive numerical value.

In addition, if none of the conditions for the presence of primary aliasing and the presence of secondary aliasing indicated by expressions 34 to 37 described above is satisfied, aliasing determiner 216b determines that aliasing of Doppler frequency is not present.

In addition to outputting, for example, the arrival time information, Doppler frequency information, and direction estimation information as the positioning result, aliasing determiner 216b may output information regarding at least one of the presence of primary aliasing and the presence of secondary aliasing.

For example, if it is determined that aliasing of Doppler frequency is not present, the Doppler frequency index fs may be directly output as the Doppler frequency information. However, if it is determined that the primary aliasing is present, it is determined whether the Doppler frequency index fs>0. If the Doppler frequency index fs>0, the Doppler frequency index may be converted into fs−Nc and be output. If the Doppler frequency index fs<0, the Doppler frequency index may be converted into fs+Nc and be output. In addition, if it is determined that secondary aliasing is present, it is determined whether the Doppler frequency index fs>0. If the Doppler frequency index fs>0, the Doppler frequency index may be converted into fs+Nc and be output. If the Doppler frequency index fs<0, the Doppler frequency index may be converted into fs−Nc and be output. In this manner, radar apparatus 10 can correctly detect the Doppler frequency (the relative velocity).

If it is determined that aliasing of Doppler frequency is not present, the direction estimation value calculated by direction estimator 215 may be output as the direction estimation information. However, if it is determined that primary aliasing is present, the direction estimation value calculated by primary aliasing signal direction estimator 223 may be output. If it is determined that secondary aliasing is present, the direction estimation value calculated by secondary aliasing signal direction estimator 224 may be output.

As described above, in direction estimation for Doppler frequency signals with aliasing, radar apparatus 10 estimates the direction of the target on the basis of each of the reflected wave signal subjected to phase correction for the primary aliasing and the reflected wave signal subjected to phase correction for the secondary aliasing.

In this manner, upon receiving a radar reflected wave having a Doppler frequency outside the Doppler frequency range in which Doppler analyzer 212 can detect a Doppler frequency without aliasing, radar apparatus 10 can expand the Doppler frequency range to the secondary aliasing range in addition to the primary aliasing range and reduce detection error in the Doppler frequency (the relative velocity) or direction estimation.

Variation 4 of Embodiment

While the above embodiment has been described with reference to the case in which a pulse compression radar that phase-modulates or amplitude-modulates a pulse sequence and outputs the pulse sequence is used in radar transmitter 100, the modulation technique is not limited thereto. For example, the present disclosure is also applicable to a radar method using frequency-modulated pulse waves, such as chirp pulses.

Figure 18:
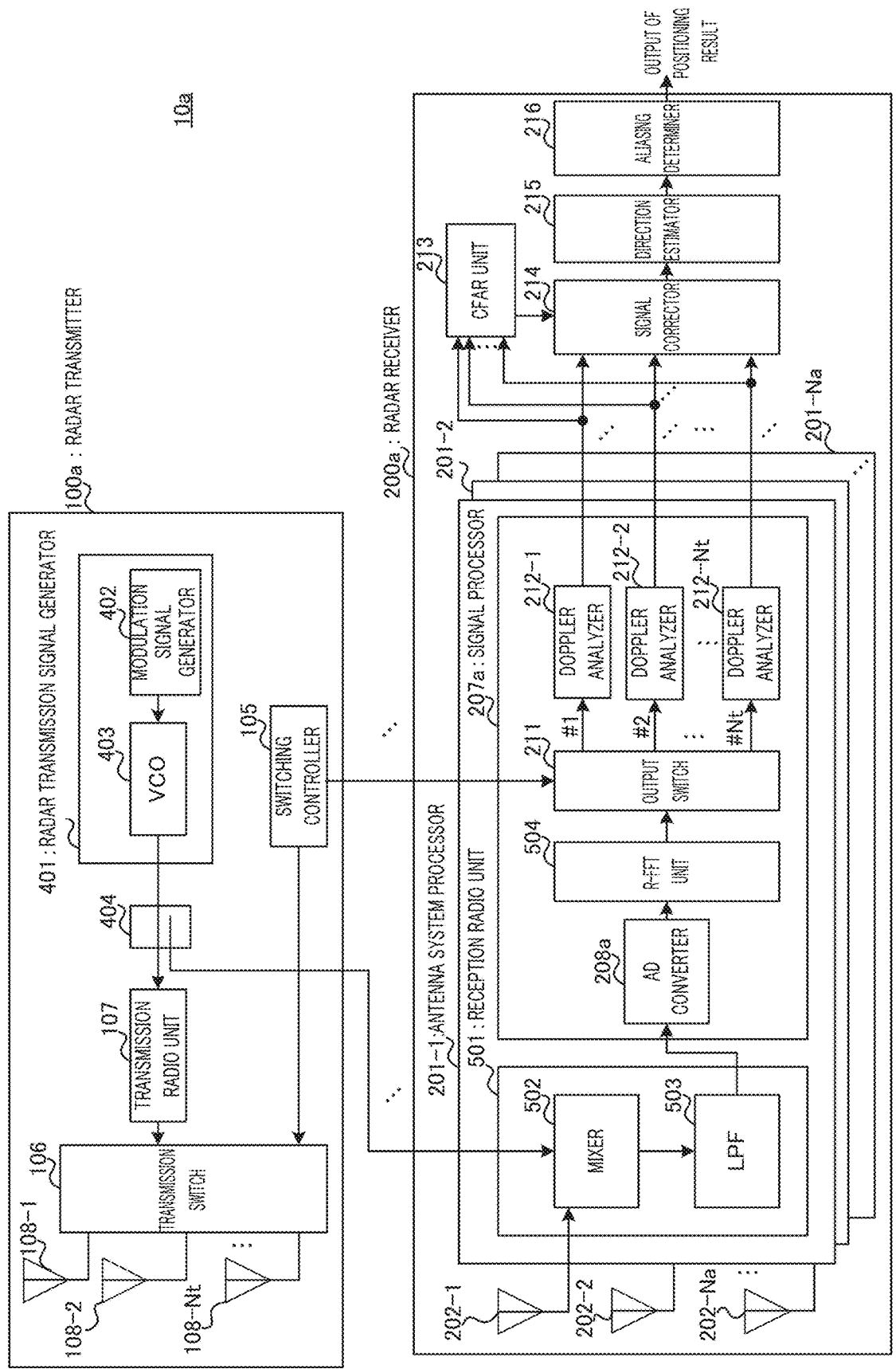
FIG. 18 illustrates a configuration example of a radar apparatus according to variation 4.

FIG. 18 is an example of the configuration diagram of radar apparatus 10a to which a radar system using chirp pulses (for example, fast chirp modulation) is applied. Note that the same reference numerals are used in FIG. 18 for configurations that are the same or similar to those configurations illustrated in FIG. 1, and description of the configurations is not provided.

The transmission process performed by radar transmitter 100a is described first.

In radar transmitter 100a, radar transmission signal generator 401 includes modulation signal generator 402 and VCO (Voltage Controlled Oscillator) 403.

Figure 19:
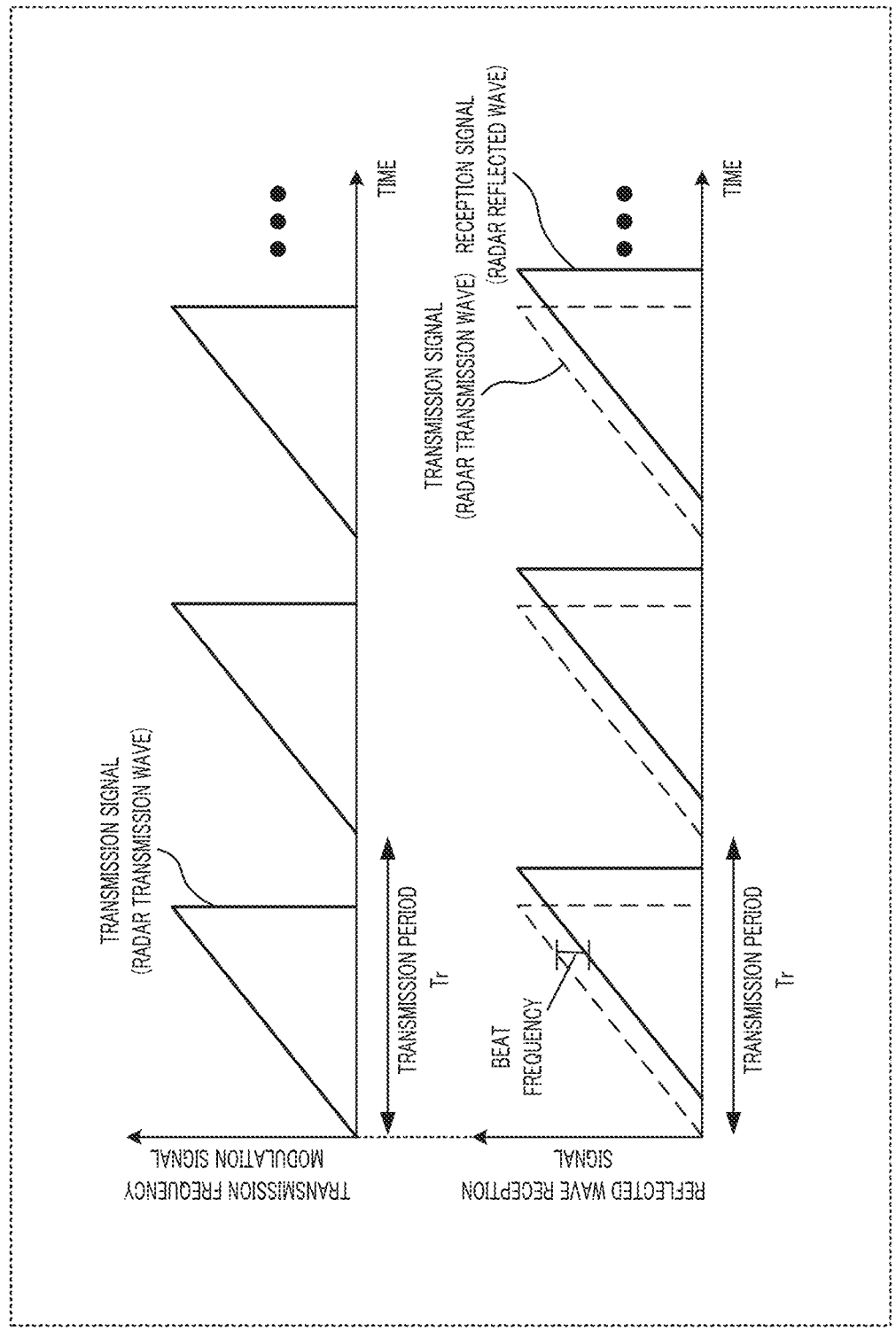
FIG. 19 illustrates an example of a transmitted signal and a reflected wave signal when a chirp pulse is used.

Modulation signal generator 402 periodically generates, for example, a sawtooth shaped modulation signal, as illustrated in FIG. 19. Let Tr denote the radar transmission period.

VCO 403 outputs a frequency modulation signal (that is, a frequency chirp signal) to transmission radio unit 107 on the basis of the radar transmission signal output from modulation signal generator 402. The frequency modulation signal is amplified by transmission radio unit 107 and is radiated into the air from transmission antenna 108 switched by transmission switch 106. For example, the radar transmission signal is output from each of the first to Ntth transmission antennas 108 with a transmission period of Np (=Nt×Tr).

Directional coupler 404 extracts some signals of the frequency modulation signals and outputs the signals to each of reception radio units 501 (mixer 502) of radar receiver 200b.

The reception process performed by radar receiver 200a is described below.

In reception radio unit 501 of radar receiver 200a, mixer 502 mixes the received reflected wave signal with the frequency modulation signal (the signal input from directional coupler 404), which is a transmission signal, and causes the signal to pass through LPF 503. In this manner, a beat signal having a frequency corresponding to the delay time of the reflected wave signal is extracted. For example, as illustrated in FIG. 19, the difference frequency between the frequency of the transmission signal (transmitted frequency modulated wave) and the frequency of the received signal (received frequency modulated wave) is obtained as a beat frequency.

The signal output from LPF 503 is converted into discrete sample data by AD converter 208a in signal processor 207a.

R-FFT unit 504 performs FFT processing on $N_{data}$ discrete sample data obtained in a predetermined time range (range gate) for each transmission period Tr. As a result, signal processor 207a outputs a frequency spectrum in which a peak appears at the beat frequency corresponding to the delay time of the reflected wave signal (the radar reflected wave). Note that in the FFT processing, R-FFT unit 504 may perform multiplication using a window function coefficient, such as a Han window or a Hamming window, for example. By using the window function coefficient, the side lobes generated around the beat frequency peak can be suppressed.

Let AC_RFTz(fb, M) denote the beat frequency spectrum response that is output from R-FFT unit 504 in zth signal processor 207b and that is obtained by the Mth chirp pulse transmission, where fb is the index number (the bin number) of the FFT, and fb=0, . . . , $N_{data}$/2. The index number fb represents a beat frequency such that as the frequency index fb decreases, the delay time of the reflected wave signal decreases (that is, the distance to the target decreases).

Like the above-described embodiment, output switch 211 in zth signal processor 207a selectively switches one of Nt Doppler analyzers 212 on the basis of a switching control signal input from switching controller 105 and outputs the output of R-FFT unit 504 in each radar transmission period Tr.

Hereinafter, as an example, the switching control signal in the Mth radar transmission period Tr[M] is represented by Nt-bit information [$bit_1(M)$, $bit_2(M)$, . . . , $bit_{Nt}(M)$]. For example, in the switching control signal at the Mth radar transmission period Tr[M], if the NDth bit $bit_{ND}(M)$ (note that ND is any one of 1 to Nt) is '1', output switch 211 selects (that is, switches on) NDth Doppler analyzer 212. In contrast, if the NDth bit $bit_{ND}(M)$ is '0' in the switching control signal of the Mth radar transmission period Tr[M], output switch 211 deselects (that is, switches OFF) NDth Doppler analyzer 212. Output switch 211 outputs the signal input from R-FFT unit 504 to selected Doppler analyzer 212.

As described above, the selection of each of Doppler analyzers 212 is sequentially switched on with a period of Np (=Nt×Tr). The switching control signal repeats the above-described operation Nc times.

Zth (z=1, . . . , Na) signal processor 207a includes Nt Doppler analyzers 212.

Doppler analyzer 212 performs Doppler analysis on the output from output switch 211 for each beat frequency index fb.

For example, if Nc is a power of 2, the fast Fourier transform (FFT) process can be applied to Doppler analysis.

For example, the wth output of NDth Doppler analyzer 212 of zth signal processor 207a indicates the Doppler frequency response $FT\_CIz^{ND}(fb, f_s, w)$ of the Doppler frequency index $f_s$ at the beat frequency index fb, as indicated by the following expression:

$$FT\_CI_z^{ND}(fb, f_u, w) = \sum_{q=0}^{N_t N_c - 1} bit_{N_D}(q+1) AC\_RFT_z \qquad \text{(Expression 38)}$$

$$(fb, N_t N_c(w-1) + q + 1) \exp\left[-j \frac{2\pi \left\lfloor \frac{q}{N_t} \right\rfloor f_s}{N_c}\right].$$

The FFT size is Nc, and the range of the Doppler frequency index fs is (−Nc/2)+1, . . . , 0, . . . , Nc/2. Note that ND=1 to Nt, and w is an integer greater than or equal to 1. In addition, j is an imaginary number unit, and z=1 to Na.

Detailed description of the processing performed by CFAR unit 213, signal corrector 214, direction estimator 215, and aliasing determiner 216 downstream of signal processor 207a is not provided, because the operation is obtained by replacing the discrete time k in the above-described embodiment with the beat frequency index fb.

Through the configuration and operation described above, the same effect as that of the above-described embodiment can be obtained even in this variation. Note that according to the variations of the embodiment described below, a frequency chirp signal can be applied as the radar transmission signal in the same way, and the same effect can be obtained as when an encoded pulse signal is used.

In addition, the beat frequency index fb described above may be converted into distance information and be output. To convert the beat frequency index fb into distance information R(fb), the following expression can be used:

(Expression 39)

$$R(fb) = \frac{C_0}{2B_w} f_b, \qquad [39]$$

where Bw is the frequency modulation bandwidth of the frequency chirp signal generated by frequency modulation, and $C_0$ is the speed of light.

Variation 5 of Embodiment

The transmission/reception antenna arrangement (or the virtual reception array arrangement) according to an embodiment of the present disclosure is not limited to the arrangement illustrated in FIG. 11.

For example, another transmission/reception antenna arrangement that satisfies (condition 1) described above can be used.

Alternatively, a transmission/reception antenna arrangement that satisfies (condition 2) described below in addition to satisfying (condition 1) can be used.

Condition 2

For example, the maximum antenna spacing of the transmission array antenna is set to be greater than the minimum antenna spacing of the reception array antenna and less than or equal to the aperture length of the reception array antenna.

In addition, for example, the maximum antenna spacing of the reception array antenna is set to be greater than the minimum antenna spacing of the transmission array antenna and less than or equal to the aperture length of the transmission array antenna.

Note that the aperture length of the transmission array antenna is the sum of the antenna spacing values in the transmission array antenna, and the aperture length of the reception array antenna is the sum of the antenna spacing values in the reception array antenna.

An example of MIMO array arrangement that satisfies at least one of (Condition 1) and (Condition 2) and an example of the virtual reception array arrangement are described below.

Arrangement Example 1

Figure 20:
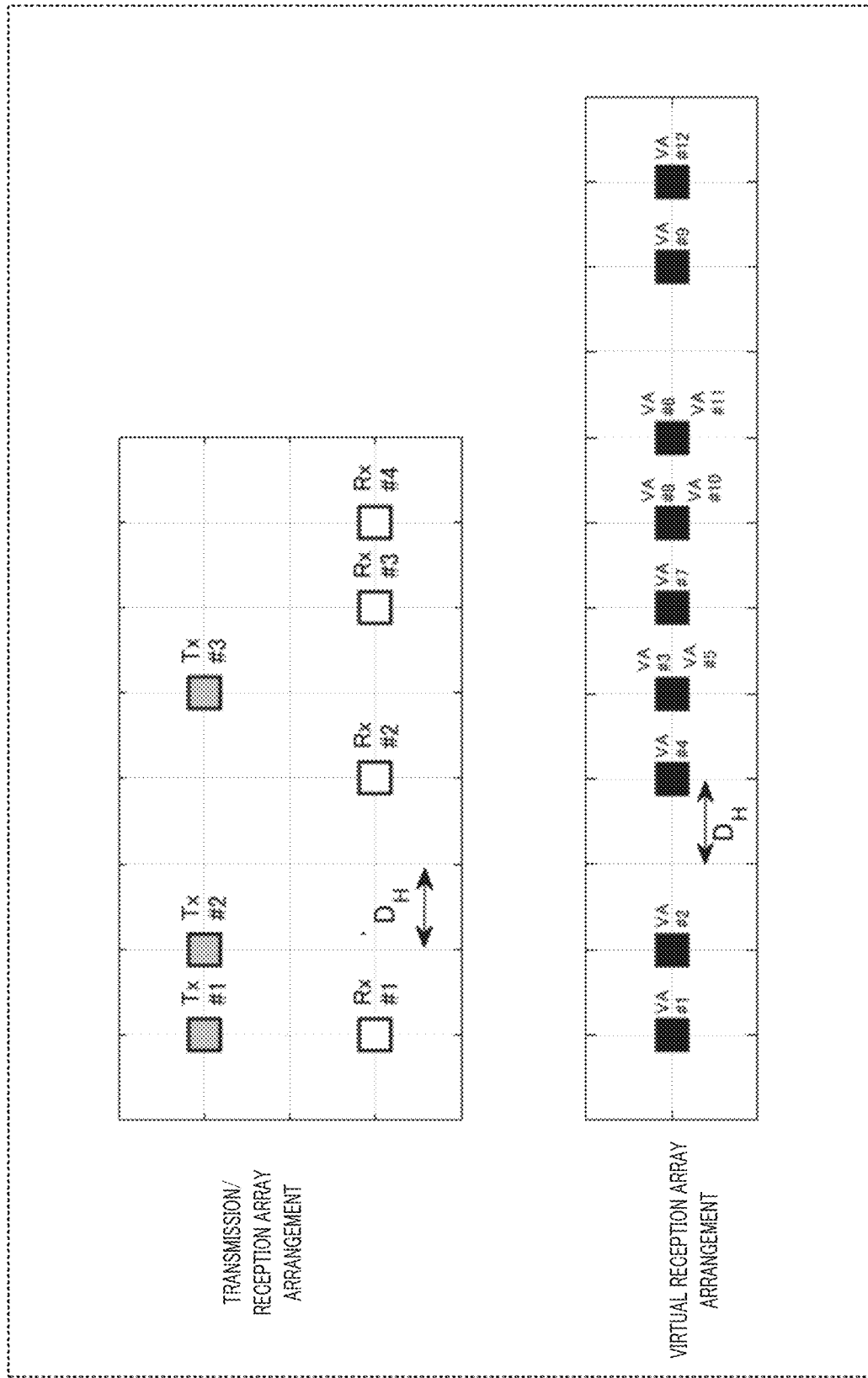
FIG. 20 illustrates an example of an arrangement of transmission/reception antennas and a virtual reception array according to variation 5.

FIG. 20 illustrates an example of MIMO array arrangement and virtual reception array arrangement according to arrangement example 1. In FIG. 20, the number of transmission antennas Nt=3, and the number of reception antennas Na=4. Note that the number of transmission antennas Nt and the number of reception antennas Na are not limited to those in the example illustrated in FIG. 20.

In FIG. 20, an antenna spacing $D_{TX(1, 2)}$ between Tx #1 and Tx #2 is $D_H$, and an antenna spacing $D_{TX(2, 3)}$ between Tx #2 and Tx #3 is 3DH. In addition, in FIG. 20, an antenna spacing $D_{Rx(1, 2)}$ between Rx #1 and Rx #2 is $3D_H$, and an antenna spacing $D_{Rx(2, 3)}$ between Rx #2 and Rx #3 is $2D_H$. An antenna spacing $D_{Rx(3, 4)}$ between Rx #3 and Rx #4 is $D_H$. Furthermore, in FIG. 20, the aperture length of the transmission array antenna is $4D_H$, and the aperture length of the reception array antenna is 6DH.

Therefore, in the transmission/reception antenna arrangement illustrated in FIG. 20, $D_{Tx(1, 2)} \le D_{Tx(2, 3)}$, and $D_{Rx(1, 2)} \ge D_{Rx(2, 3)} \ge D_{Rx(3, 4)}$. Consequently, the above-described (Condition 1) is satisfied.

In the transmission/reception antenna arrangement illustrated in FIG. 20, the maximum antenna spacing of the transmission array antenna ($D_{Tx(2, 3)}=3D_H$) is set so as to be greater than the minimum antenna spacing of the reception array antenna ($D_{Rx(3, 4)}=D_H$) and less than or equal to the aperture length $6D_H$ of the reception array antenna. In addition, for example, the maximum antenna spacing of the reception array antenna ($D_{Rx(1, 2)}=3D_H$) is set to be greater than the minimum antenna spacing of the transmission array antenna ($D_{Tx(1, 2)}=D_H$) and less than or equal to the aperture length $4D_H$ of the transmission array antenna. Therefore, the transmission/reception antenna arrangement illustrated in FIG. 20 satisfies (Condition 2) described above.

The arrangement of the transmission array antenna and the arrangement of the reception array antenna can provide a virtual reception array antenna VA #1 to VA #12.

When the virtual reception array arrangement illustrated in FIG. 20 is sequentially arranged, for example, in order from the left end to the right end, the virtual antenna elements are VA #1, VA #2, VA #4, VA #3 (with overlapping VA #5), VA #7, VA #8 (with overlapping VA #10), VA #6 (with overlapping VA #11), VA #9, and VA #12. In addition, the transmission antenna numbers of transmission antennas 108 used to obtain the received signals of the virtual antenna elements arranged in this order are Tx #1, Tx #2, Tx #1, Tx #2 (with overlapping Tx #3), Tx #1, Tx #1 (with overlapping Tx #2), Tx #2 (with overlapping Tx #3), Tx #3, and Tx #3.

For example, when the virtual reception array arrangement illustrated in FIG. 20 is sequentially viewed in a direction from one end (for example, the left end) to the other end (for example, the right end), the transmission antenna numbers of transmission antennas 108 used to obtain received signals of the virtual antenna elements form a sequence of a mixture of part where Tx #3 continuously appear three times (that is, the low frequency component of the spatial frequency spectrum) and part where Tx #1 and Tx #2 are sequentially switched (that is, the high frequency component of the spatial frequency spectrum).

For example, the TxCAL vector (TxCALVec) consists of the transmission phase correction errors (refer to, for example, expression 13 or expression 25) arranged in an order corresponding to transmission antennas 108 used to obtain the received signals of the virtual reception array element described above. For this reason, if aliasing of Doppler frequency occurs, a direction estimation error based on the TxCAL vector (TxCALVec) occurs.

Figure 21:
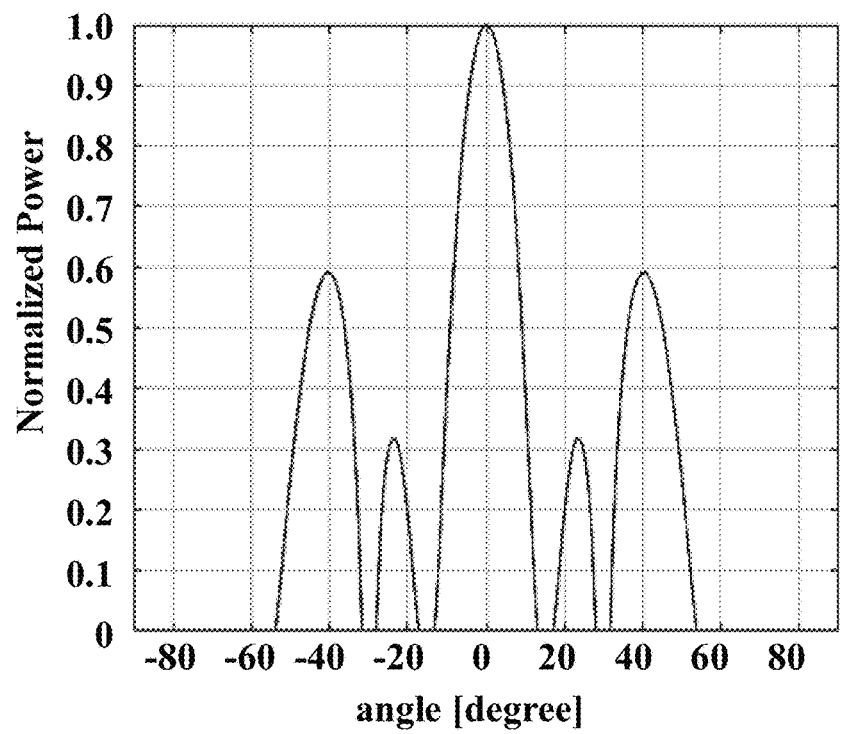
FIG. 21 illustrates an example of direction estimation results according to variant 5.
Figure 21:
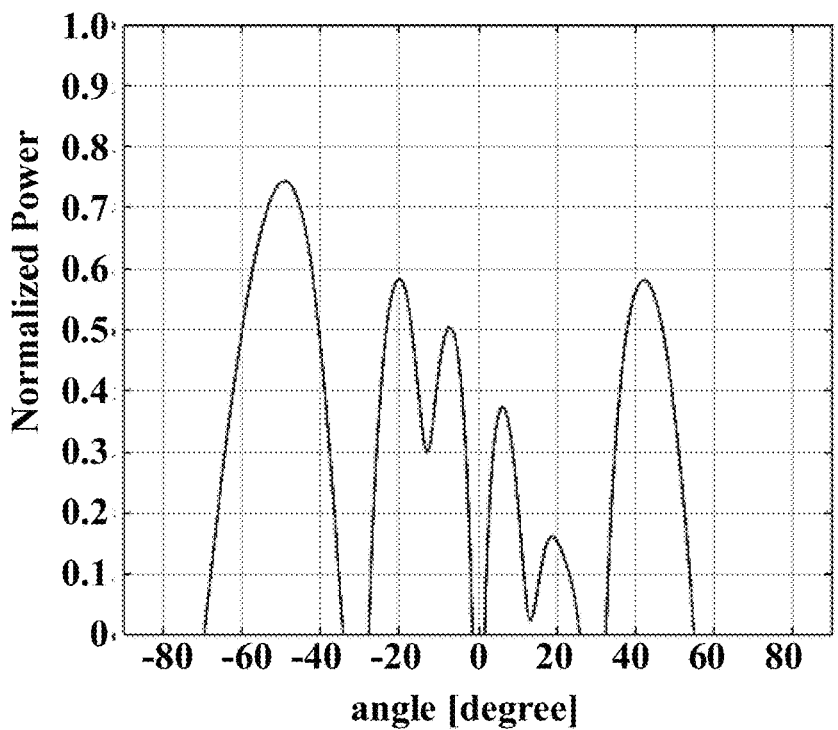

FIG. 21 illustrates an example of the direction estimation results when the beamformer method is used for the transmission/reception antenna arrangement illustrated in FIG. 20 as the direction-of-arrival estimation algorithm for use in direction estimator 215. In FIG. 21, the outputs of a direction-of-arrival estimation evaluation function values in the horizontal ±90 degree range are plotted when the target true value is set to 0 degrees horizontally. In addition, in FIG. 21, $D_H=0.5\lambda$ in the MIMO array arrangement.

As can be seen from FIG. 21, when aliasing of Doppler frequency is present (that is, when a transmission phase correction error occurs), the peak level of the spatial spectrum in the direction estimation by the Fourier method is reduced by about 5.1 dB, as compared with the peak level when aliasing of Doppler frequency is not present (that is, when a transmission phase correction error does not occur).

Arrangement Example 2

Figure 22:
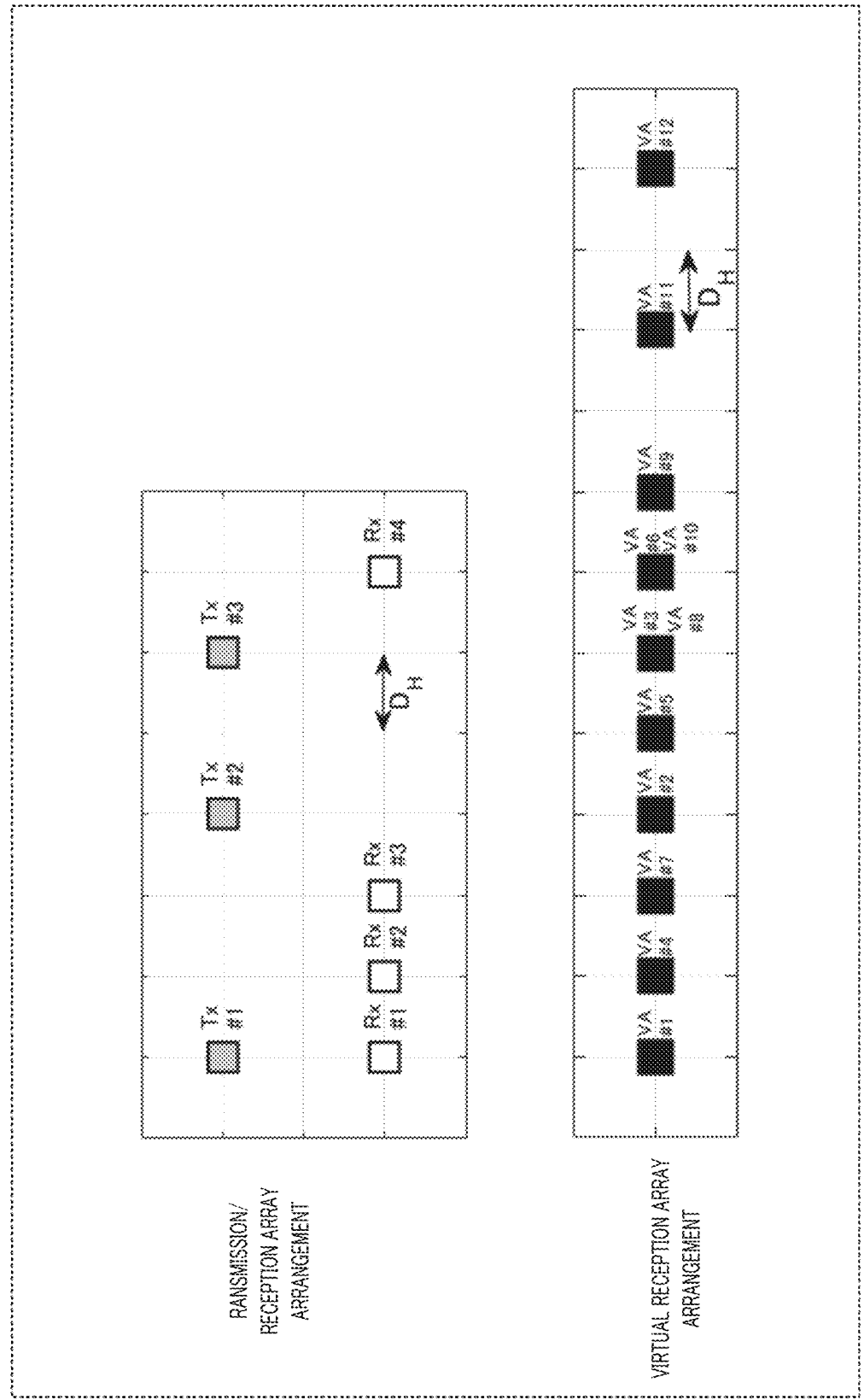
FIG. 22 illustrates an example of an arrangement of transmission/reception antennas and a virtual reception array according to variation 5.

FIG. 22 illustrates an example of the MIMO array arrangement and virtual reception array arrangement according to arrangement example 2. In FIG. 22, the number of transmission antennas Nt=3, and the number of reception antennas Na=4. Note that the number of transmission antennas Nt and the number of reception antennas Na are not limited to those in the example illustrated in FIG. 22.

In FIG. 22, an antenna spacing $D_{Tx(1, 2)}$ between Tx #1 and Tx #2 is $3D_H$, and an antenna spacing $D_{Tx(2, 3)}$ between Tx #2 and Tx #3 is 2DH. In addition, in FIG. 22, an antenna spacing $D_{Rx(1, 2)}$ between Rx #1 and Rx #2 is $D_H$, an antenna spacing $D_{Rx(2, 3)}$ between Rx #2 and Rx #3 is $D_H$, and an antenna spacing $D_{Rx(3, 4)}$ between Rx #3 and Rx #4 is $4D_H$.

Furthermore, in FIG. 22, the aperture length of the transmission array antenna is $5D_H$, and the aperture length of the reception array antenna is $6D_H$.

Therefore, in the transmission/reception antenna arrangement illustrated in FIG. 22, $D_{Tx(1, 2)} \geq D_{Tx(2, 3)}$, and $D_{Rx(1, 2)} \leq D_{Rx(2, 3)} \leq D_{Rx(3, 4)}$. Consequently, the above-described (Condition 1) is satisfied.

In the transmission/reception antenna arrangement illustrated in FIG. 22, the maximum antenna spacing of the transmission array antenna ($D_{Tx(1, 2)} = 3D_H$) is set to be greater than the minimum antenna spacing of the reception array antenna ($D_{Rx(1, 2)} = D_{Rx(2, 3)} = D_H$) and less than or equal to the aperture length $6D_H$ of the reception array antenna. In addition, for example, the maximum antenna spacing of the reception array antenna ($D_{Rx(3, 4)} = 4D_H$) is set to be greater than the minimum antenna spacing of the transmission array antenna ($D_{TX(2, 3)} = 2D_H$) and less than or equal to the aperture length $5D_H$ of the transmission array antenna. Therefore, the transmission/reception antenna arrangement illustrated in FIG. 22 satisfies (Condition 2) described above.

The arrangement of the transmission array antenna and the arrangement of the reception array antenna can provide a virtual reception array antenna VA #1 to VA #12.

When the virtual reception array arrangement illustrated in FIG. 22 is sequentially arranged, for example, in order from the left end to the right end, the virtual antenna elements are VA #1, VA #4, VA #7, VA #2 VA #5, VA #3 (with overlapping VA #8), VA #6 (with overlapping VA #10), VA #9, VA #11, and VA #12. In addition, the transmission antenna numbers of transmission antennas 108 used to obtain the received signals of the virtual antenna elements arranged in this order are Tx #1, Tx #1, Tx #1, Tx #2, Tx #2, Tx #2 (with overlapping Tx #3), Tx #1 (with overlapping Tx #3), Tx #3, Tx #2, and Tx #3.

For example, when the virtual reception array arrangement illustrated in FIG. 22 is sequentially viewed in a direction from one end (for example, the left end) to the other end (for example, the right end), the transmission antenna numbers of transmission antennas 108 used to obtain received signals of the virtual antenna elements form a sequence of a mixture of part where each of Tx #1 and TX #2 continuously appears three times (that is, the low frequency component of the spatial frequency spectrum) and part where Tx #1 to Tx #3 are switched (that is, the high frequency component of the spatial frequency spectrum).

For example, the TxCAL vector (TxCALVec) consists of the transmission phase correction errors (refer to, for example, expression 13 or expression 25) arranged in an order corresponding to transmission antennas 108 used to obtain the received signals of the virtual reception array element described above. For this reason, if aliasing of Doppler frequency occurs, a direction estimation error based on the TxCAL vector (TxCALVec) occurs.

Figure 23:
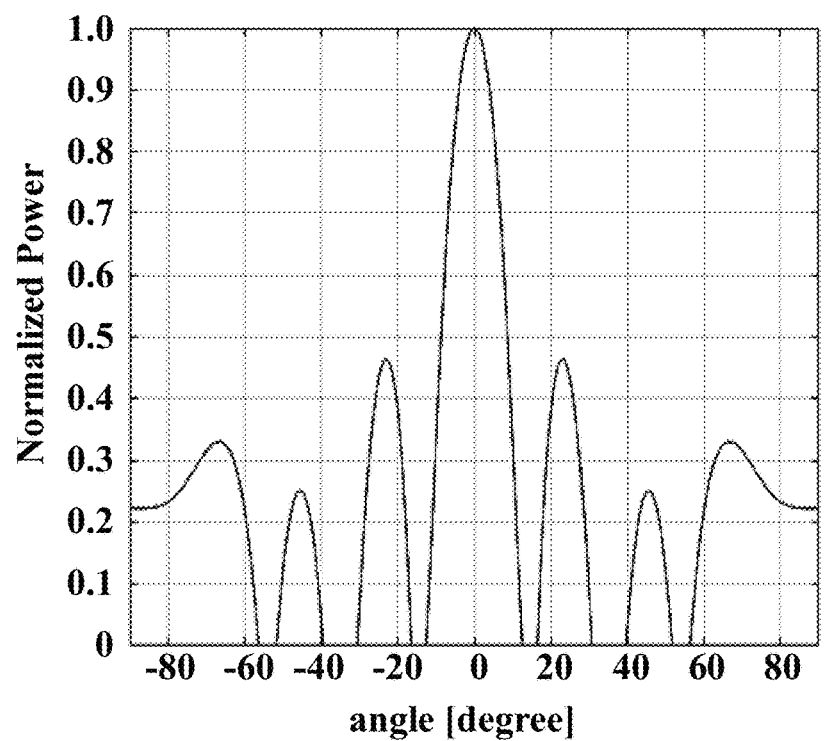
FIG. 23 illustrates an example of direction estimation results according to variant 5.
Figure 23:
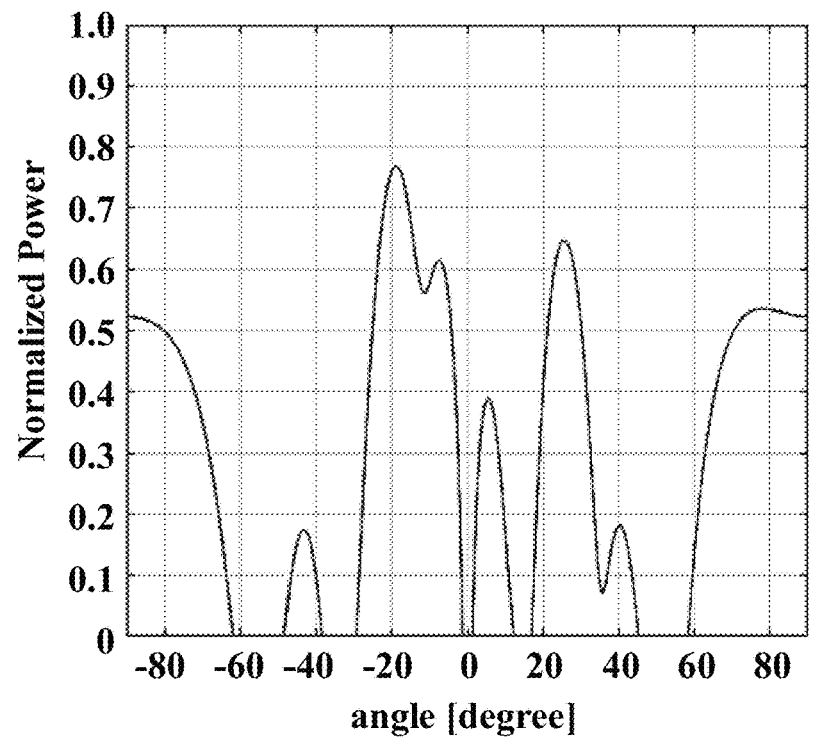

FIG. 23 illustrates an example of the direction estimation results when the beamformer method is used for the transmission/reception antenna arrangement illustrated in FIG. 22 as the direction-of-arrival estimation algorithm for use in direction estimator 215. In FIG. 23, the outputs of a direction-of-arrival estimation evaluation function values in the horizontal ±90 degree range are plotted when the target true value is set to 0 degrees horizontally. In addition, in FIG. 23, $D_H = 0.5\lambda$ in the MIMO array arrangement.

As can be seen from FIG. 23, when aliasing of Doppler frequency is present (that is, when a transmission phase correction error occurs), the peak level of the spatial spectrum in the direction estimation by the Fourier method is reduced by about 4.6 dB, as compared with the peak level when aliasing of Doppler frequency is not present (that is, when a transmission phase correction error does not occur).

Arrangement Example 3

Figure 24:
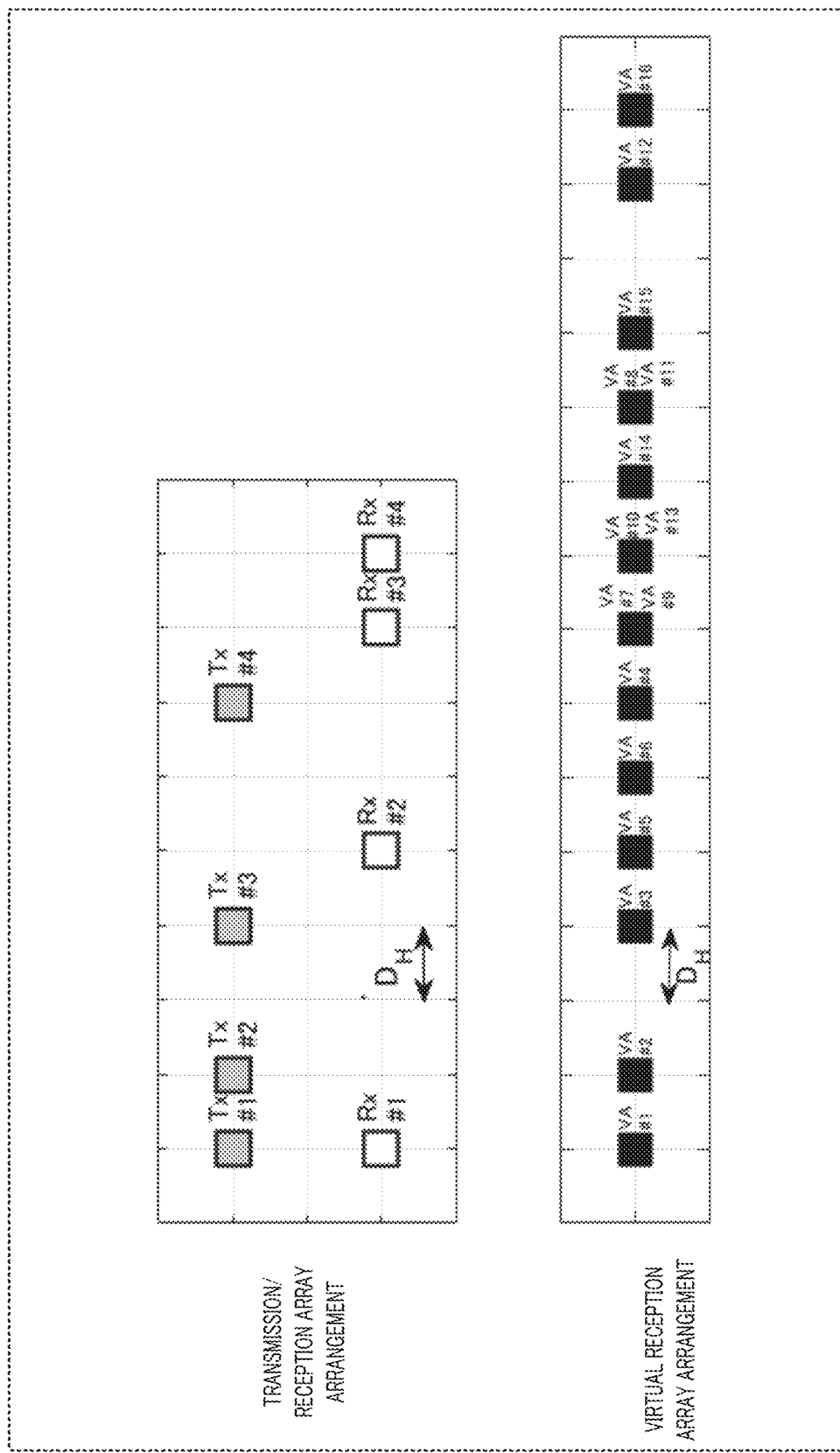
FIG. 24 illustrates an example of an arrangement of transmission/reception antennas and a virtual reception array according to variation 5.

FIG. 24 illustrates an example of the MIMO array arrangement and virtual reception array arrangement according to arrangement example 3. In FIG. 24, the number of transmission antennas Nt=4, and the number of reception antennas Na=4. Note that the number of transmission antennas Nt and the number of reception antennas Na are not limited to those in the example illustrated in FIG. 24.

In FIG. 24, an antenna spacing $D_{TX(1, 2)}$ between Tx #1 and Tx #2 is $D_H$, an antenna spacing $D_{Tx(2, 3)}$ between Tx #2 and Tx #3 is $2D_H$, and an antenna spacing $D_{Tx(3, 4)}$ between Tx #3 and Tx #4 is 3DH. In addition, in FIG. 24, an antenna spacing $D_{Rx(1, 2)}$ between Rx #1 and Rx #2 is $4D_H$, an antenna spacing $D_{Rx(2, 3)}$ between Rx #2 and Rx #3 is $3D_H$, and an antenna spacing $D_{Rx(3, 4)}$ between Rx #3 and Rx #4 is DH. Furthermore, in FIG. 24, the aperture length of the transmission array antenna is $6D_H$, and the aperture length of the reception array antenna is $8D_H$.

Therefore, in the transmission/reception antenna arrangement illustrated in FIG. 24, $D_{Tx(1, 2)} \leq D_{Tx(2, 3)} \leq D_{Tx(3, 4)}$, and $D_{Rx(1, 2)} \geq D_{Rx(2, 3)} \geq D_{Rx(3, 4)}$. Consequently, the above-described (Condition 1) is satisfied.

In the transmission/reception antenna arrangement illustrated in FIG. 24, the maximum antenna spacing of the transmission array antenna ($D_{Tx(3, 4)} = 3D_H$) is set to be greater than the minimum antenna spacing of the reception array antenna ($D_{Rx(3, 4)} = D_H$) and less than the aperture length $8D_H$ of the reception array antenna. In addition, for example, the maximum antenna spacing of the reception array antenna ($D_{Rx(1, 2)} = 4D_H$) is set to be greater than the minimum antenna spacing of the transmission array antenna ($D_{Tx(1, 2)} = D_H$) and less than or equal to the aperture length $6D_H$ of the transmission array antenna. Therefore, the transmission/reception antenna arrangement illustrated in FIG. 24 satisfies (condition 2) described above.

The arrangement of the transmission array antenna and the arrangement of the reception array antenna provides a virtual reception array antenna VA #1 to VA #16.

When the virtual reception array arrangement illustrated in FIG. 24 is sequentially arranged, for example, in order from the left end to the right end, the virtual antenna elements are VA #1, VA #2, VA #3, VA #5, VA #6, VA. #4, VA #9 (with overlapping VA #7), VA #10 (VA #13 also overlaps), VA #14, VA #8 (with overlapping VA #11), VA #15, VA #12, and VA #16. In addition, the transmission antenna numbers of transmission antennas 108 used to obtain the received signals of the virtual antenna elements arranged in this order are Tx #1, Tx #2, Tx #3, Tx #1, Tx #2, Tx #4, Tx #1 (with overlapping Tx #3), Tx #1 (with overlapping Tx #2), Tx #2, Tx #3 (with overlapping Tx #4), Tx #3, Tx #4, and Tx #4.

For example, when the virtual reception array arrangement illustrated in FIG. 24 is sequentially arranged in a direction from one end (for example, the left end) to the other end (for example, the right end), the transmission antenna numbers of transmission antennas 108 used to obtain received signals of the virtual antenna elements form a sequence of a mixture of part where each of Tx #3 and TX #4 continuously appears twice (that is, the low frequency component of the spatial frequency spectrum) and part where Tx #1 to Tx #4 are switched (that is, the high frequency component of the spatial frequency spectrum).

For example, the TxCAL vector (TxCALVec) consists of the transmission phase correction errors (refer to, for example, expression 13 or expression 25) arranged in an order corresponding to transmission antennas 108 used to obtain the received signals of the virtual reception array element described above. For this reason, if aliasing of Doppler frequency occurs, a direction estimation error based on the TxCAL vector (TxCALVec) occurs.

Figure 25:
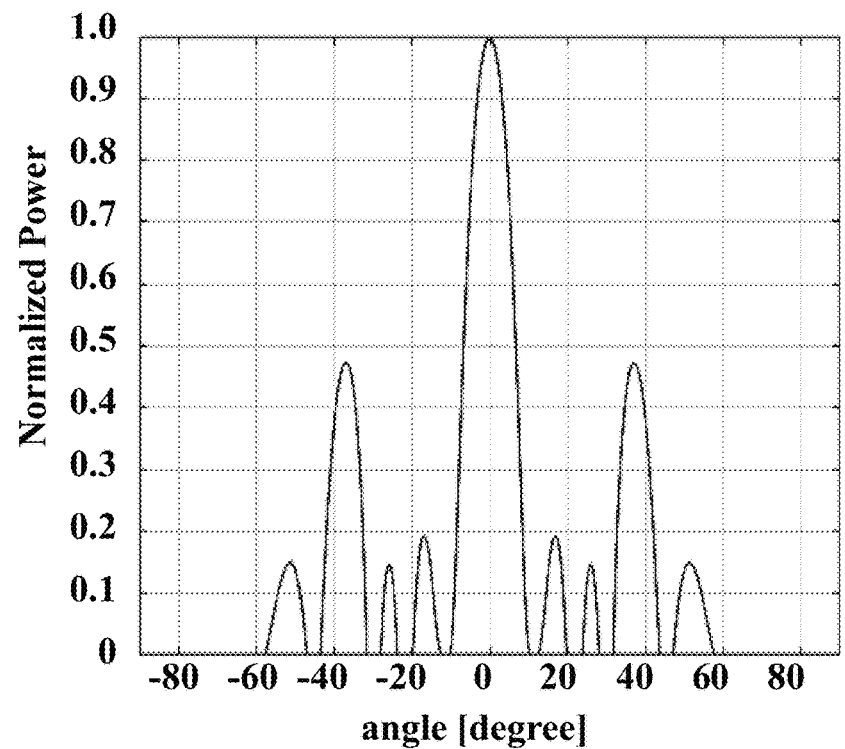
FIG. 25 illustrates an example of direction estimation results according to variant 5.
Figure 25:
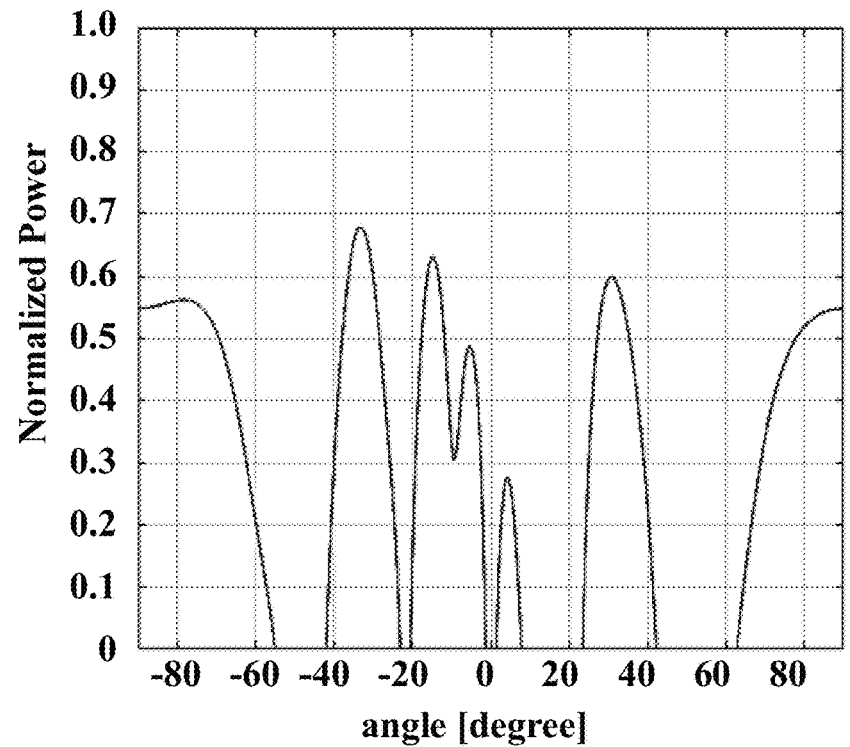

FIG. 25 illustrates an example of the direction estimation results when the beamformer method is used for the transmission/reception antenna arrangement illustrated in FIG. 24 as the direction-of-arrival estimation algorithm for use in direction estimator 215. In FIG. 25, the outputs of a direction-of-arrival estimation evaluation function values in the horizontal ±90 degree range are plotted when the target true value is set to 0 degrees horizontally. In addition, in FIG. 25, $D_H=0.5\lambda$ in the MIMO array arrangement.

As can be seen from FIG. 25, when aliasing of Doppler frequency is present (that is, when a transmission phase correction error occurs), the peak level of the spatial spectrum in the direction estimation by the Fourier method is reduced by about 7.5 dB, as compared with the peak level when aliasing of Doppler frequency is not present (that is, when a transmission phase correction error does not occur).

Arrangement Example 4

Figure 26:
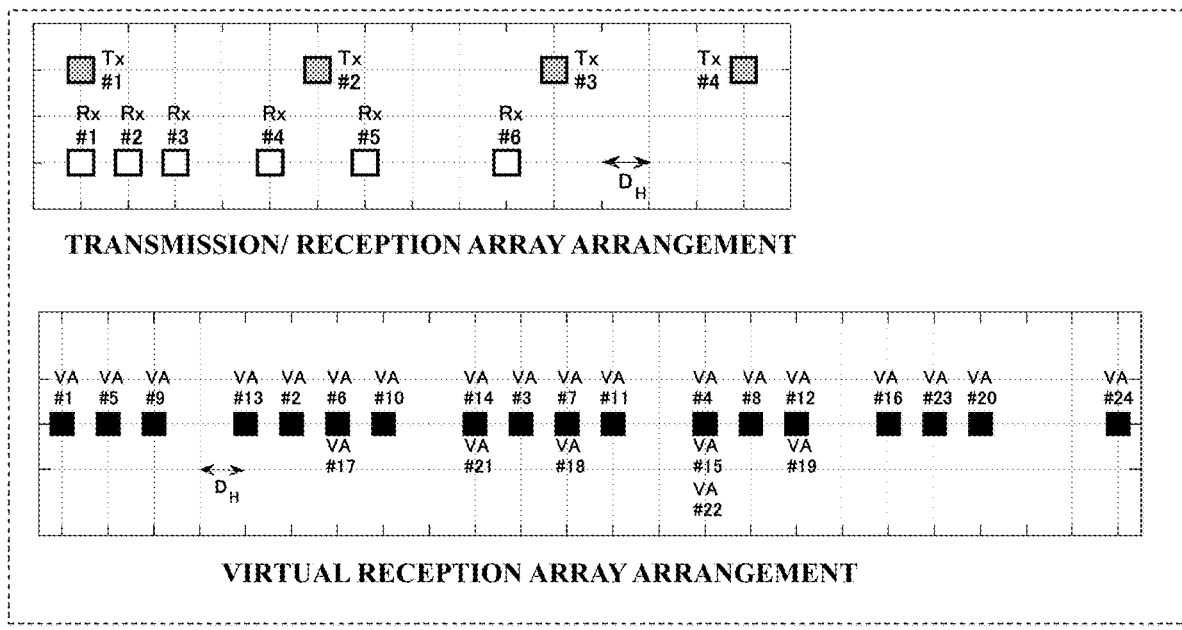
FIG. 26 illustrates an example of an arrangement of transmission/reception antennas and a virtual reception array according to variation 5.

FIG. 26 illustrates an example of the MIMO array arrangement and virtual reception array arrangement according to arrangement example 4. In FIG. 26, the number of transmission antennas Nt=4, and the number of reception antennas Na=6. Note that the number of transmission antennas Nt and the number of reception antennas Na are not limited to those in the example illustrated in FIG. 26.

In FIG. 26, the antenna spacing $D_{Tx(1, 2)}$ between Tx #1 and Tx #2 is $5D_H$, the antenna spacing $D_{Tx(2, 3)}$ between Tx #2 and Tx #3 is $5D_H$, and the antenna spacing $D_{Tx(3, 4)}$ between Tx #3 and Tx #4 is 4DH. In addition in FIG. 26, the antenna spacing $D_{Rx(1, 2)}$ between Rx #1 and Rx #2 is $D_H$, the antenna spacing $D_{Rx(2, 3)}$ between Rx #2 and Rx #3 is $D_H$, the antenna spacing $D_{Rx(3, 4)}$ between Rx #3 and Rx #4 is $2D_H$, the antenna spacing $D_{Rx(4, 5)}$ between Rx #4 and Rx #5 is $2D_H$, and the antenna spacing $D_{Rx(5, 6)}$ between Rx #5 and Rx #6 is 3DH. Furthermore, in FIG. 26, the aperture length of the transmission array antenna is $14D_H$, and the aperture length of the reception array antenna is $9D_H$.

Therefore, in the transmission/reception antenna arrangement illustrated in FIG. 26, $D_{Tx(1, 2)} \geq D_{Tx(2, 3)} \geq D_{Tx(3, 4)}$, and $D_{Rx(1, 2)} \leq D_{Rx(2, 3)} \leq D_{Rx(3, 4)} \leq D_{Rx(4, 5)} \leq D_{Rx(5, 6)}$. Consequently, the above-described (Condition 1) is satisfied.

In addition, in the transmission/reception antenna arrangement illustrated in FIG. 26, the maximum antenna spacing of the transmission array antenna ($D_{Tx(1, 2)} = D_{Tx(2, 3)} = 5D_H$) is set to be greater than the minimum antenna spacing of the reception array antenna ($D_{Rx(1, 2)} = D_{Rx(2, 3)} = D_H$) and less than or equal to the aperture length $9D_H$ of the reception array antenna. In addition, for example, the maximum antenna spacing of the reception array antenna ($D_{Rx(5, 6)} = 3D_H$) is less than the minimum antenna spacing of the transmission array antenna ($D_{Tx(3, 4)} = 4D_H$). Consequently, (condition 2) described above is not satisfied.

The arrangement of the transmission array antenna and the arrangement of the reception array antenna can provide a virtual reception array antenna VA #1 to VA #24.

When the virtual reception array antenna arrangement illustrated in FIG. 26 is sequentially arranged, for example, in order from the left end to the right end, the virtual antenna elements are VA #1, VA #5, VA #9, VA #13, VA #2, VA #6 (with overlapping VA #17), VA #10, VA #14 (with overlapping VA #21), VA #3, VA #7 (with overlapping VA #18), VA #11, VA #4 (with overlapping VA #15 and VA #22), VA #8, VA #12 (with overlapping VA #19), VA #16, VA #23, VA #20, and VA #24. In addition, the transmission antenna numbers of transmission antennas 108 used to obtain the received signals of the virtual antenna elements arranged in this order are Tx #1, Tx #1, Tx #1, Tx #1, Tx #2, Tx #1 (with overlapping Tx #2), Tx #2, Tx #1 (with overlapping Tx #2), Tx #3, Tx #2 (with overlapping Tx #3), Tx #3, Tx #2 (with overlapping Tx #3 and Tx #4), Tx #4, Tx #3 (with overlapping Tx #4), Tx #4, Tx #3, Tx #4, and Tx #4.

For example, when the virtual reception array arrangement illustrated in FIG. 26 is sequentially arranged in a direction from one end (for example, the left end) to the other end (for example, the right end), the transmission antenna numbers of transmission antennas 108 used to obtain received signals of the virtual antenna elements form a sequence of a mixture of part where Tx #1 continuously appear four times (that is, the low frequency component of the spatial frequency spectrum) and part where Tx #2 to Tx #4 are switched (that is, the high frequency component of the spatial frequency spectrum).

For example, the TxCAL vector (TxCALVec) consists of the transmission phase correction errors (refer to, for example, expression 13 or expression 25) arranged in an order corresponding to transmission antennas 108 used to obtain the received signals of the virtual reception array element described above. For this reason, if aliasing of Doppler frequency occurs, a direction estimation error based on the TxCAL vector (TxCALVec) occurs.

Figure 27:
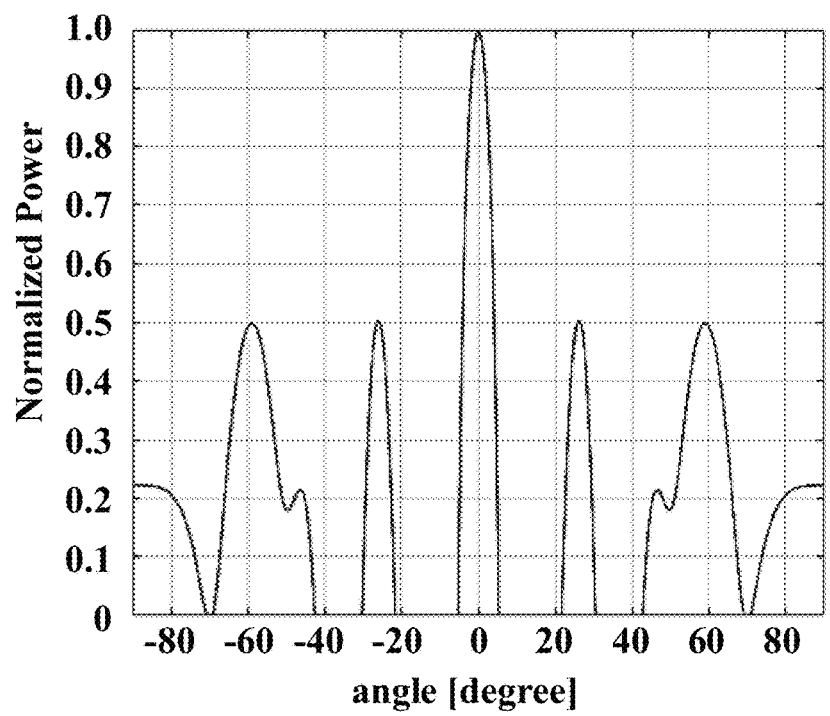
FIG. 27 illustrates an example of direction estimation results according to variant 5.
Figure 27:
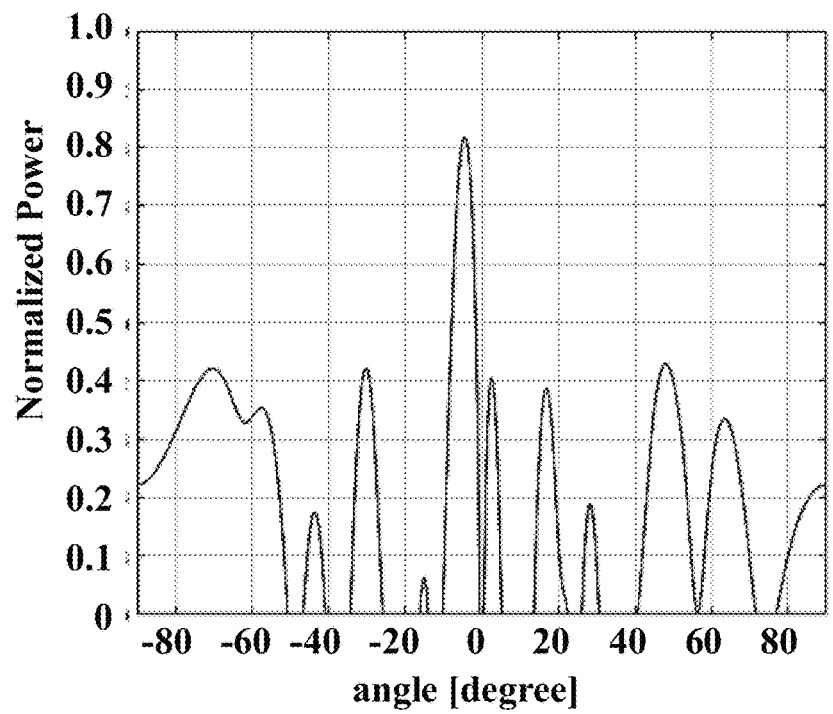

FIG. 27 illustrates an example of the direction estimation results when the beamformer method is used for the transmission/reception antenna arrangement illustrated in FIG. 26 as the direction-of-arrival estimation algorithm for use in direction estimator 215. In FIG. 27, the outputs of a direction-of-arrival estimation evaluation function values in the horizontal ±90 degree range are plotted when the target true value is set to 0 degrees horizontally. In addition, in FIG. 27, $D_H=0.5\lambda$ in the MIMO array arrangement.

As can be seen from FIG. 27, when aliasing of Doppler frequency is present (that is, when a transmission phase correction error occurs), the peak level of the spatial spectrum in the direction estimation by the Fourier method is reduced by about 3.6 dB, as compared with the peak level when aliasing of Doppler frequency is not present (that is, when a transmission phase correction error does not occur).

Arrangement Example 5

Figure 28:
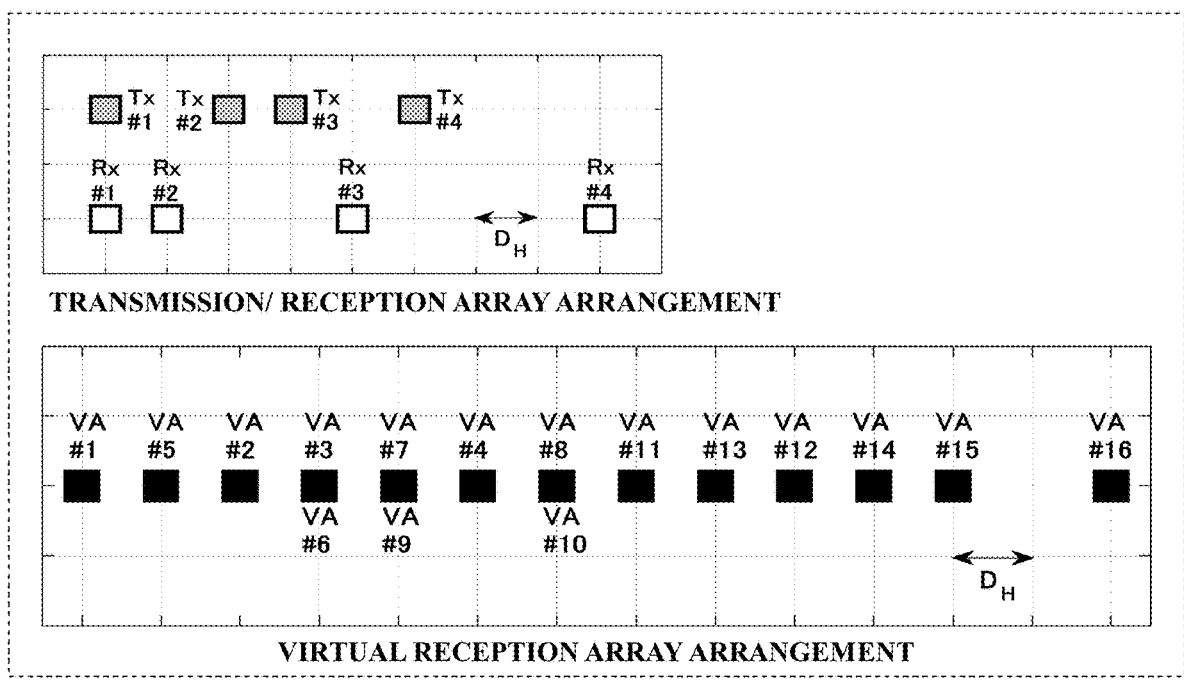
FIG. 28 illustrates an example of an arrangement of transmission/reception antennas and a virtual reception array according to variation 5.

FIG. 28 illustrates an example of the MIMO array arrangement and virtual reception array arrangement according to arrangement example 5. In FIG. 28, the number of transmission antennas Nt=4, and the number of reception antennas Na=4. Note that the number of transmission antennas Nt and the number of reception antennas Na are not limited to those in the example illustrated in FIG. 28.

In FIG. 28, the antenna spacing $D_{Tx(1, 2)}$ between Tx #1 and Tx #2 is $2D_H$, the antenna spacing $D_{Tx(2, 3)}$ between Tx #2 and Tx #3 is $D_H$, and the antenna spacing $D_{Tx(3, 4)}$ between Tx #3 and Tx #4 is 2DH. In addition in FIG. 28, the antenna spacing $D_{Rx(1, 2)}$ between Rx #1 and Rx #2 is $D_H$, the antenna spacing $D_{Rx(2, 3)}$ between Rx #2 and Rx #3 is $3D_H$, and the antenna spacing $D_{Rx(3, 4)}$ between Rx #3 and Rx #4 is $4D_H$. Furthermore, in FIG. 28, the aperture length of the transmission array antenna is $5D_H$, and the aperture length of the reception array antenna is $8D_H$.

Therefore, in the transmission/reception antenna arrangement illustrated in FIG. 28, $D_{Tx(1, 2)} \geq D_{Tx(2, 3)}$, and $D_{Tx(2, 3)} \leq D_{Tx(3, 4)}$ although $D_{Rx(1, 2)} \leq D_{Rx(2, 3)} \leq D_{Rx(3, 4)}$. Consequently, the above-described (Condition 1) is not satisfied.

In contrast, in the transmission/reception antenna arrangement illustrated in FIG. 28, the maximum antenna spacing of the transmission array antenna ($D_{Tx(1, 2)} = D_{Tx(3, 4)} = 2D_H$) is set to be greater than the minimum antenna spacing of the reception array antenna ($D_{Rx(1, 2)} = D_H$) and less than or equal to the aperture length $8D_H$ of the reception array antenna. In addition, for example, the maximum antenna spacing of the reception array antenna ($D_{Rx(3, 4)} = 4D_H$) is set to be greater than the minimum antenna spacing of the transmission array antenna ($D_{Tx(2, 3)} = D_H$) and less than or equal to the aperture length $5D_H$ of the transmission array antenna. Consequently, in the transmission/reception antenna arrangement illustrated in FIG. 28, (condition 2) described above is satisfied.

The arrangement of the transmission array antenna and the arrangement of the reception array antenna can provide a virtual reception array antenna VA #1 to VA #16.

When the virtual reception array arrangement illustrated in FIG. 28 is sequentially arranged, for example, in order from the left end to the right end, the virtual antenna elements are VA #1, VA #5, VA #2, VA #3 (with overlapping VA #6), VA #7 (with overlapping VA #9), VA #4, VA #8 (with overlapping VA #10), VA #11, VA #13, VA #12, VA #14, VA #15, and VA #16. In addition, the transmission antenna numbers of transmission antennas 108 used to obtain the received signals of the virtual antenna elements arranged in this order are Tx #1, Tx #1, Tx #2, Tx #2 (with overlapping Tx #3), Tx #1 (with overlapping Tx #3), Tx #4, Tx #2 (with overlapping Tx #4), Tx #3, Tx #1, Tx #4, Tx #2, Tx #3, and Tx #4.

For example, if the virtual reception array arrangement illustrated in FIG. 28 is sequentially arranged in a direction from one end (for example, the left end) to the other end (for example, the right end), the transmission antenna numbers of transmission antennas 108 used to obtain received signals of the virtual antenna elements form a sequence of a mixture of part where each of Tx #1 and Tx #2 continuously appears twice (that is, the low frequency component of the spatial frequency spectrum) and part where Tx #1 to Tx #4 are switched (that is, the high frequency component of the spatial frequency spectrum).

For example, the TxCAL vector (TxCALVec) consists of the transmission phase correction errors (refer to, for example, expression 13 or expression 25) arranged in an order corresponding to transmission antennas 108 used to obtain the received signals of the virtual reception array element described above. For this reason, if aliasing of Doppler frequency occurs, a direction estimation error based on the TxCAL vector (TxCALVec) occurs.

Figure 29:
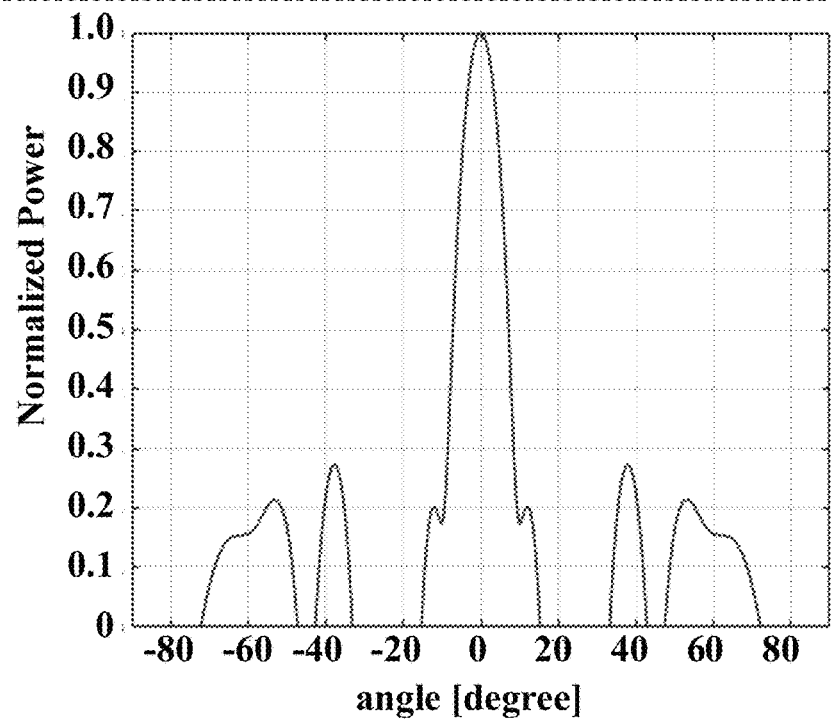
FIG. 29 illustrates an example of direction estimation results according to variant 5.
Figure 29:
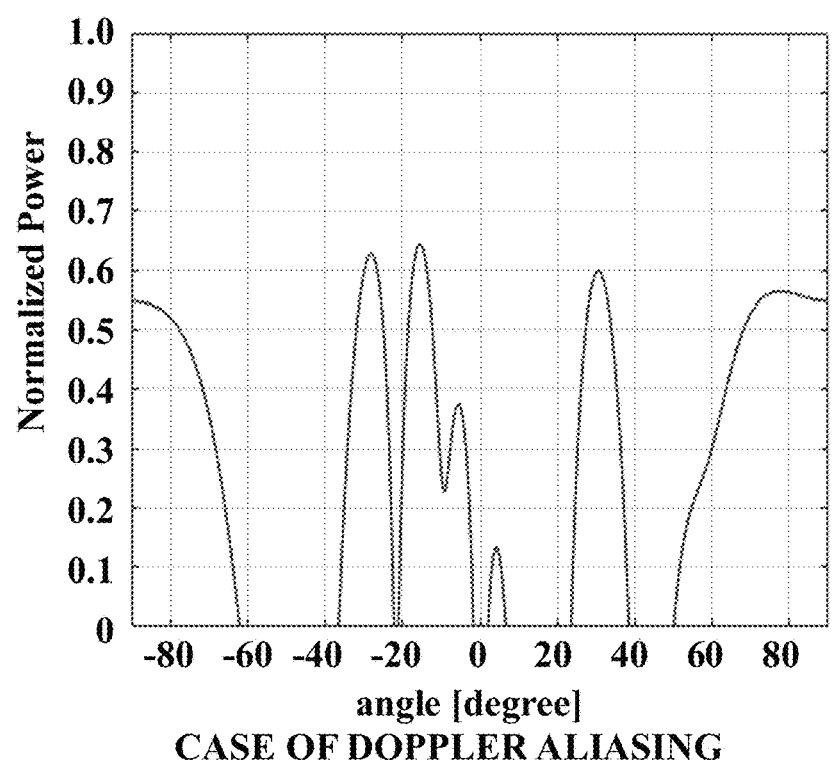

FIG. 29 illustrates an example of the direction estimation results when the beamformer method is used for the transmission/reception antenna arrangement illustrated in FIG. 28 as the direction-of-arrival estimation algorithm for use in direction estimator 215. In FIG. 29, the outputs of a direction-of-arrival estimation evaluation function values in the horizontal ±90 degree range are plotted when the target true value is set to 0 degrees horizontally. In addition, in FIG. 29, $D_H = 0.5\lambda$ in the MIMO array arrangement.

As can be seen from FIG. 29, when the aliasing of Doppler frequency is present (that is, when a transmission phase correction error occurs), the peak level of the spatial spectrum in the direction estimation by the Fourier method is reduced by about 7 dB, as compared with the peak level when aliasing of Doppler frequency is not present (that is, when a transmission phase correction error does not occur).

As described above, although the MIMO array arrangement according to arrangement example 5 does not satisfy (condition 1) described above, the MIMO array arrangement satisfies (condition 2) described above. Thus, a MIMO array arrangement can be provided in which, in the sequence of the virtual reception array arrangement (for example, a sequence in the direction from one end to the other), transmission antennas 108 used for transmission of the transmission signal that are continuously switched by time division switching (that is, the low frequency component of the spatial frequency spectrum) and transmission antennas 108 used for transmission of the transmission signal that are sequentially switched (that is, the high frequency component of the spatial frequency spectrum) are mixed. In this way, for example, the transmission phase correction errors for transmission antennas 108 each corresponding to one of the elements of TxCALVec can be a mixture of part that is constant and part that varies sequentially. As a result, the peak level in the spatial frequency spectrum of the transmission phase error vector (for example, TxCALVec) corresponding to the arrangement of the transmission/reception array antennas of radar apparatus 10 can be reduced. That is, the above-described transmission/reception array antenna arrangement prevents the variation in the transmission phase correction error from occurring at a constant period and, thus, can increase the randomness.

Arrangement examples 1 to 5 have been described above as transmission/reception antenna arrangements that satisfy at least one of (condition 1) and (condition 2) described above.

Variation 5 facilitates switching among transmission antennas 108 (for example, transmission antenna numbers) used to obtain received signal, for example, in the order of the virtual antenna elements arranged from one side to the other of a virtual reception array arrangement and prevents the variation of a transmission phase correction errors for transmission antennas 108 each corresponding to one of the elements of TxCALVec from occurring at a constant period. Thus, the randomness of the variation is increased. As a result, the peak level in the spatial frequency spectrum of the transmission phase error vector (for example, TxCALVec) corresponding to the arrangement of the transmission/reception array antennas of radar apparatus 10 can be reduced.

An embodiment of the present disclosure has been described above.

Other Embodiment

In radar apparatus 10 illustrated in FIG. 1, radar transmitter 100 and radar receiver 200 may be placed at physically separated locations.

The number of transmission antennas Nt and the number of reception antennas Na are not limited to those in the examples described above and may be other values. In addition, the spacing $D_V$ and $D_H$ are not limited to 0.5λ. For example, the spacing may have a value greater than 0.5λ and less than or equal to 1λ.

Furthermore, the transmission/reception antenna arrangement is not limited to the example described above. For example, any transmission/reception antenna arrangement that satisfies (condition 1) or (condition 2) may be used. That is, for example, any other arrangement having a random variation of the transmission phase correction error for transmission antennas 108 each corresponding to one of the elements of TxCALVec may be used.

Radar apparatus 10 according to an exemplary embodiment of the present disclosure includes, for example, a central processing unit (CPU), a storage medium such as a read only memory (ROM) that stores a control program, and a work memory such as a random access memory (RAM), although they are not illustrated. In this case, the functions of the sections described above are implemented by the CPU executing the control program. However, the hardware configuration of the radar apparatus is not limited to that in this example. For example, the functional sections of the radar apparatus may be implemented as an integrated circuit (IC). Each functional section may be formed as an individual chip, or some or all of them may be formed into a single chip.

The expression "section" used in the above-described embodiments may be replaced with another expression such as "circuit (circuitry)," "device," "unit," or "module."

Various embodiments have been described with reference to the drawings hereinabove. Obviously, the present disclosure is not limited to these examples. Obviously, a person skilled in the art would arrive variations and modification examples within a scope described in claims, and it is understood that these variations and modifications are within the technical scope of the present disclosure. Each constituent element of the above-mentioned embodiments may be combined optionally without departing from the spirit of the disclosure.

Each functional block used in the description of each embodiment described above is typically realized by an LSI, which is an integrated circuit. The integrated circuit controls each functional block used in the description of the above embodiments and may include an input terminal and an output terminal. The LSI may be individually formed as chips, or one chip may be formed so as to include a part or all of the functional blocks. The LSI herein may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication (collectively referred to as a communication apparatus). Non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle provided with communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof. The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Summary of the Present Disclosure

A radar apparatus according to one embodiment of the present disclosure includes: a radar transmission circuit that transmits a radar signal by using a transmission array antenna; and a radar reception circuit that receives a reflected wave signal that is the radar signal reflected by a target by using a reception array antenna, in which: the transmission array antenna includes a plurality of transmission antennas arranged in a straight line extending in a first direction, and spacing between adjacent transmission antennas of the plurality of transmission antennas increases from one end toward another in the first direction, and in which: the reception array antenna includes a plurality of reception antennas arranged in a straight line extending in the first direction, and the spacing between adjacent transmission antennas of the plurality of reception antennas decreases from the one end toward the other end in the first direction.

In the radar apparatus according to one embodiment of the present disclosure: a maximum spacing between adjacent transmission antennas of the plurality of transmission antennas is greater than a minimum spacing between adjacent reception antennas of the plurality of reception antennas and less than or equal to an aperture length of the reception array antenna, and a maximum spacing between adjacent reception antennas of the plurality of reception antennas is greater than a minimum spacing between adjacent transmission antennas of the plurality of transmission antennas and less than or equal to an aperture length of the transmission array antenna.

A radar apparatus according to one embodiment of the present disclosure includes: a radar transmission circuit that transmits a radar signal by using a transmission array antenna; and a radar reception circuit that receives a reflected wave signal that is the radar signal reflected by a target by using a reception array antenna, in which: a maximum spacing between adjacent transmission antennas of a plurality of transmission antennas included in the transmission array antenna is greater than a minimum spacing between adjacent reception antennas of a plurality of reception antennas included in the reception array antenna and less than or equal to an aperture length of the reception array antenna, and a maximum spacing between adjacent reception antennas of the plurality of reception antennas is greater than a minimum spacing between adjacent transmission antennas of a plurality of transmission antennas and less than or equal to an aperture length of the transmission array antenna.

In the radar apparatus according to one embodiment of the present disclosure: the radar reception circuit determines whether aliasing of Doppler frequency in Doppler analysis of the reflected wave signal is present on a basis of spatial spectrum in a direction estimation result of the reflected wave signal.

In the radar apparatus according to one embodiment of the present disclosure: when the aliasing is present, the radar reception circuit corrects a reception phase of the reflected wave signal and performs direction estimation on a basis of the reflected wave signal subjected to phase correction.

In the radar apparatus according to one embodiment of the present disclosure: the radar reception circuit performs first direction estimation to estimate a direction of the target on a basis of the reflected wave signal subjected to phase correction regarding the aliasing of Doppler frequency in Doppler analysis of the reflected wave signal, performs second direction estimation to estimate the direction of the target on a basis of the reflected wave signal not subjected to phase correction, and determines whether the aliasing in Doppler analysis of the reflected wave signal is present on a basis of comparison of a result of the first direction estimation and a result of the second direction estimation.

In the radar apparatus according to one embodiment of the present disclosure: the aliasing includes primary aliasing and secondary aliasing, and the radar reception circuit performs direction estimation to estimate the direction of the target on a basis of each of the reflected wave signal subjected to phase correction regarding the primary aliasing and the reflected wave signal subjected to phase correction regarding the secondary aliasing in the first direction estimation.

A radar apparatus according to one embodiment of the present disclosure includes: a radar transmission circuit that transmits a radar signal by using a transmission array antenna; and a radar reception circuit that receives a reflected wave signal that is the radar signal reflected by a target by using a reception array antenna, in which: the radar reception circuit determines whether aliasing of Doppler frequency in Doppler analysis of the reflected wave signal is present on a basis of spatial spectrum in a direction estimation result of the reflected wave signal.

A radar apparatus according to one embodiment of the present disclosure includes: a radar transmission circuit that transmits a radar signal by using a transmission array antenna; and a radar reception circuit that receives a reflected wave signal that is the radar signal reflected by a target by using a reception array antenna, in which: the radar reception circuit performs first direction estimation to estimate the direction of the target on a basis of the reflected wave signal subjected to phase correction regarding the aliasing of Doppler frequency in Doppler analysis of the reflected wave signal, performs second direction estimation to estimate the direction of the target on a basis of the reflected wave signal not subjected to phase correction, and determines whether the aliasing in Doppler analysis of the reflected wave signal is present on a basis of comparison of a result of the first direction estimation and a result of the second direction estimation.

The disclosure of Japanese Patent Application No. 2019-053760, filed on Mar. 20, 2019, including the specification, drawings and abstract, is incorporated herein by reference in its entirety.

INDUSTRIAL APPLICABILITY

The present discloser is suitable for use in radar apparatuses for detecting a target.

REFERENCE SIGNS LIST 10, 10a Radar apparatus
100, 100a Radar transmitter
101, 401 Radar transmission signal generator
102 Code generator
103 Modulator
104, 503 LPF
105 Switching controller
106, 106a Transmission switch
107, 107a Transmission radio unit
108 Transmission antenna
111 Code storage
112 DA converter
200, 200a Radar receiver
201 Antenna system processor
202 Reception antenna
203, 501 Reception radio unit
204 Amplifier
205 Frequency converter
206 Orthogonal wave detector
207, 207a Signal processor
208, 208a, 209 AD converter
210 Correlation calculator
211 Output switch
212 Doppler analyzer
213 CFAR unit
214 Signal corrector
215 Direction estimator
216, 216a, 216b Aliasing determiner
217, 220 switch
218, 218a Aliasing phase corrector
219, 219a Aliasing signal direction estimator
221 Primary aliasing phase corrector
222 Secondary aliasing phase corrector
223 Primary aliasing signal direction estimator
224 Secondary aliasing signal direction estimator
300 Reference signal generator
402 Modulation signal generator
403 VCO
404 Directional coupler
502 Mixer
504 R-FFT unit

The invention claimed is:

1. A radar apparatus, comprising:
an antenna array which consists of a transmission array antenna and a reception array antenna;
a radar transmission circuit which, in operation, transmits a radar signal by using the transmission array antenna; and
a radar reception circuit which, in operation, receives a reflected wave signal that is the radar signal reflected by a target by using the reception array antenna, wherein
the transmission array antenna consists of a plurality of transmission antennas arranged in a first direction, and lengths of all of a first plurality of spacings between adjacent transmission antennas of the plurality of transmission antennas increase in the first direction, and
the reception array antenna consists of a plurality of reception antennas arranged in the first direction, and lengths of all of a second plurality of spacings between adjacent reception antennas of the plurality of reception antennas decrease in the first direction.

2. The radar apparatus according to claim 1, wherein:
a maximum spacing of the first plurality of spacings is greater than a minimum spacing of the second plurality of spacings and less than or equal to an aperture length of the reception array antenna.

3. The radar apparatus according to claim 1, wherein:
a maximum spacing of the second plurality of spacings is greater than a minimum spacing of the first plurality of spacings and less than or equal to an aperture length of the transmission array antenna.

4. The radar apparatus according to claim 1, wherein:
the radar reception circuit, in operation, determines whether aliasing of Doppler frequency in Doppler analysis of the reflected wave signal is present on a basis of spatial spectrum in a direction estimation result of the reflected wave signal.

5. The radar apparatus according to claim 4, wherein:
when the aliasing is present, the radar reception circuit corrects a reception phase of the reflected wave signal and performs direction estimation on a basis of the reflected wave signal subjected to phase correction.

6. The radar apparatus according to claim 1, wherein:
the radar reception circuit, in operation, performs first direction estimation to estimate a direction of the target on a basis of the reflected wave signal subjected to phase correction regarding the aliasing of Doppler frequency in Doppler analysis of the reflected wave signal, performs second direction estimation to estimate the direction of the target on a basis of the reflected wave signal not subjected to phase correction, and determines whether the aliasing in Doppler analysis of the reflected wave signal is present on a basis of comparison of a result of the first direction estimation and a result of the second direction estimation.

7. The radar apparatus according to claim 4, wherein:
the aliasing includes primary aliasing and secondary aliasing, and
the radar reception circuit, in operation, performs direction estimation to estimate the direction of the target on a basis of each of the reflected wave signal subjected to phase correction regarding the primary aliasing and the reflected wave signal subjected to phase correction regarding the secondary aliasing in the first direction estimation.

8. The radar apparatus according to claim 1, wherein
a number of the first plurality of spacings is two, and
a number of the second plurality of spacings is three.

9. A radar apparatus comprising:
a radar transmission circuit which, in operation, transmits a radar signal by using a transmission array antenna; and a radar reception circuit which, in operation, receives a reflected wave signal that is the radar signal reflected by a target by using a reception array antenna, and determines whether aliasing of Doppler frequency in Doppler analysis of the reflected wave signal is present on a basis of a spatial spectrum in a direction estimation result of the reflected wave signal, wherein
a maximum spacing of a first plurality of spacings between adjacent transmission antennas of a plurality of transmission array antennas included in the transmission array antenna is greater than a minimum spacing of a second plurality of spacings between adjacent reception antennas of a plurality of reception antennas included in the reception array antenna and less than or equal to an aperture length of the reception array antenna, and
a maximum spacing of a second plurality of spacings between adjacent reception antennas of the plurality of reception antennas is greater than a minimum spacing of the first plurality of spacings between adjacent transmission antennas of the plurality of transmission antennas and less than or equal to an aperture length of the transmission array antenna.

10. The radar apparatus according to claim 9, wherein:
when the aliasing is present, the radar reception circuit corrects the reception phase of the reflected wave signal and performs direction estimation on a basis of the reflected wave signal subjected to phase correction.

11. The radar apparatus according to claim 9, wherein:
the radar reception circuit, in operation, performs first direction estimation to estimate the direction of the target on a basis of the reflected wave signal subjected to phase correction regarding the aliasing of Doppler frequency in Doppler analysis of the reflected wave signal, performs second direction estimation to estimate the direction of the target on the basis of the reflected wave signal not subjected to phase correction, and determines whether aliasing in Doppler analysis of the reflected wave signal is present on a basis of comparison of a result of the first direction estimation and a result of the second direction estimation.

12. The radar apparatus according to claim 11, wherein:
the aliasing includes primary aliasing and secondary aliasing, and
the radar reception circuit, in operation, performs direction estimation to estimate the direction of a target on a basis of each of the reflected wave signal subjected to phase correction regarding the primary aliasing and the reflected wave signal subjected to phase correction regarding the secondary aliasing in the first direction estimation.

* * * * *